Feb. 28, 1967 R. S. BAKER 3,305,907
MACHINE FOR MAKING PRESTRESSED CONCRETE MEMBERS
Filed Feb. 11, 1964 41 Sheets-Sheet 2
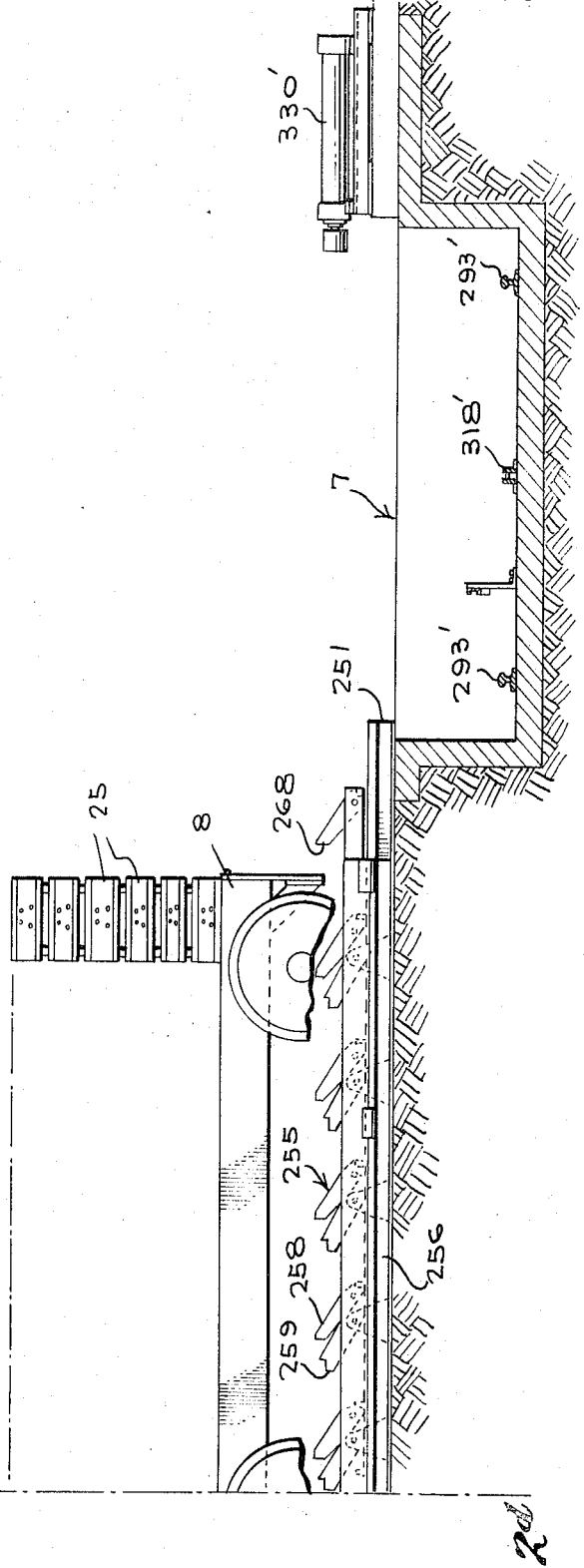

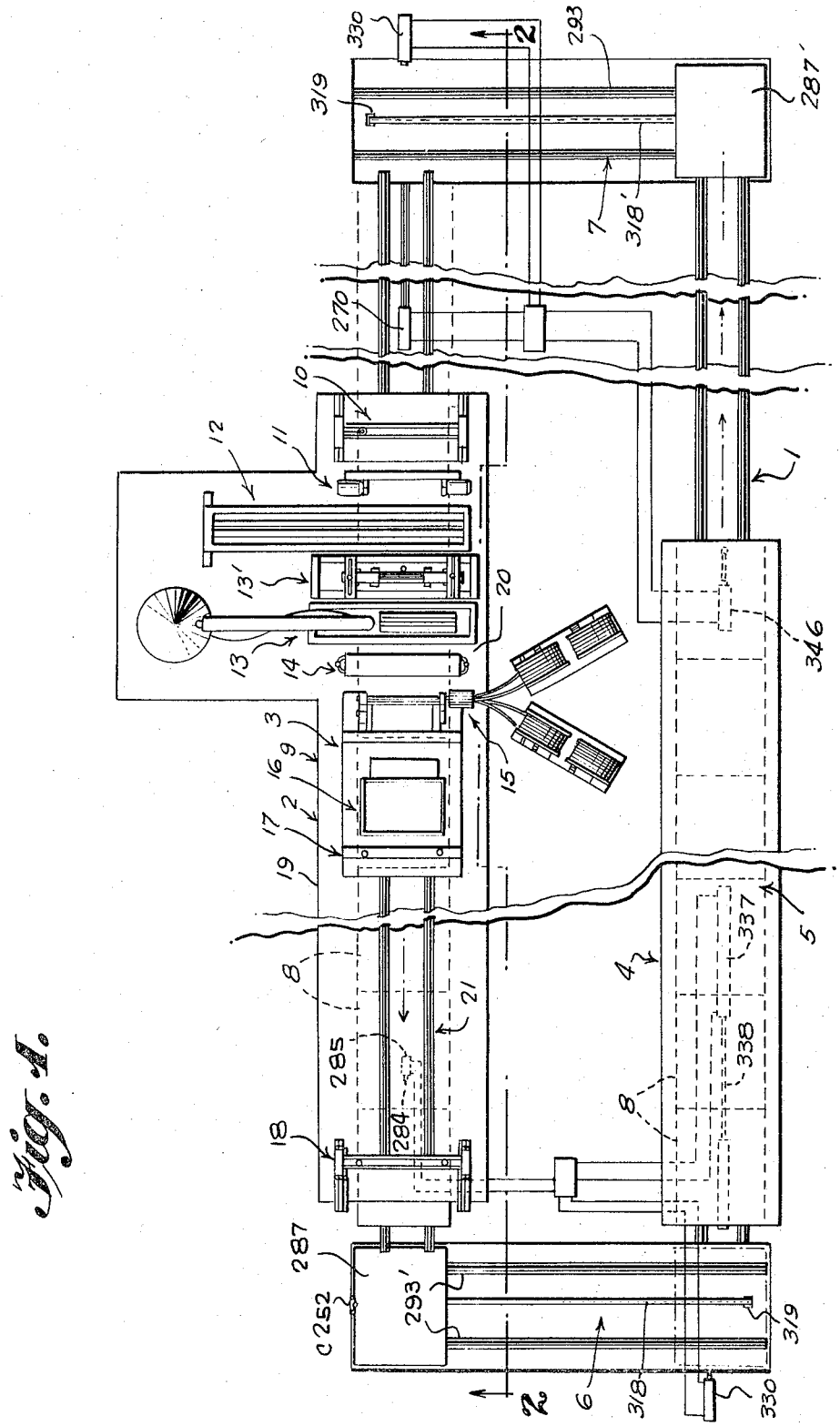

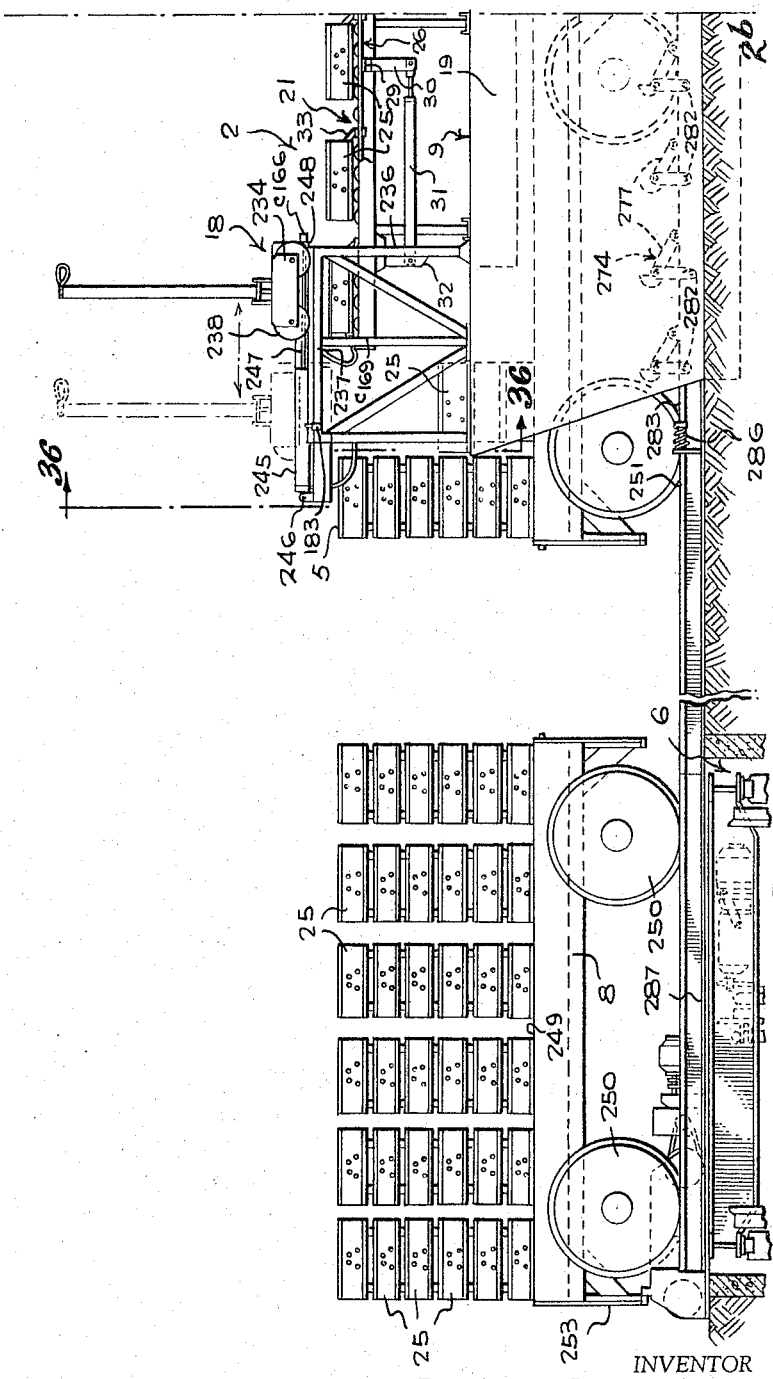

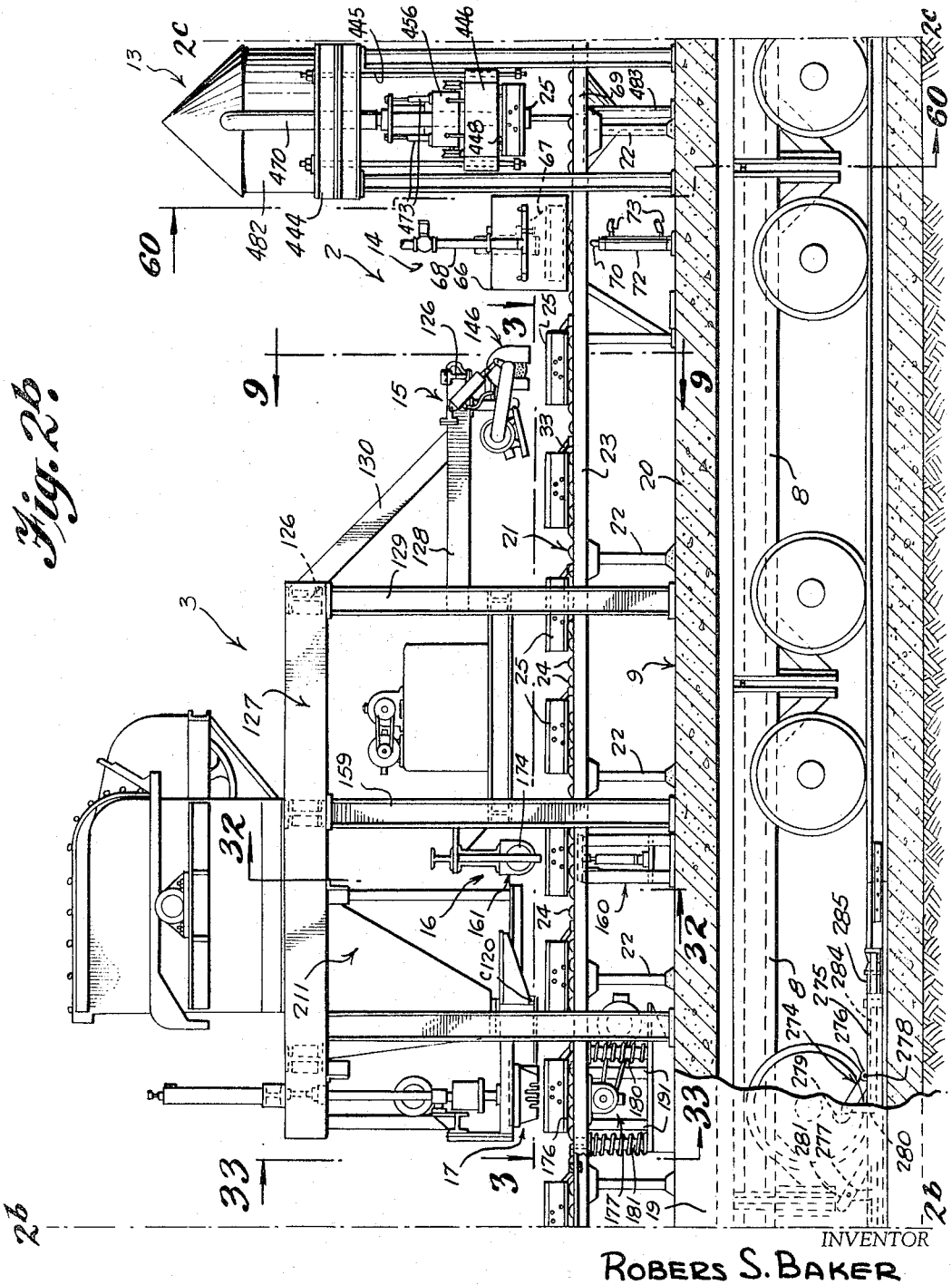

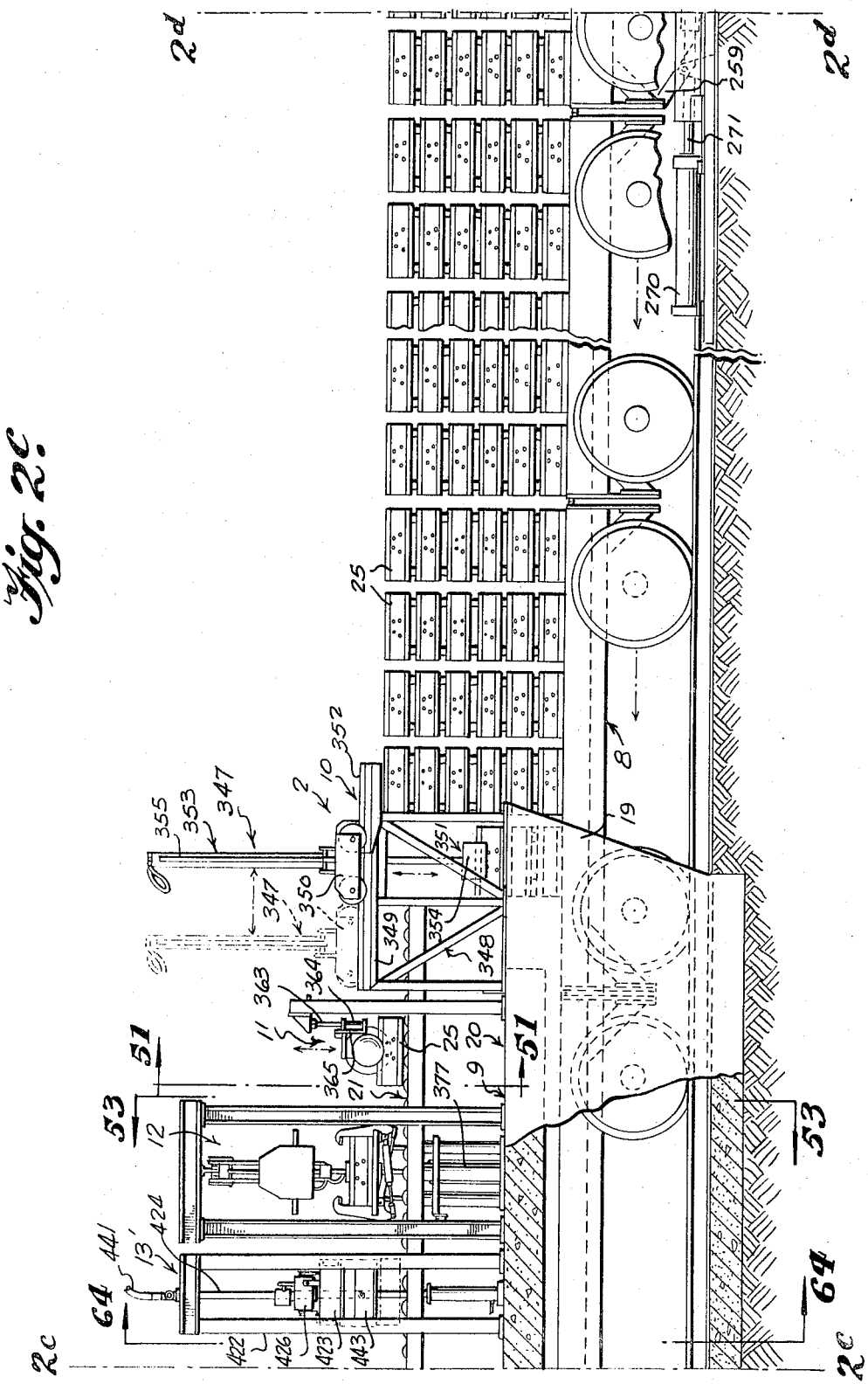

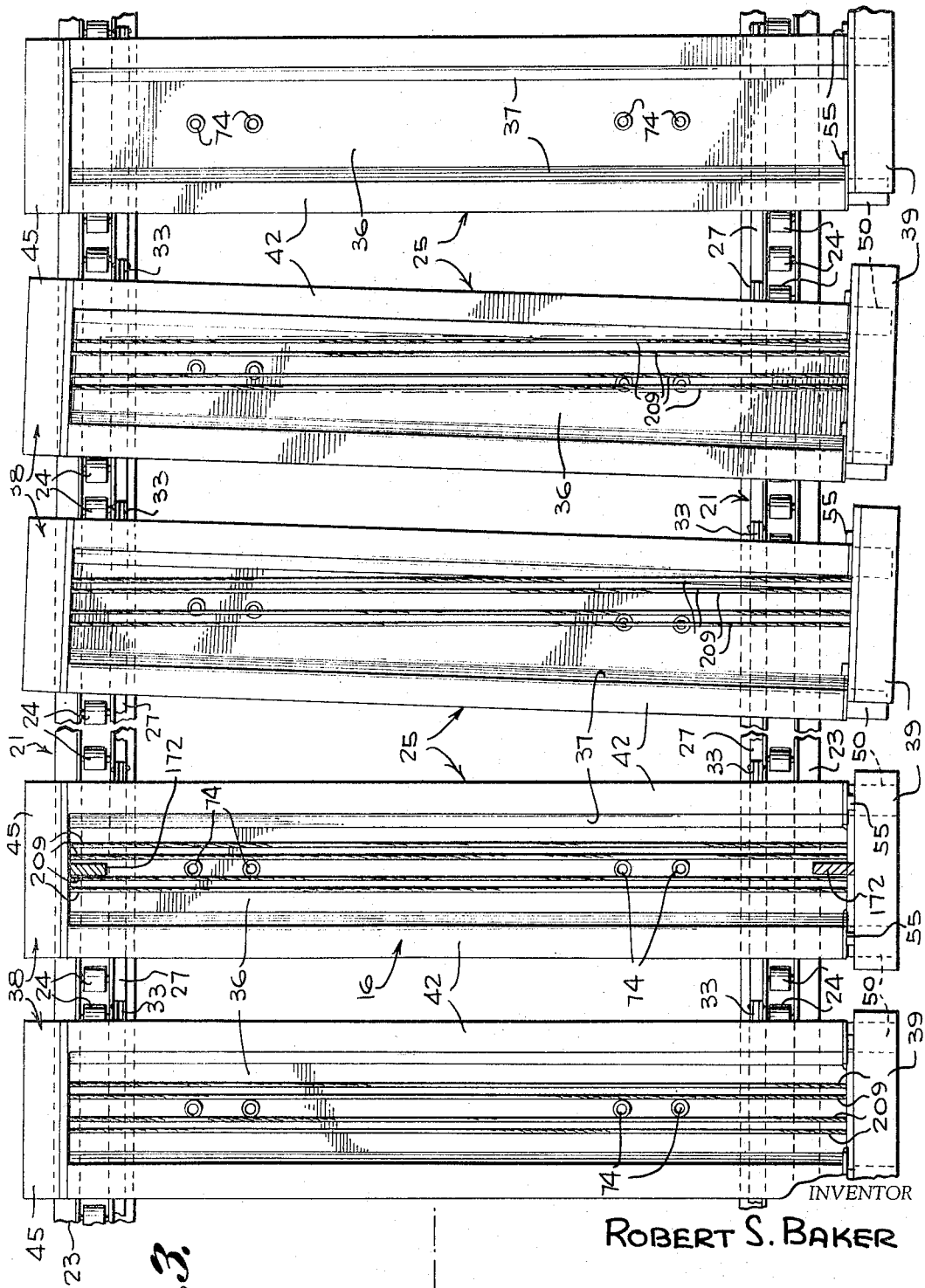

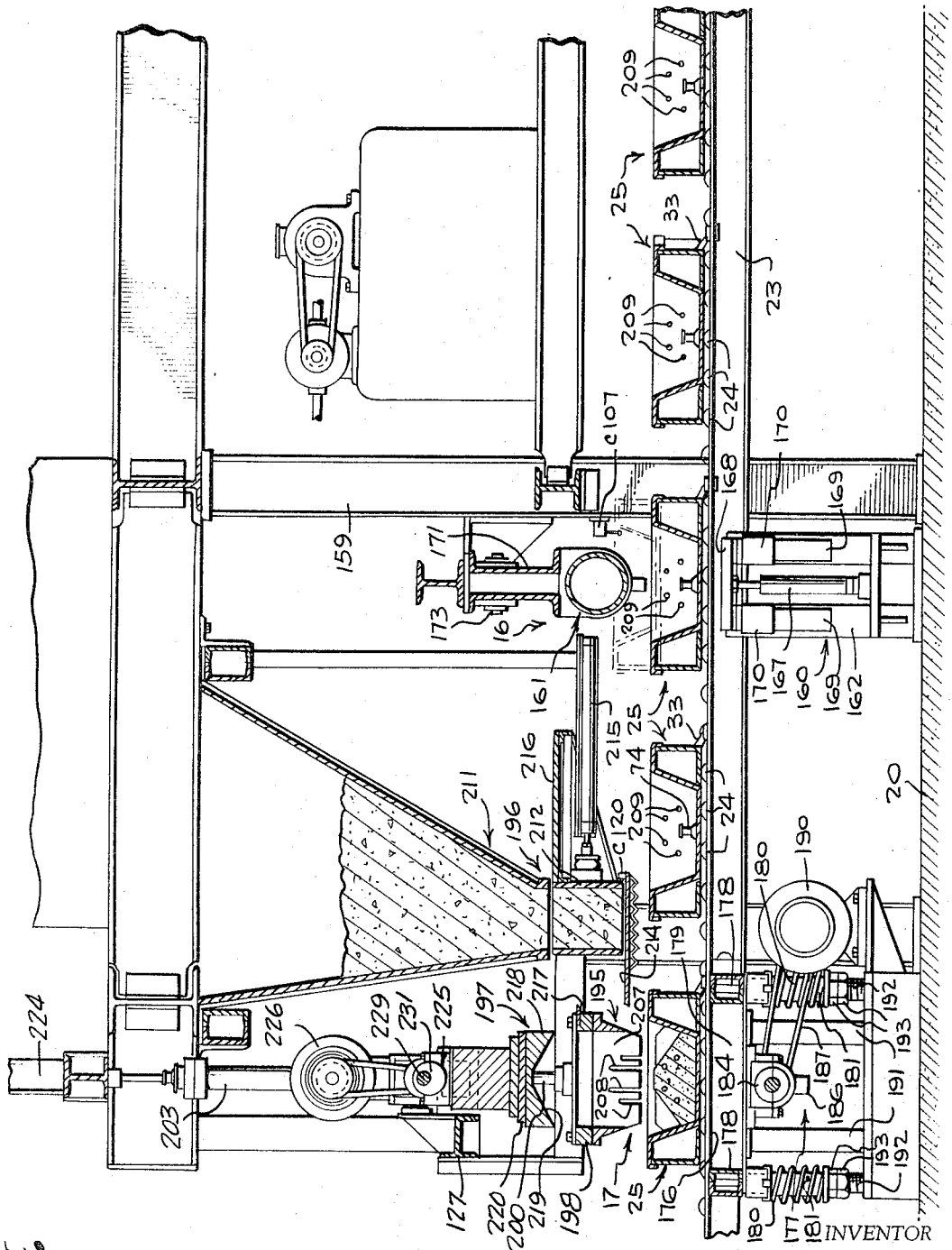

Feb. 28, 1967 R. S. BAKER 3,305,907
MACHINE FOR MAKING PRESTRESSED CONCRETE MEMBERS
Filed Feb. 11, 1964 41 Sheets-Sheet 8
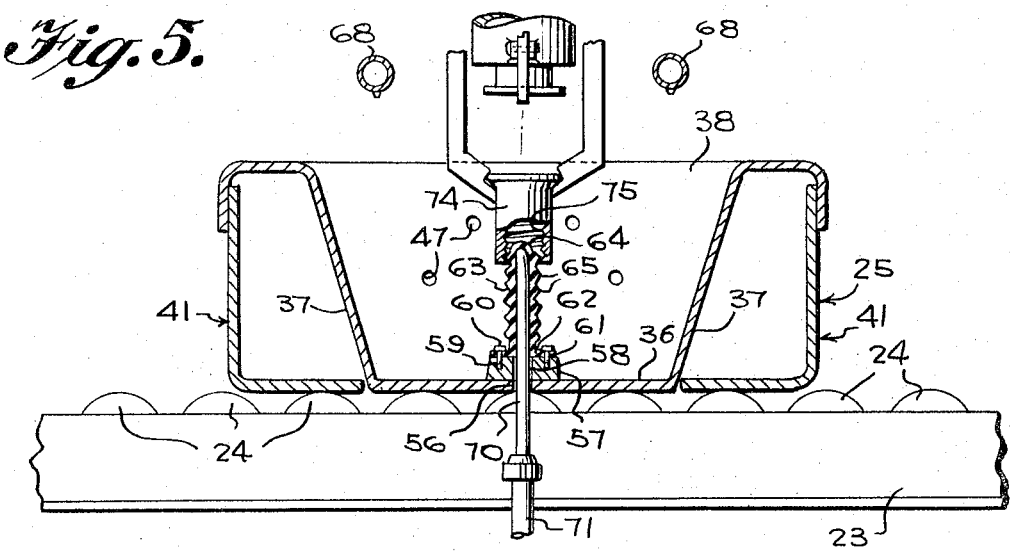
Fig. 5.
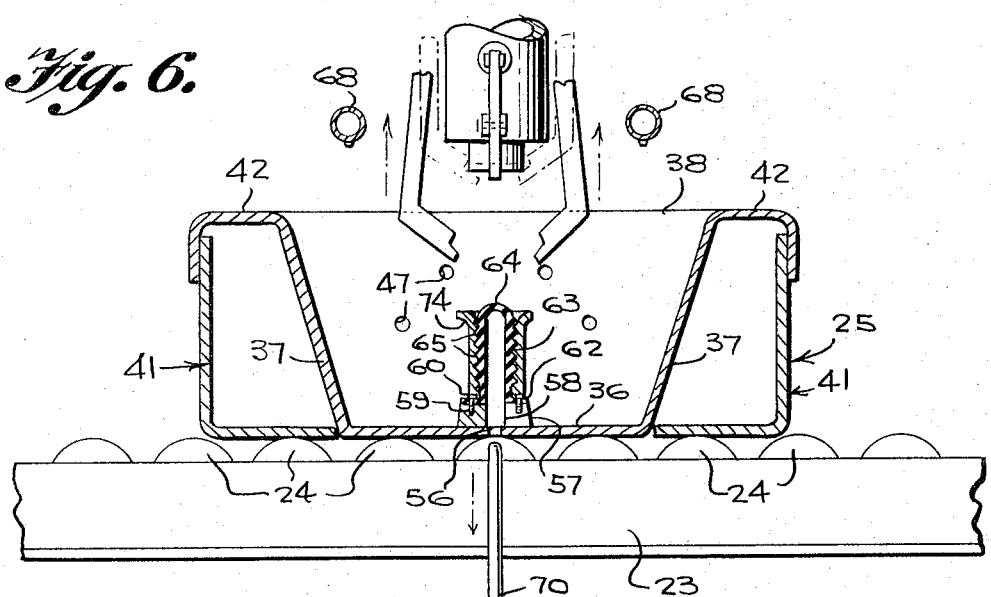
Fig. 6.
Fig. 7.
INVENTOR
ROBERT S. BAKER
BY Mason, Fenwick & Lawrence
ATTORNEYS

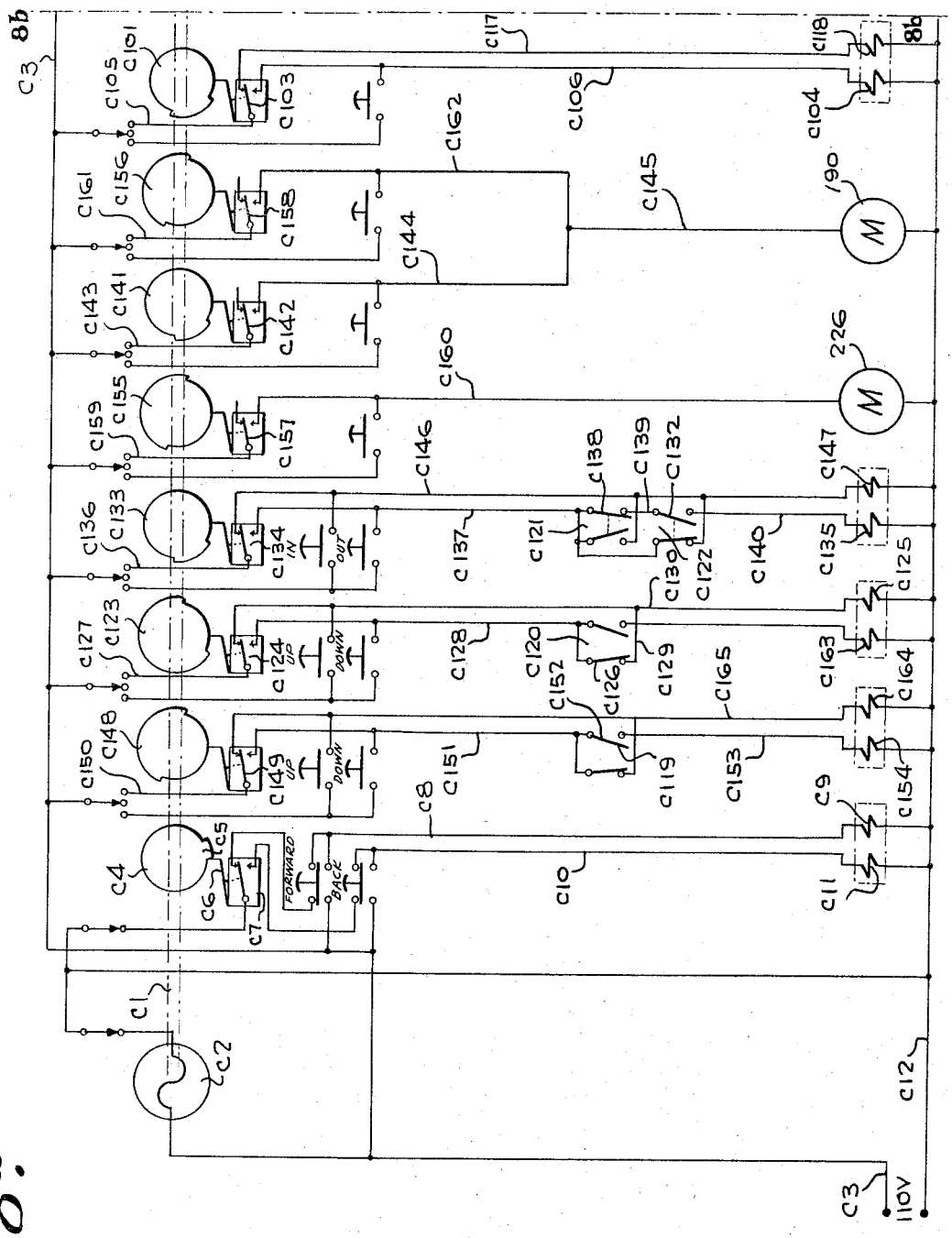

Feb. 28, 1967 R. S. BAKER 3,305,907
MACHINE FOR MAKING PRESTRESSED CONCRETE MEMBERS
Filed Feb. 11, 1964 41 Sheets-Sheet 10

Fig. 8.

INVENTOR
ROBERT S. BAKER

BY
Mason, Fenwick & Lawrence
ATTORNEYS

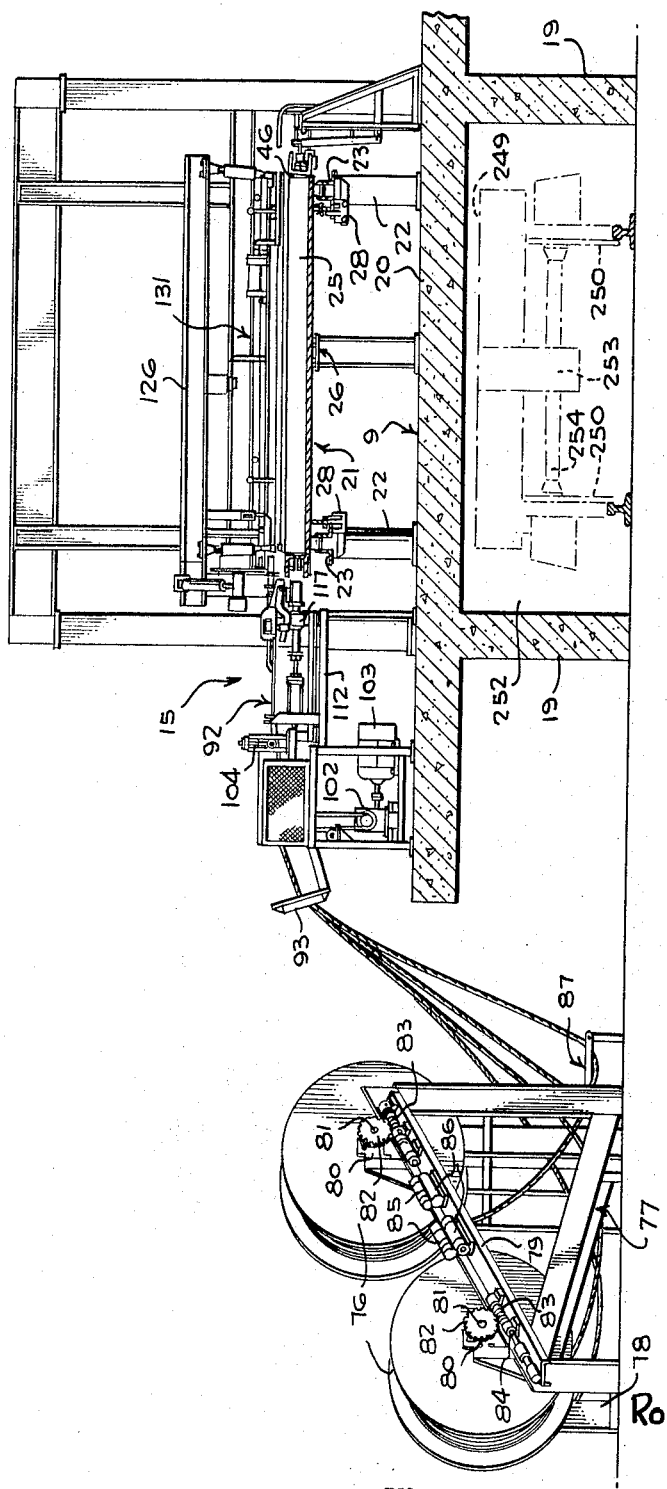

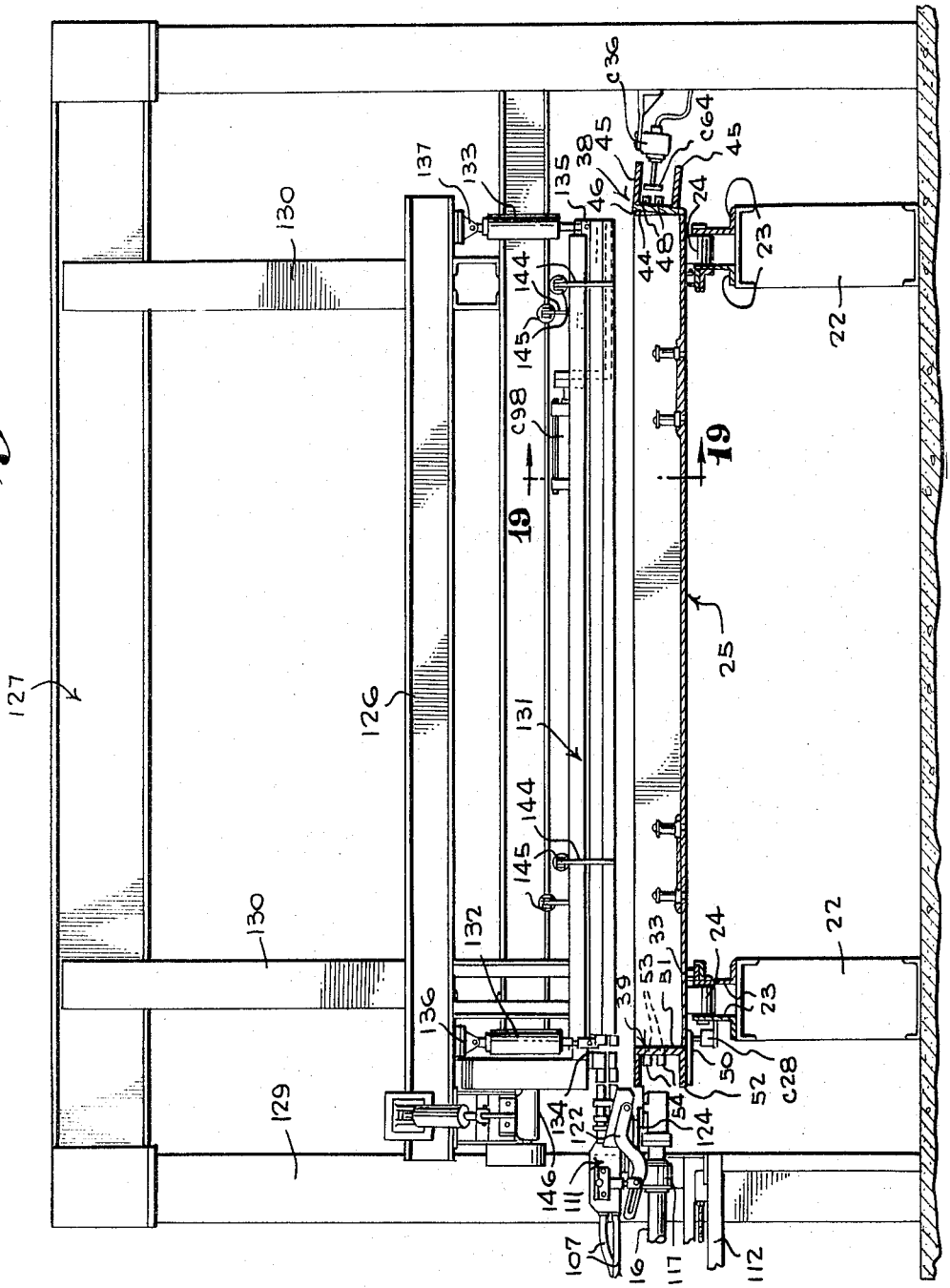

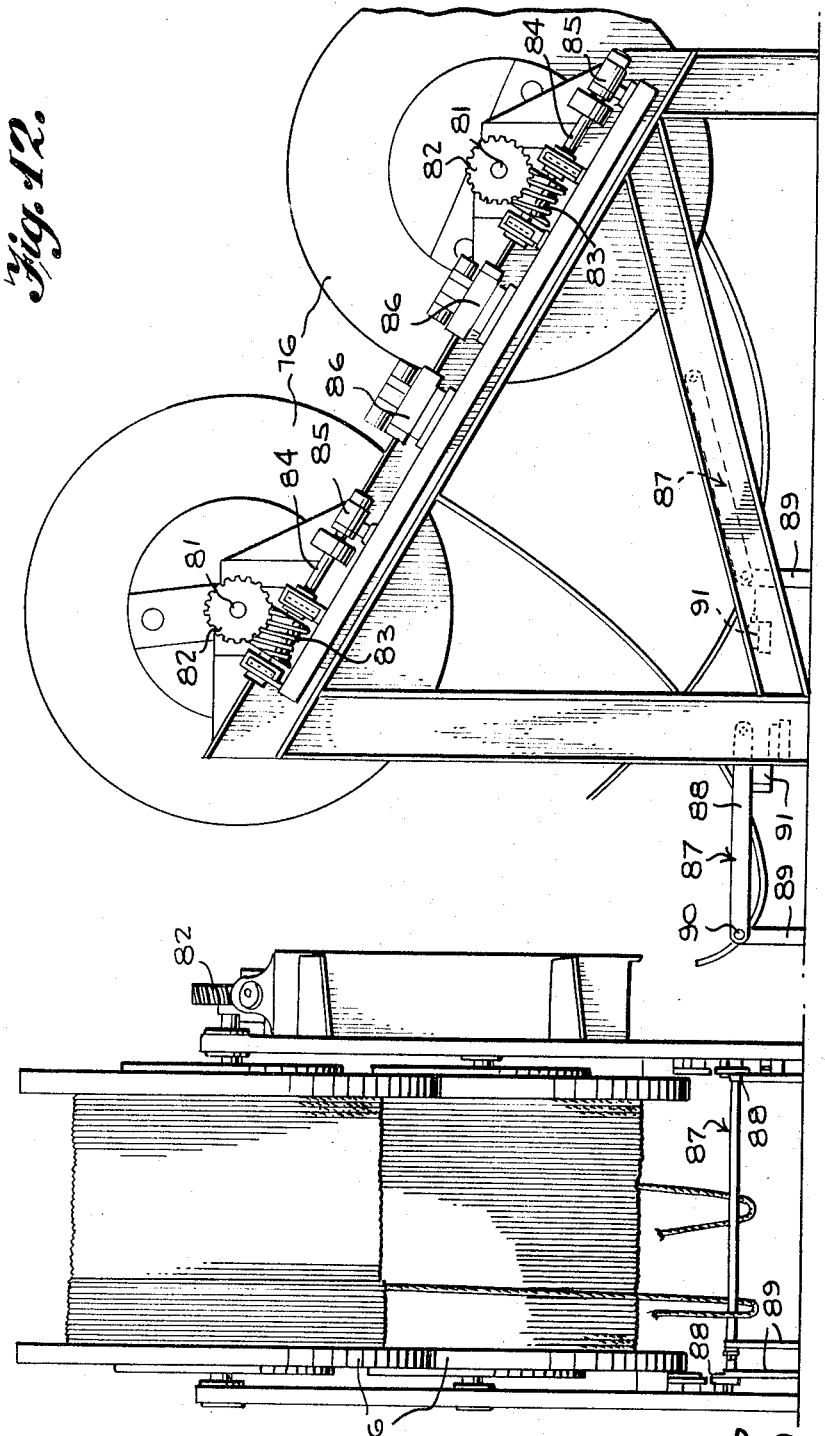

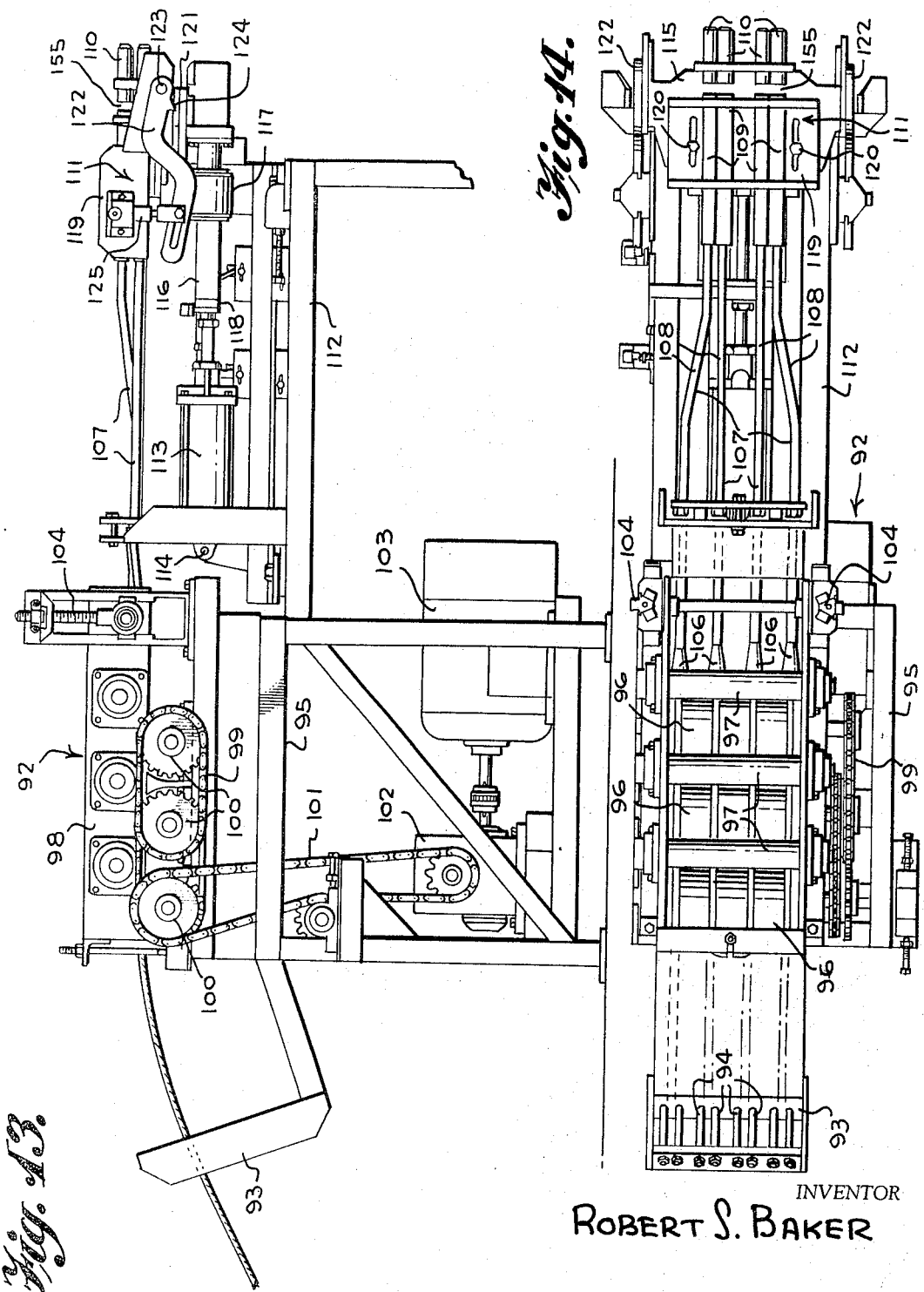

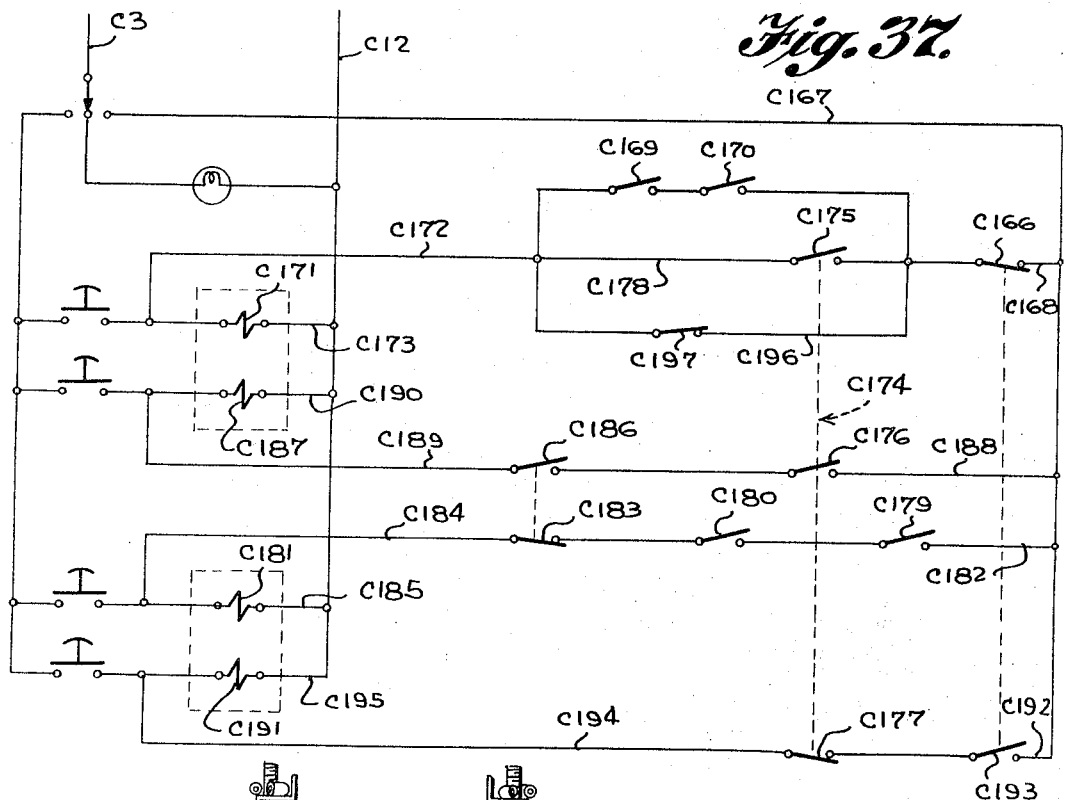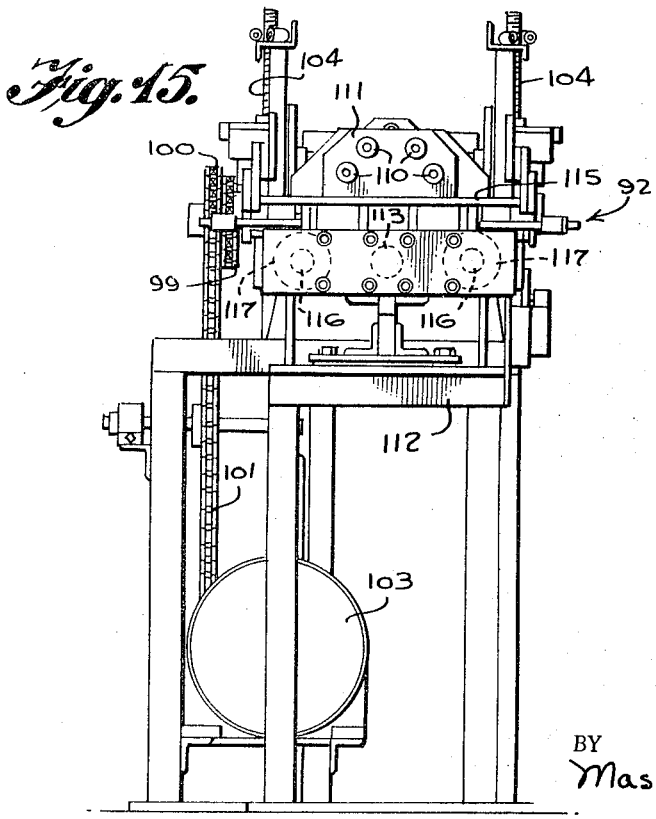

Feb. 28, 1967  R. S. BAKER  3,305,907
MACHINE FOR MAKING PRESTRESSED CONCRETE MEMBERS
Filed Feb. 11, 1964  41 Sheets-Sheet 17

INVENTOR
ROBERT S. BAKER

BY Mason, Fenwick & Lawrence
ATTORNEYS

Feb. 28, 1967 R. S. BAKER 3,305,907
MACHINE FOR MAKING PRESTRESSED CONCRETE MEMBERS
Filed Feb. 11, 1964 41 Sheets-Sheet 18

INVENTOR
ROBERT S. BAKER
BY Mason, Fenwick & Lawrence
ATTORNEYS

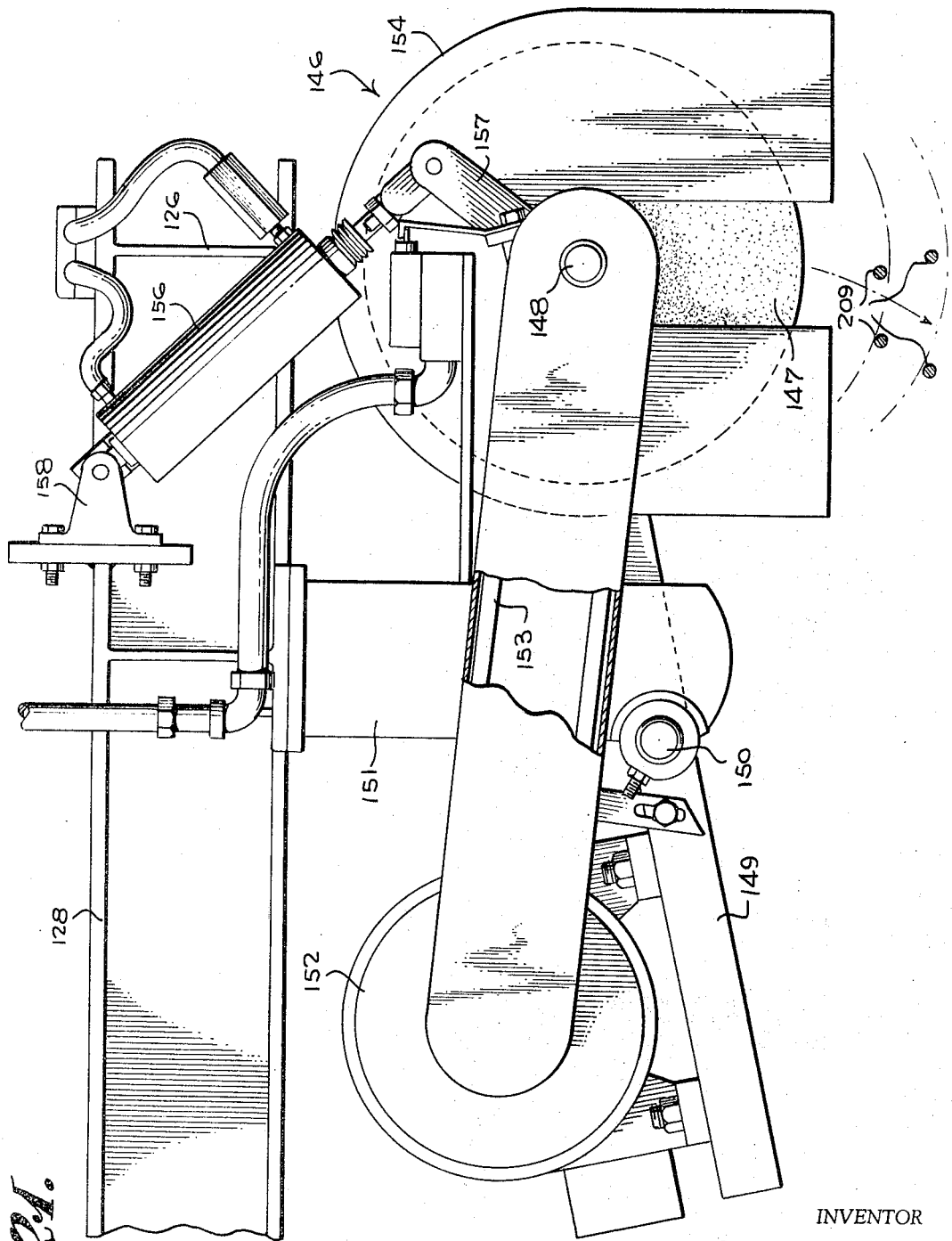

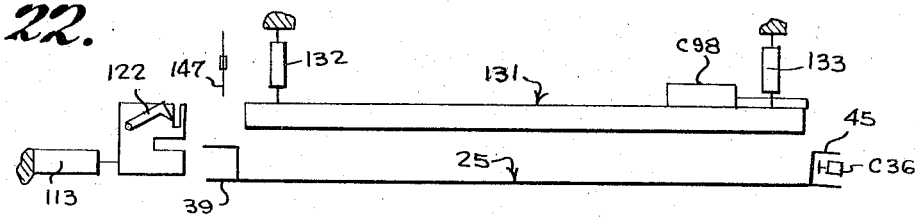
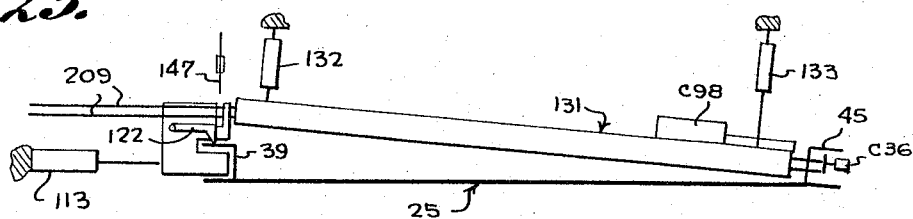
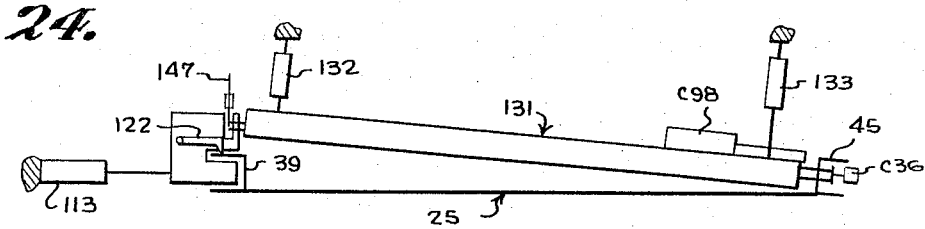
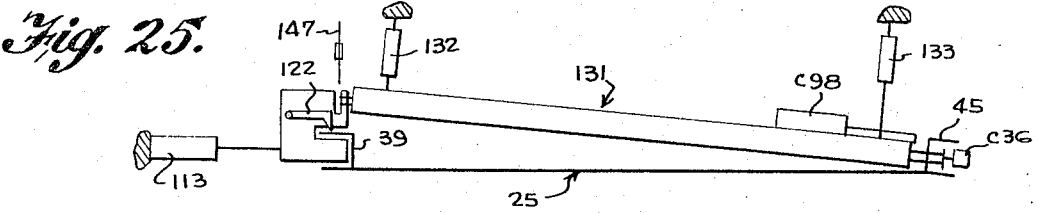
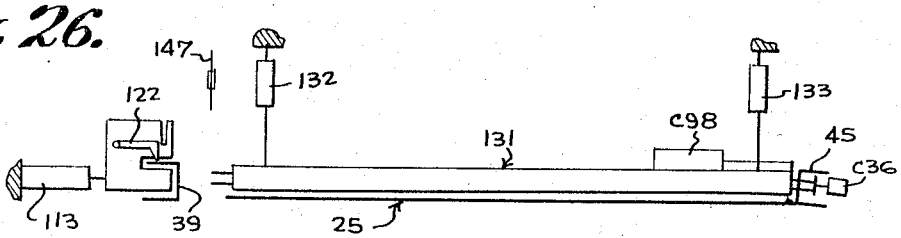

INVENTOR
ROBERT S. BAKER

BY Mason, Fenwick & Lawrence
ATTORNEYS

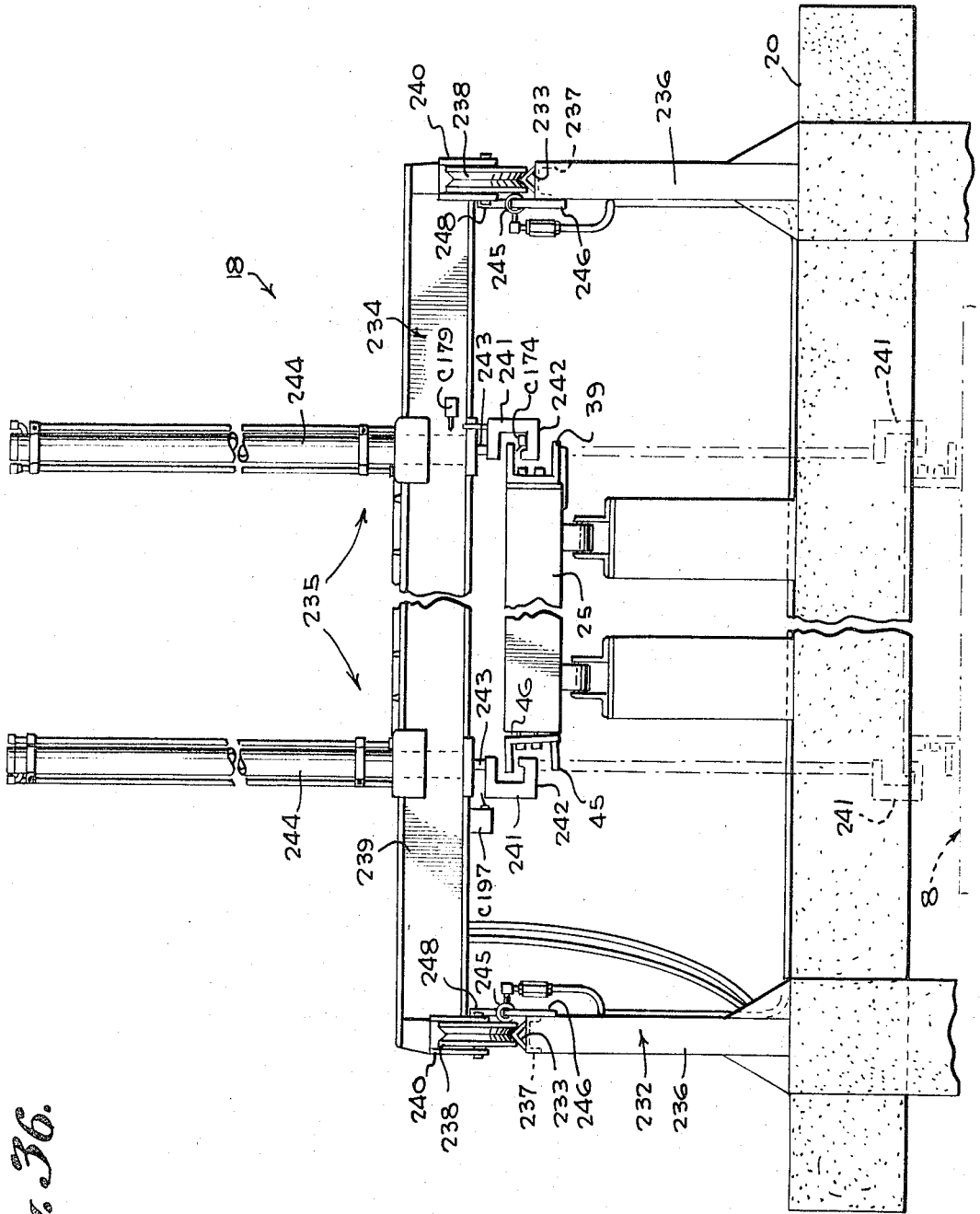

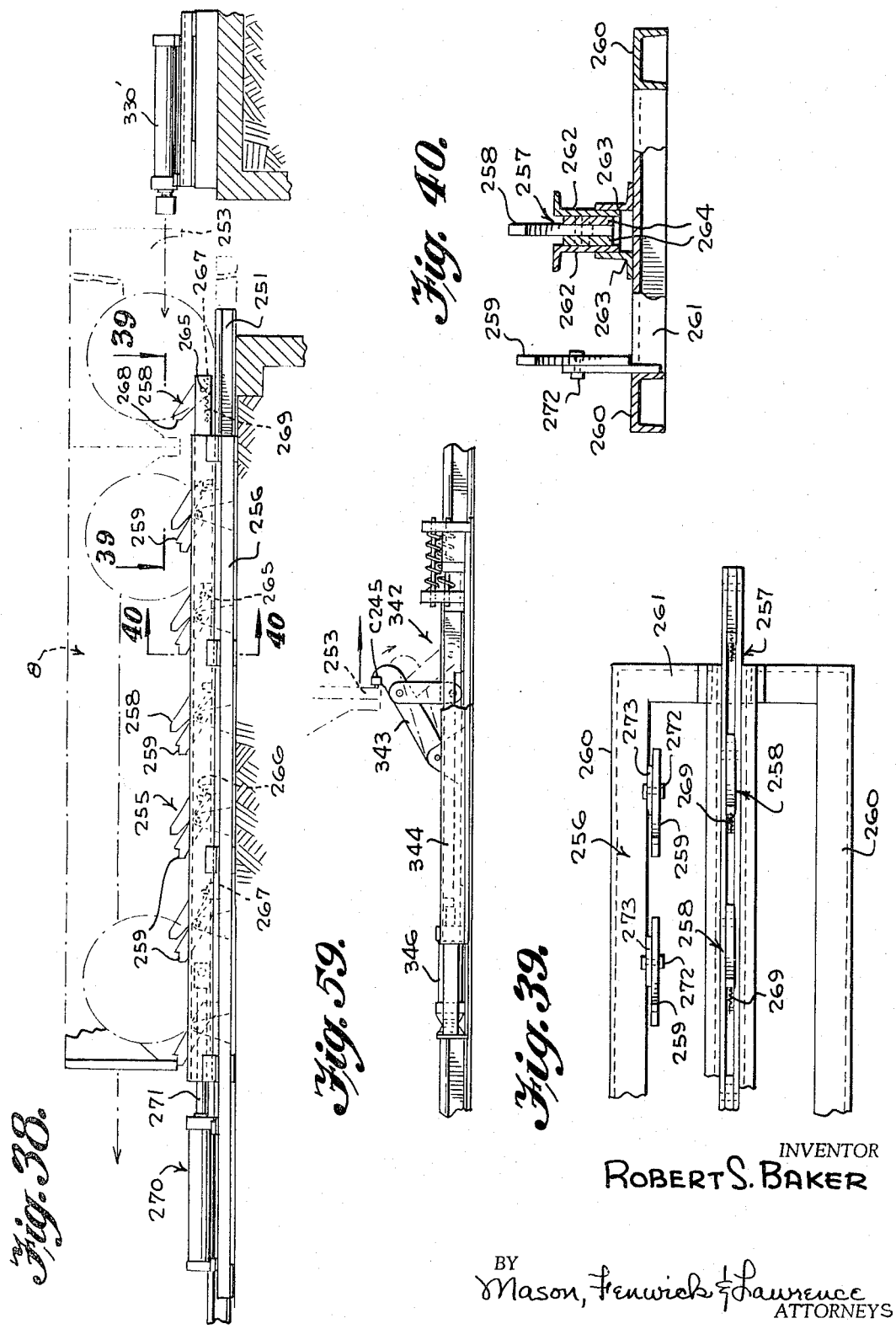

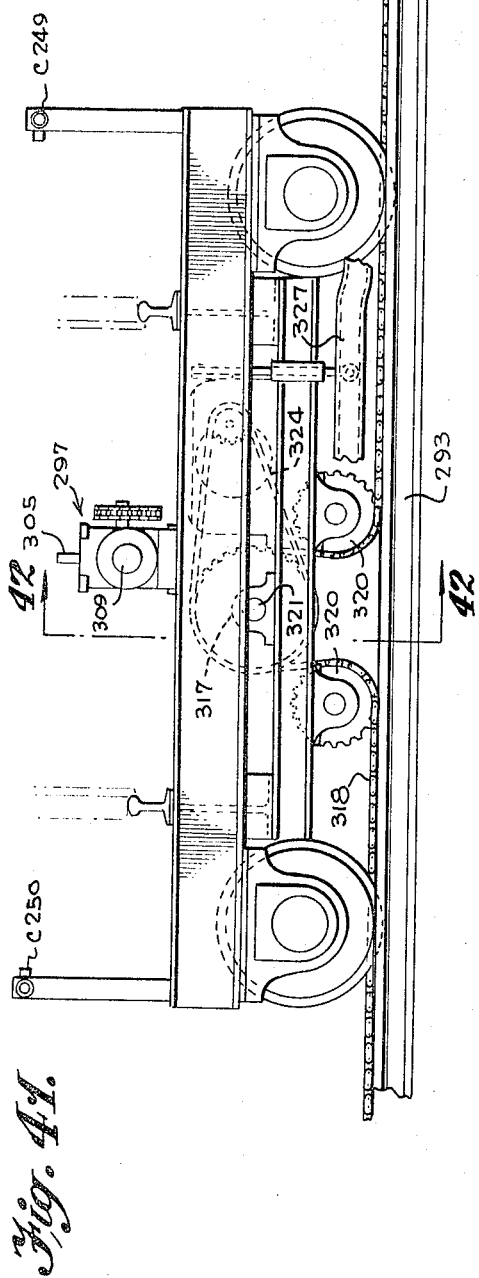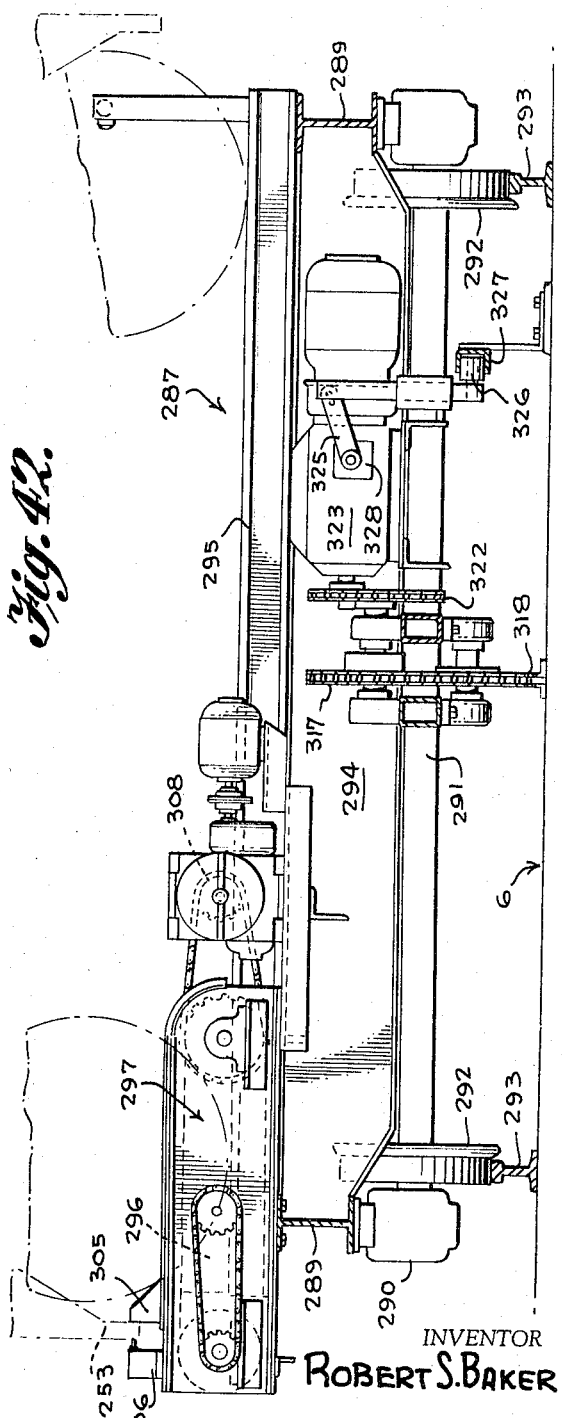

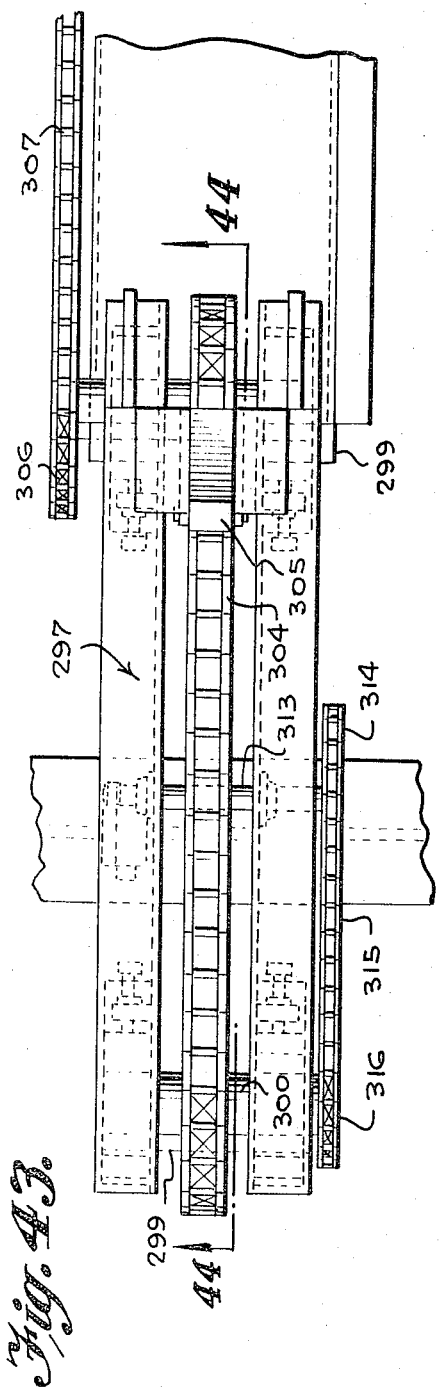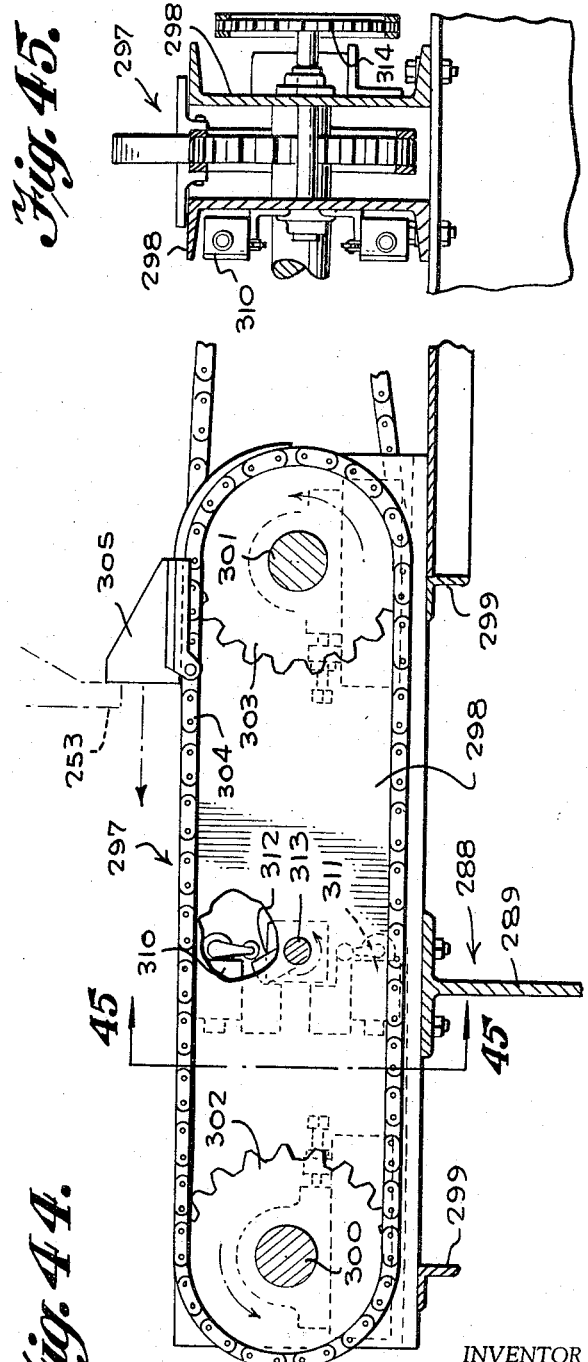

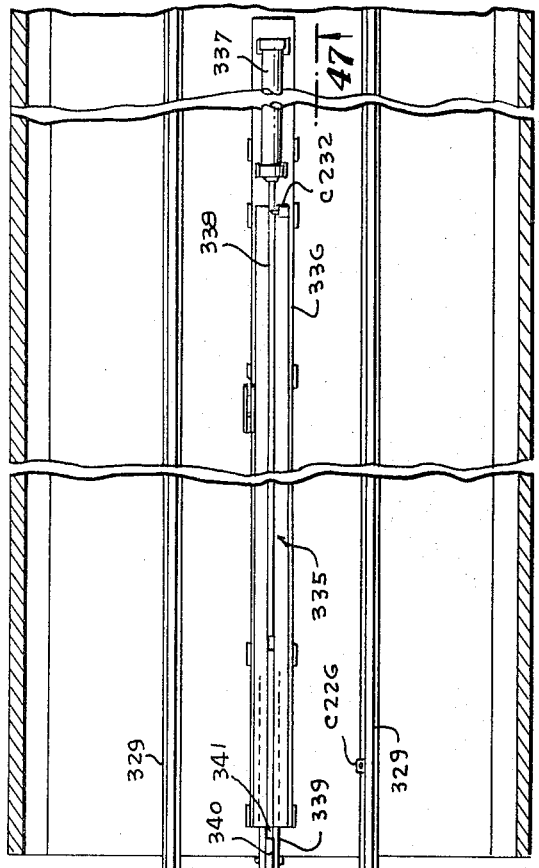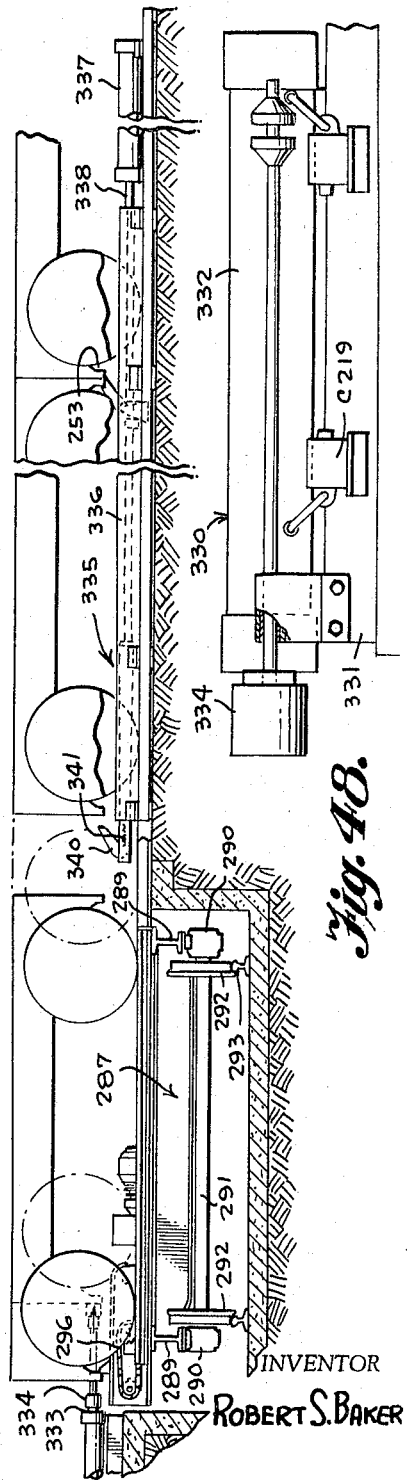

Feb. 28, 1967   R. S. BAKER   3,305,907
MACHINE FOR MAKING PRESTRESSED CONCRETE MEMBERS
Filed Feb. 11, 1964   41 Sheets-Sheet 34

*Fig. 52.*

INVENTOR
ROBERT S. BAKER

BY Mason, Fenwick & Lawrence
ATTORNEYS

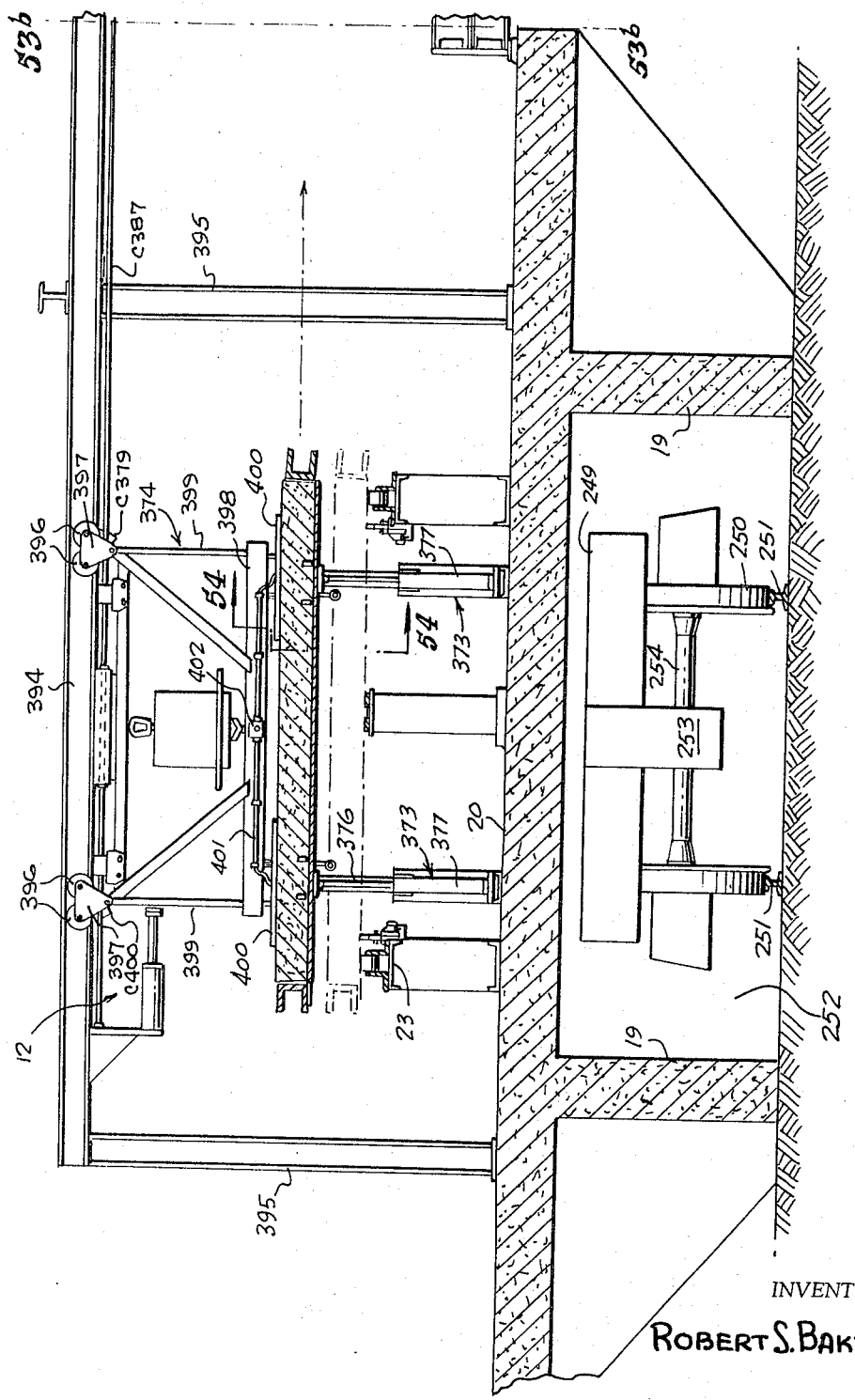

Feb. 28, 1967   R. S. BAKER   3,305,907
MACHINE FOR MAKING PRESTRESSED CONCRETE MEMBERS
Filed Feb. 11, 1964   41 Sheets-Sheet 36
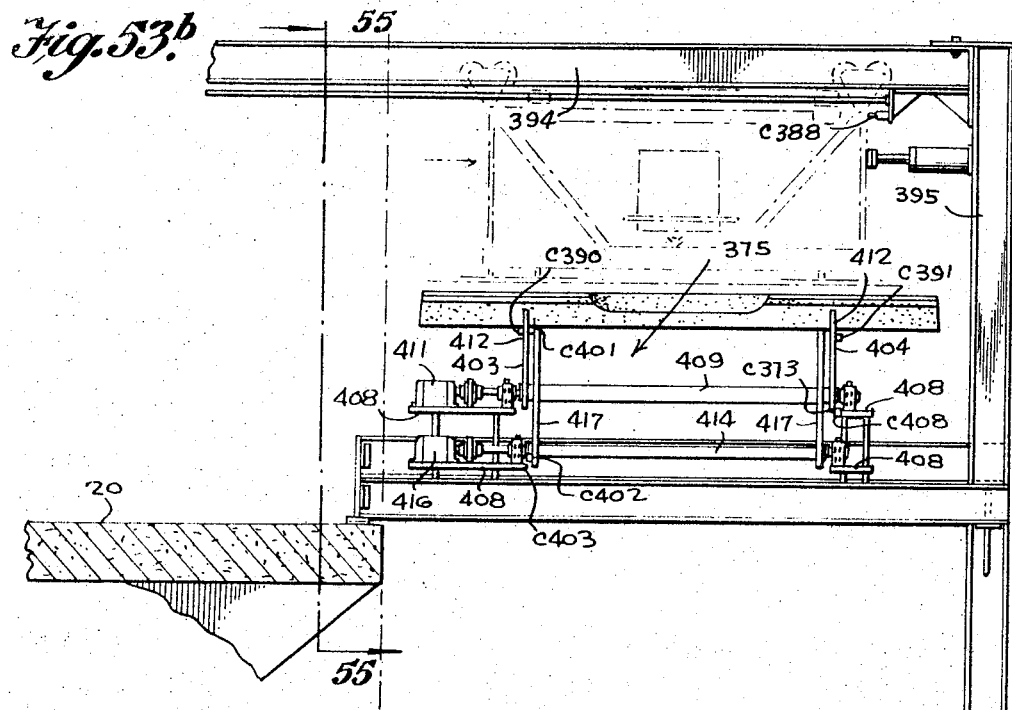
Fig. 53b
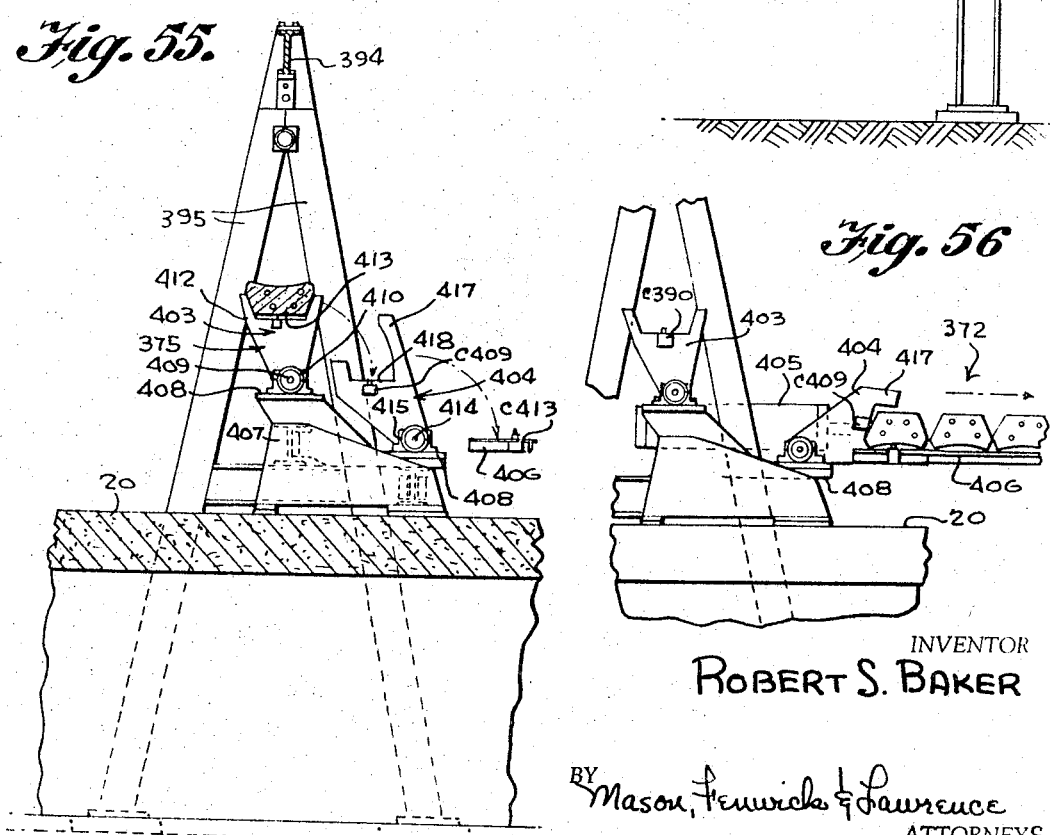
Fig. 55
Fig. 56
INVENTOR
ROBERT S. BAKER
BY Mason, Fenwick & Lawrence
ATTORNEYS Feb. 28, 1967 R. S. BAKER 3,305,907
MACHINE FOR MAKING PRESTRESSED CONCRETE MEMBERS
Filed Feb. 11, 1964 41 Sheets-Sheet 37

INVENTOR
Robert S. Baker
BY Mason, Fenwick & Lawrence
ATTORNEYS

INVENTOR
Robert S. Baker

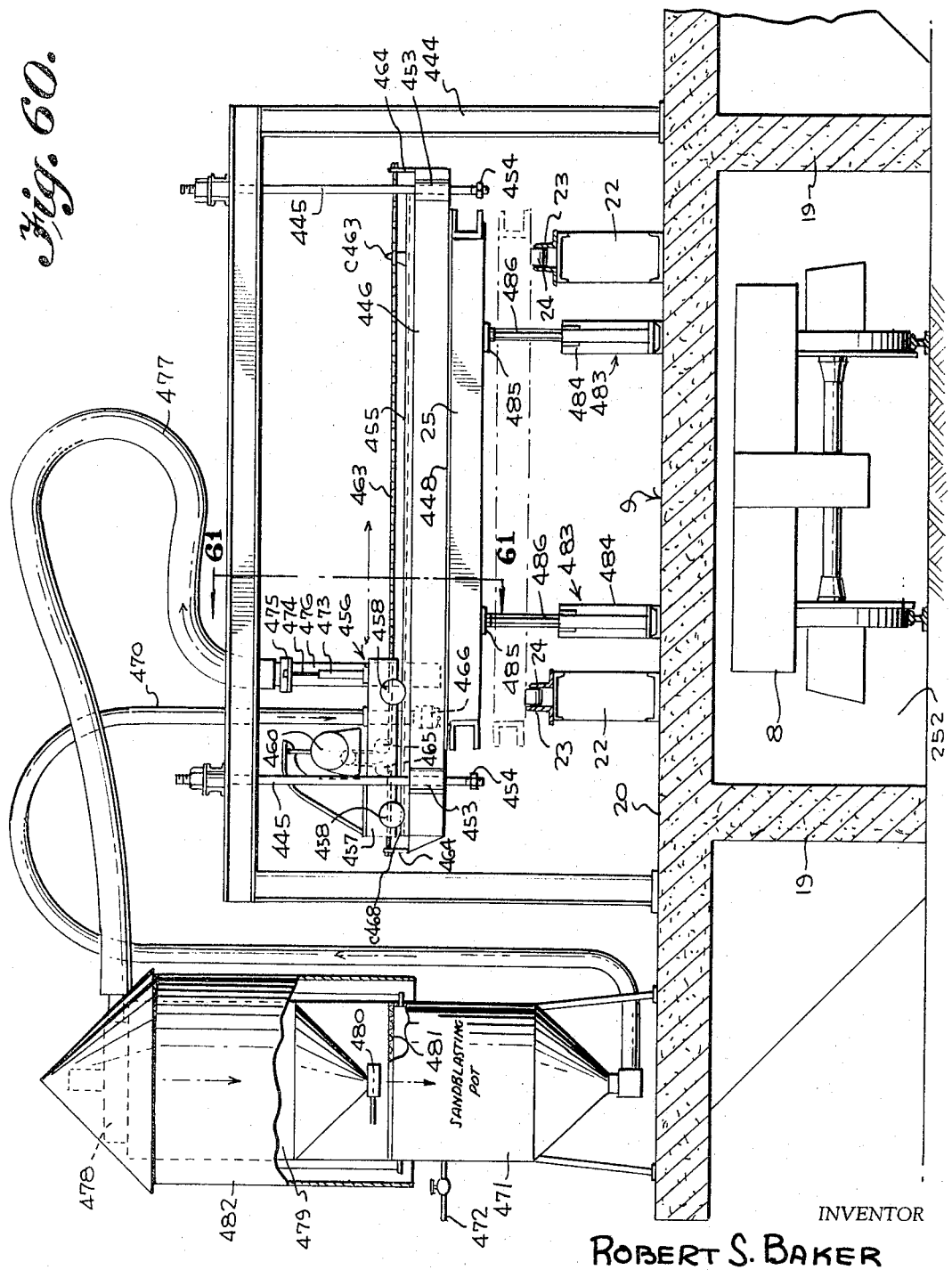

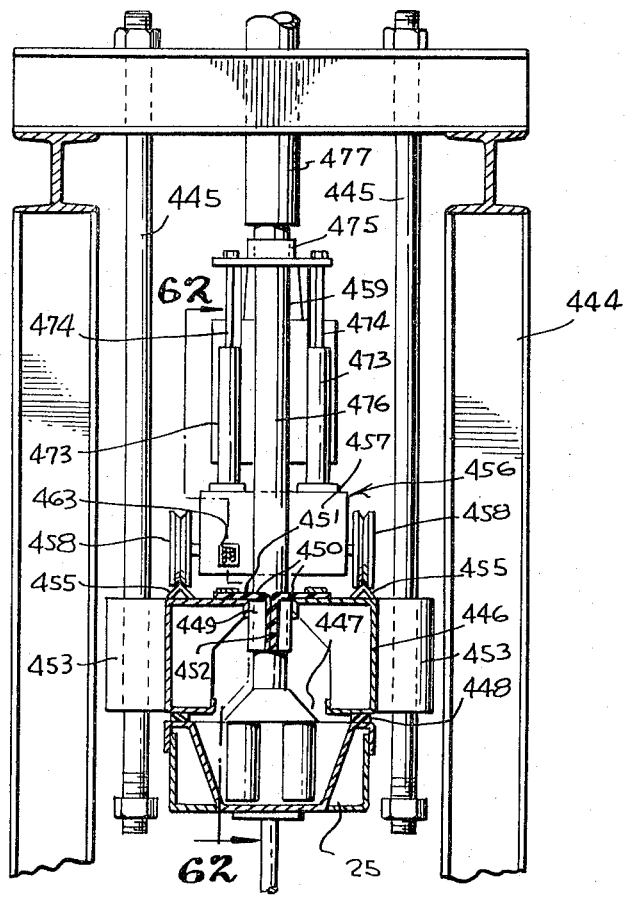
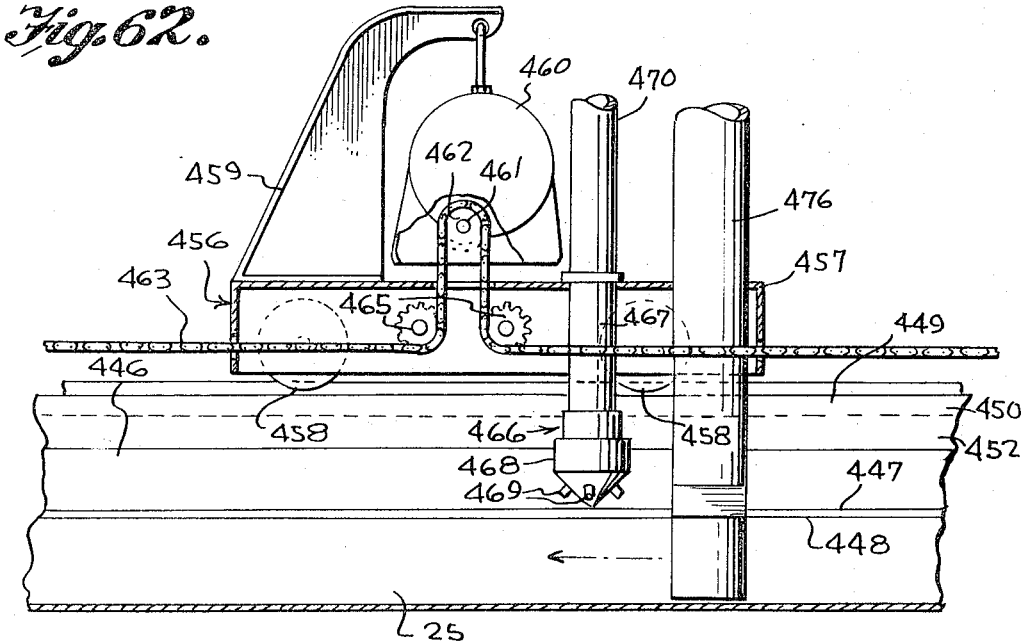

United States Patent Office 3,305,907
Patented Feb. 28, 1967

3,305,907
MACHINE FOR MAKING PRESTRESSED
CONCRETE MEMBERS
Robert S. Baker, Tampa, Fla., assignor, by mesne assignments, to American Concrete Crosstie Corporation, Tampa, Fla., a corporation of Florida
Filed Feb. 11, 1964, Ser. No. 344,095
24 Claims. (Cl. 25—2)

This invention relates to apparatus for making concrete members, and particularly to such apparatus for automatically making prestressed concrete members, such, for example, as railroad ties.

In my co-pending application, Serial No. 844,441 filed October 5, 1959, now Patent No. 3,128,521 issued April 14, 1964, and entitled "Apparatus for Molding Prestressed Concrete Members," there is disclosed a machine for making prestressed concrete railroad ties, wherein pallets of particular construction are loaded onto the machine, oriented relative to the machine, and carried through a plurality of operating stations. The pallet is a self-contained unit having means for receiving stressing cables and holding them stressed while the concrete member is poured and cured. The several stations through which the pallets pass allow cables to be placed in, and attached to, the pallets, the cables tensioned, concrete poured and compacted on the pallet, and the pallet with its finished member of green concrete and the cables held under tension is removed from the machine.

The machine forming the subject matter of the prior application, while including a sound basic principle and operating structure, is quite expensive to build, and includes only the necessary mechanisms to form concrete members such as ties. The pallets have to be loaded on the machine and unloaded therefrom manually, and require special handling during curing of the concrete members and removal of the members from the pallets.

The general object of the present invention is to provide improved apparatus for making prestressed concrete members, which will automatically perform the entire operation of preparing the pallets, forming the prestressed members, curing them and removing the cured members from the pallets.

A more specific object of the invention is to provide prestressed concrete member-making apparatus which casts the members on a pallet having means independent of the apparatus for holding the stressing cables tensioned during molding and curing, wherein the pallets are loaded during passage along a member-forming machine, transferred onto cars, carried through a curing tunnel, and back to the opposite end of the member-forming machine where they are re-transferred to the member-forming machine for removal of the cast and cured members.

Another object is the provision of such apparatus which will provide a pallet transporting system operating through a closed path, or orbit, picking up pallets with freshly cast members from the forming-machine at one point in the orbit, carrying them through a curing tunnel, and, at another point in the orbit, reloading the pallets on the forming-machine, the transporting means continuing its orbit unloaded from the point of deposit of the pallets on the forming-machine to the point of loading pallets from the forming-machine.

A still more specific object of the invention is to provide improved means for positioning cable in a pallet and anchoring it in place prior to stressing.

Another object is to provide novel means for tensioning, and holding tensioned, the stressing cables.

A further object is the provision of improved vibrating means to ensure proper settling and packing of green concrete in the mold, to attain desired density and a cast member which is immediately shape-retaining.

Still another object is to provide novel means for loading and unloading the pallets to and from the member-forming machine.

It is also an object to provide a new type of transfer car to shift the pallet-transporting cars from the forming machine leg of their orbital paths to the curing tunnel leg and back.

An important object of the invention is to provide novel means for releasing the stressing cables from the pallet and removal of the cured concrete member from the pallet.

Other objects of the invention will become apparent from the following description of one practical embodiment thereof, when taken in conjunction with the drawings which accompany, and form part of, this specification.

In the drawings:

FIGURE 1 is a schematic plan view illustrating the layout of the entire apparatus of the present invention;

FIGURES 2a, 2b, 2c and 2d together show a section taken on the line 2—2 of FIGURE 1 and illustrate in side elevation the concrete member making machine;

FIGURE 3 is a horizontal section taken on the line 3—3 of FIGURE 2b showing the positions of the pallets at several of the stations of the machine;

FIGURE 4 is a vertical longitudinal section through a portion of the machine, including the cable stressing and molding stations;

FIGURE 5 is a fragmentary longitudinal section through a portion of the machine at the anchor inserting station;

FIGURE 6 is a view similar to FIGURE 5 showing an anchor in place;

FIGURE 7 is a perspective view of the one of the anchors;

Figure 63:
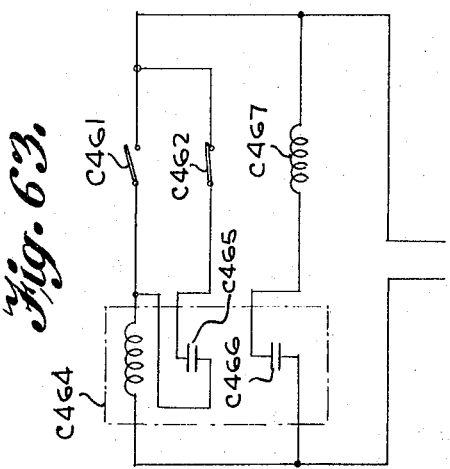
Figure 8C:
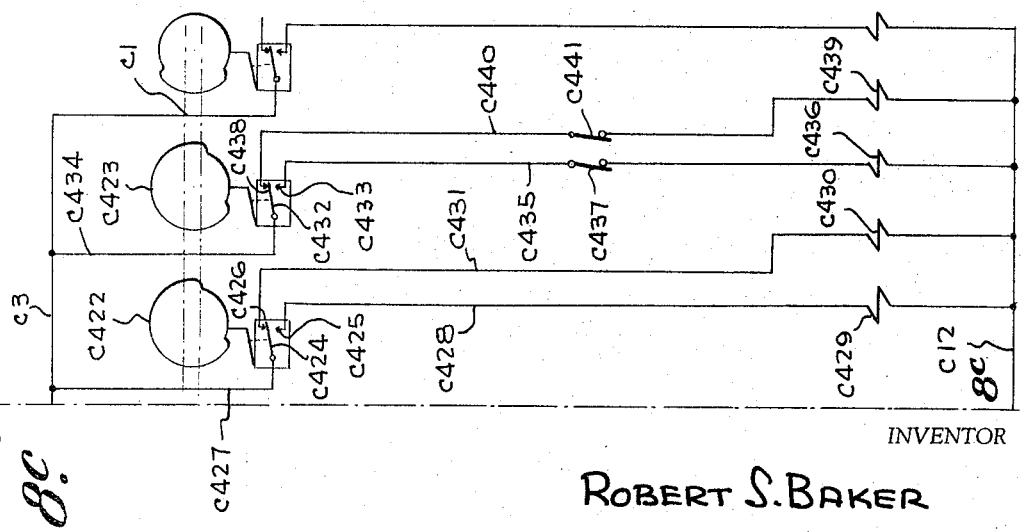
Figure 16:
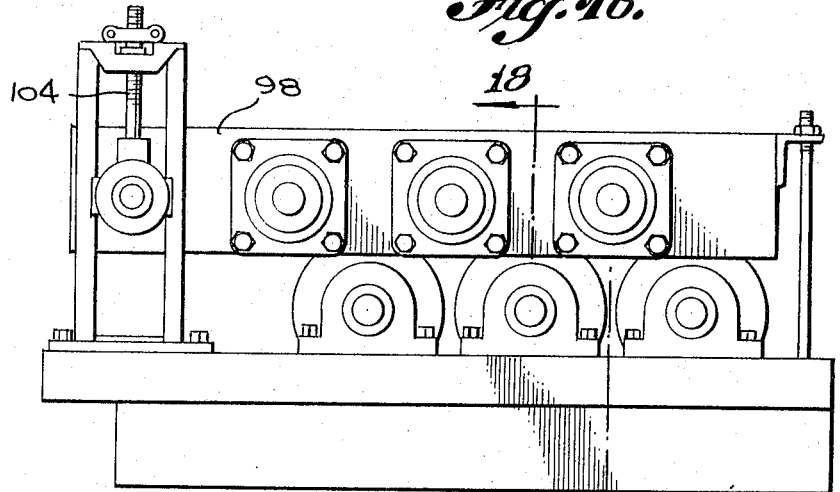
Figure 17:
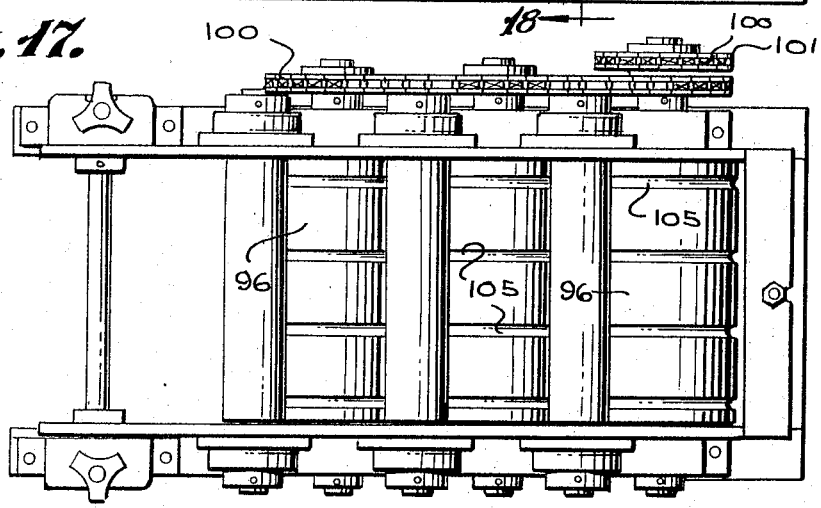
Figure 18:
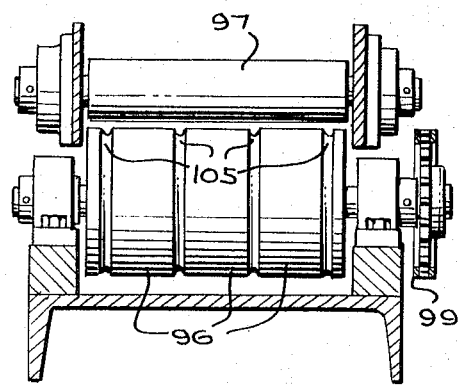
Figure 19:
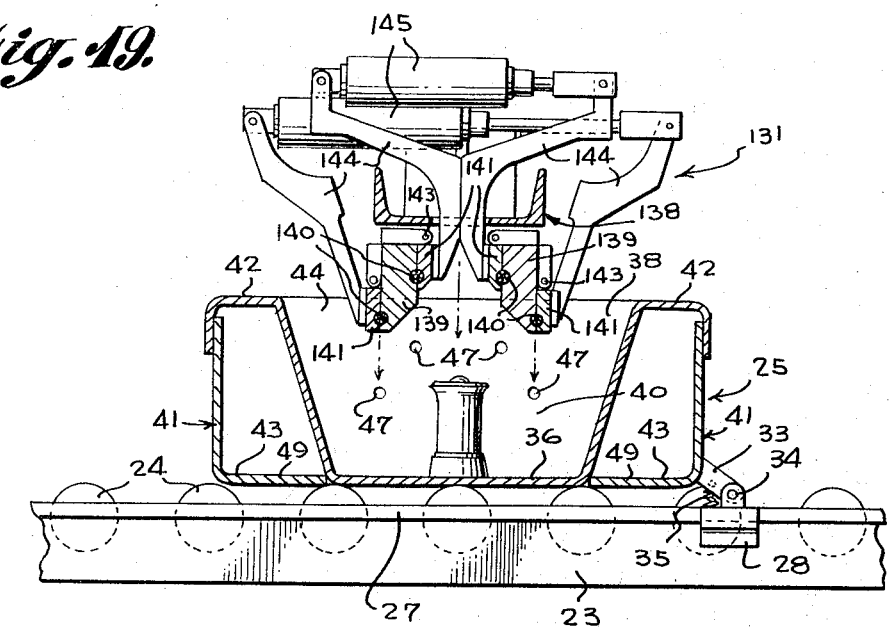
Figure 20:
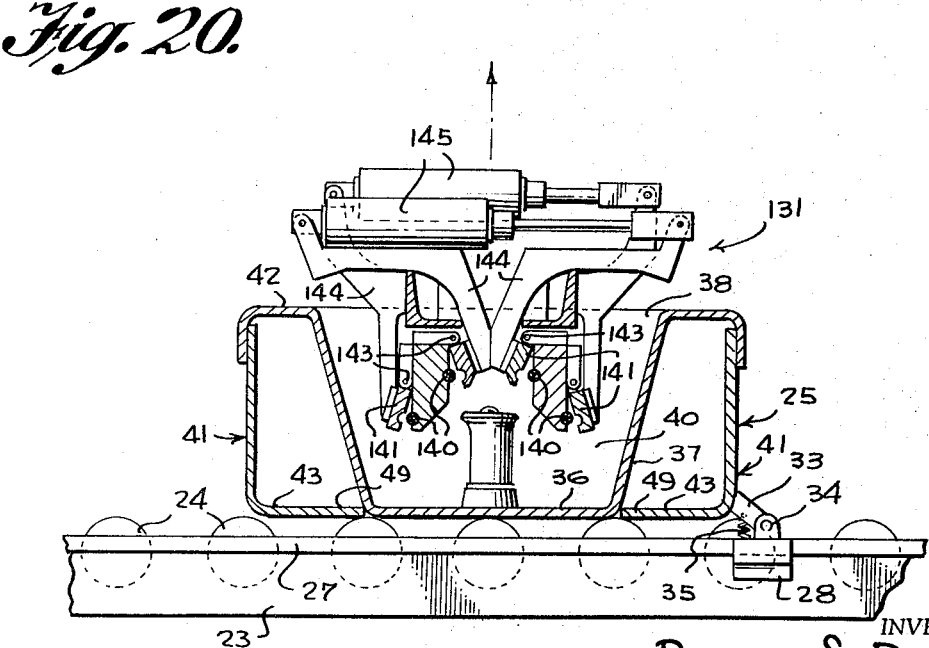
Figure 31:
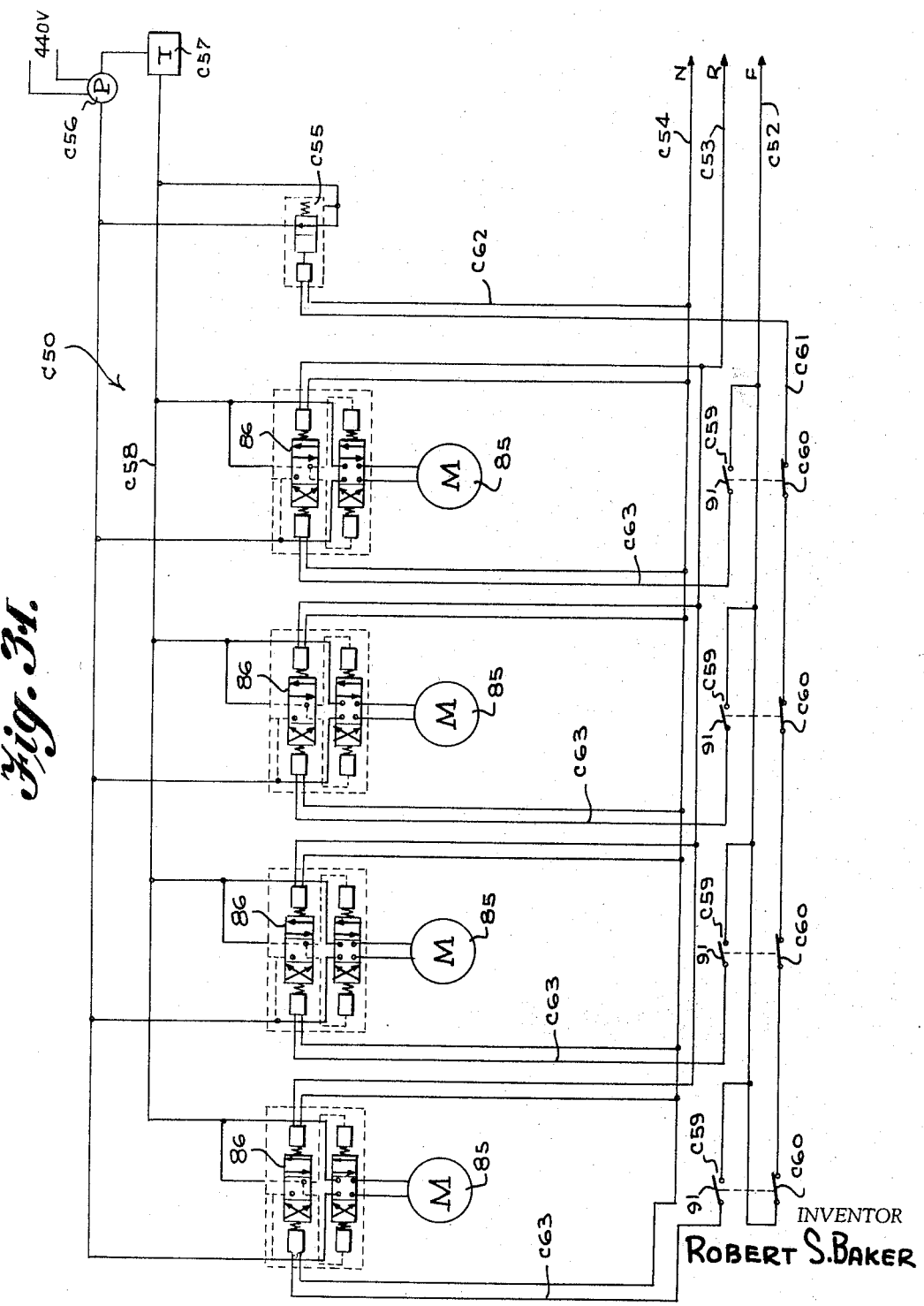
Figure 32:
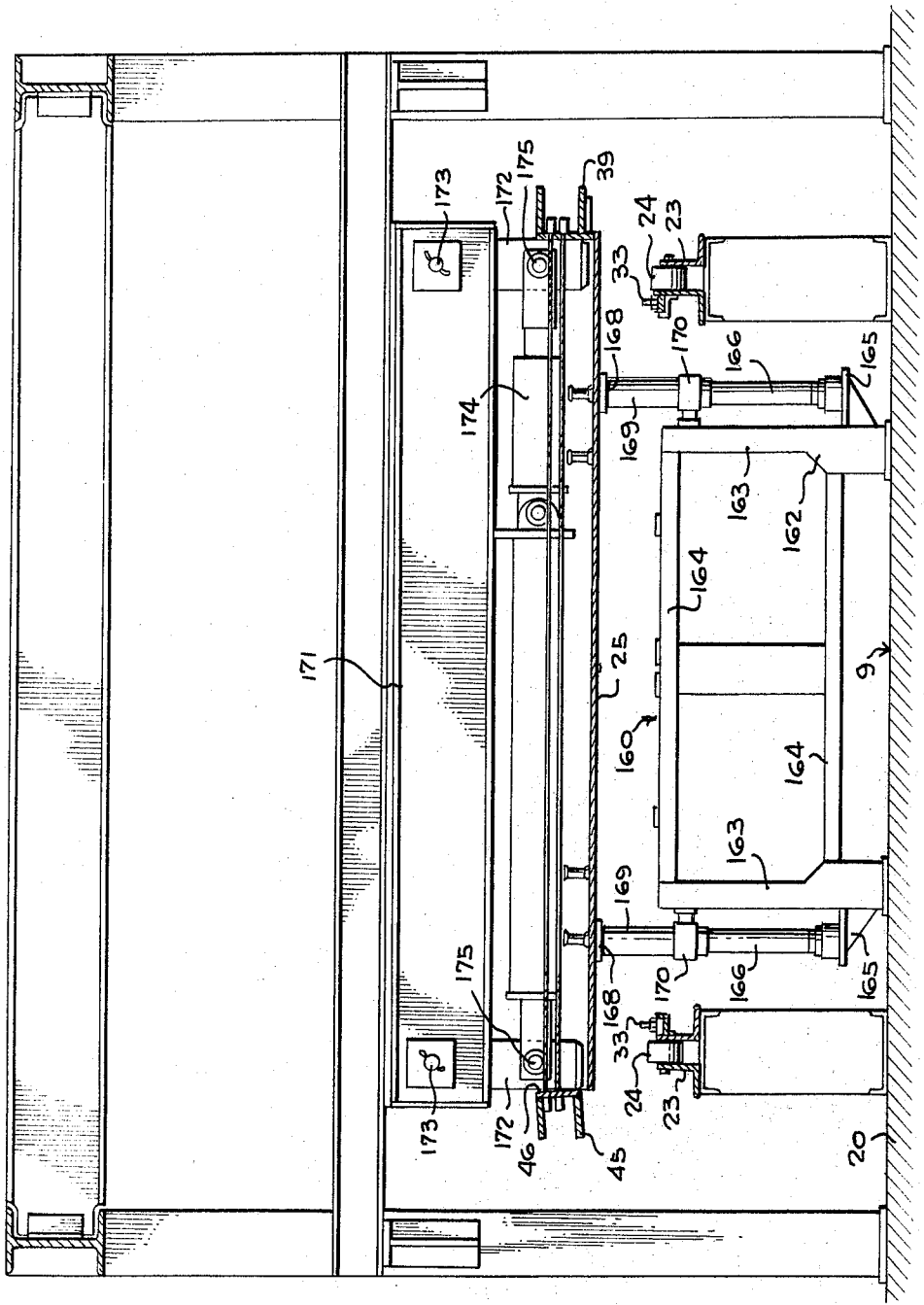
Figure 33:
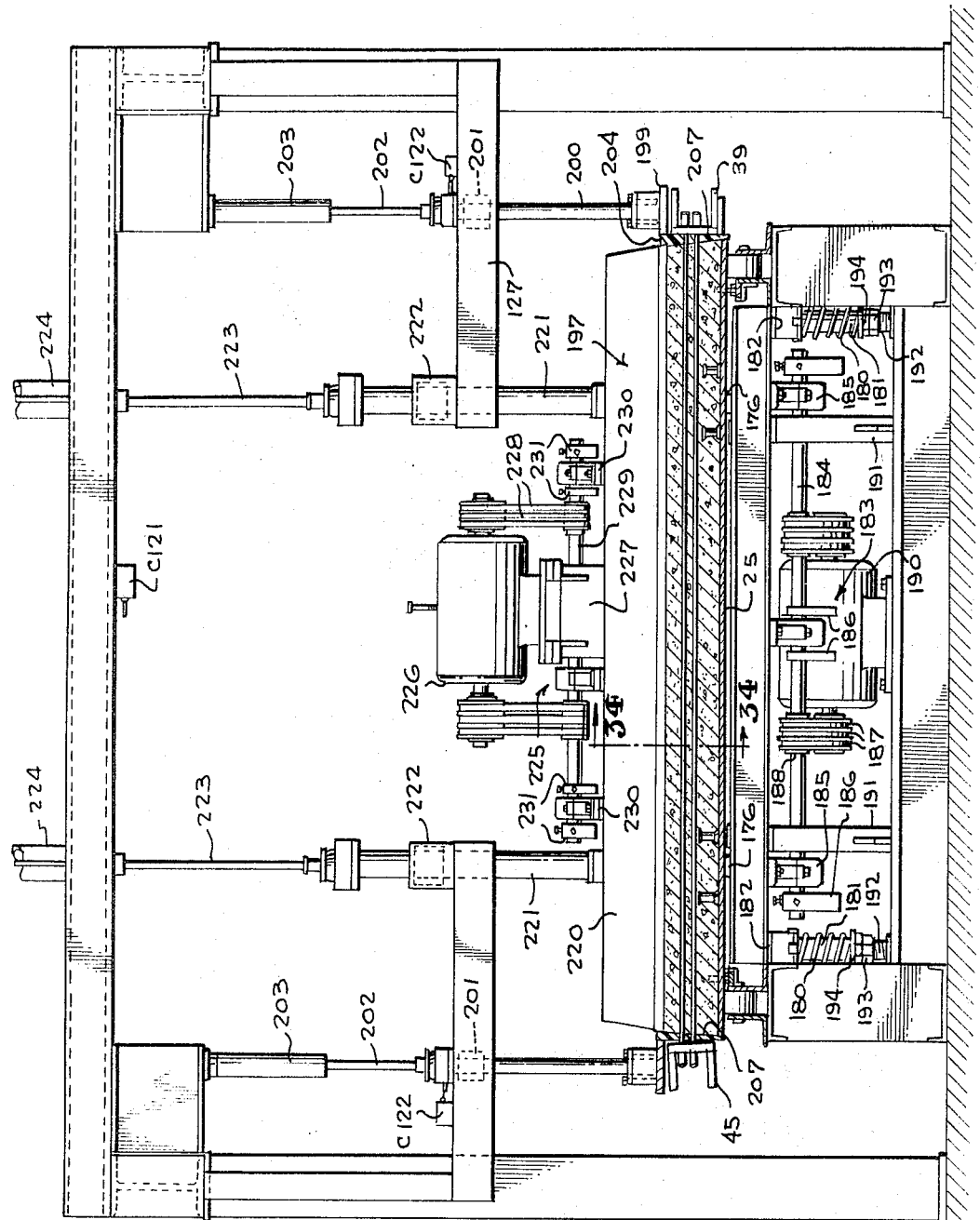
Figure 34:
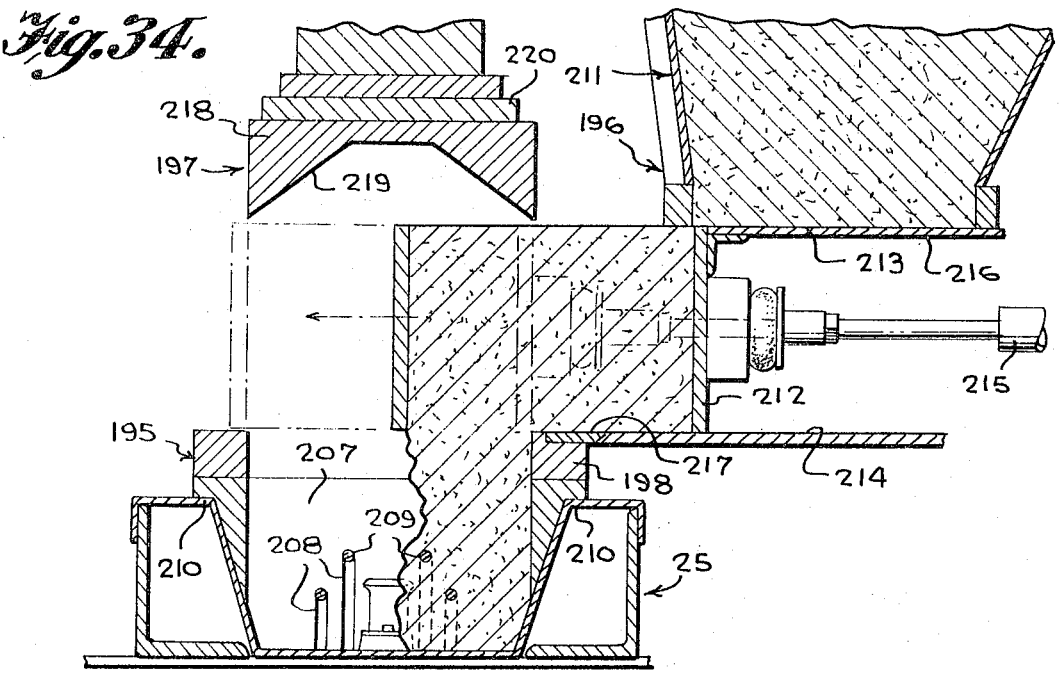
Figure 35:
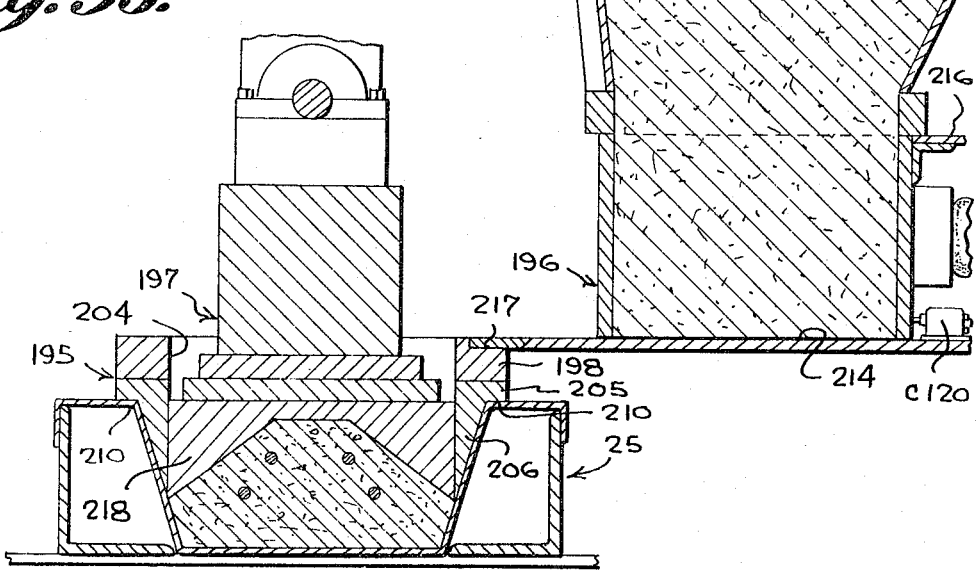
Figure 49:
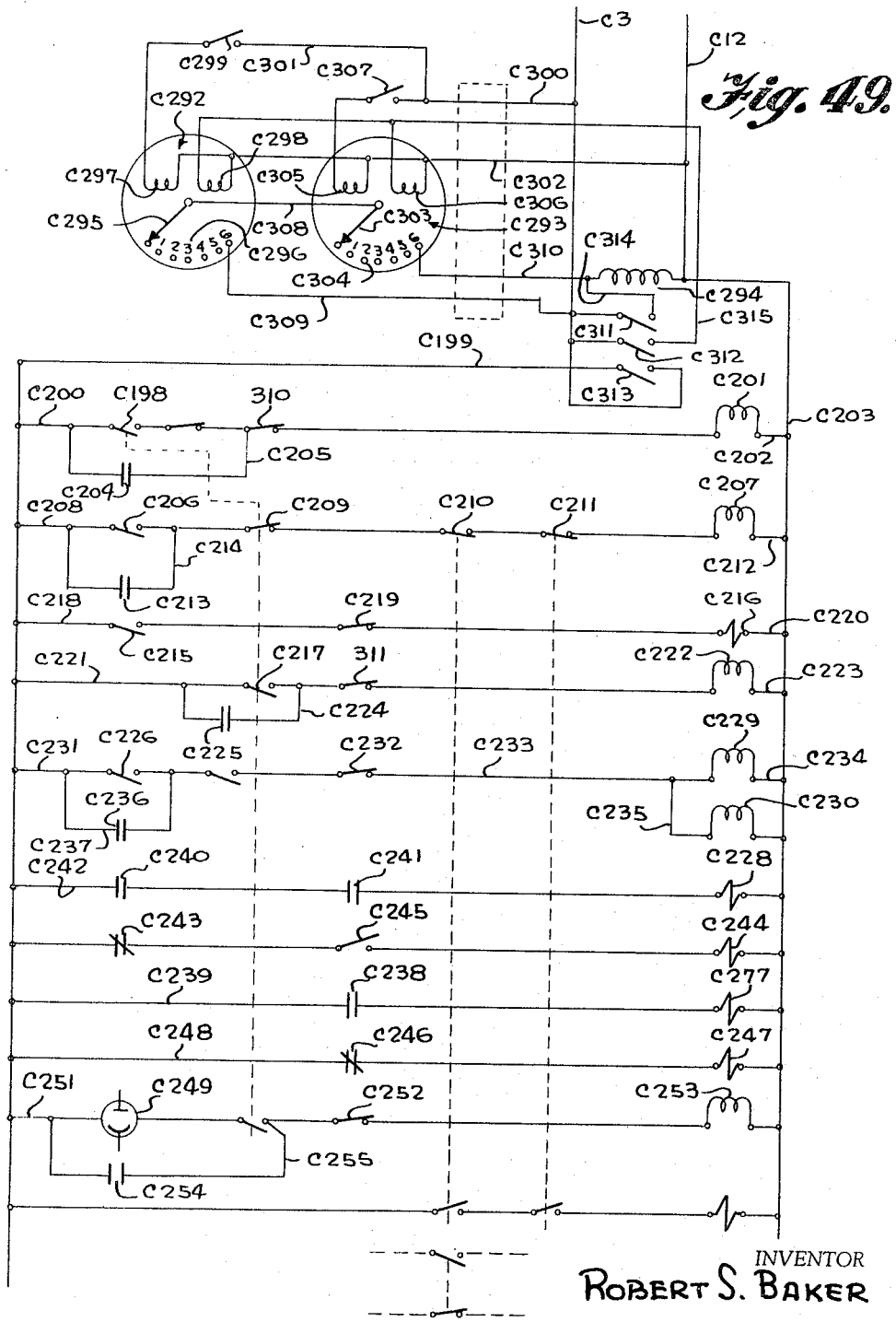
Figure 50:
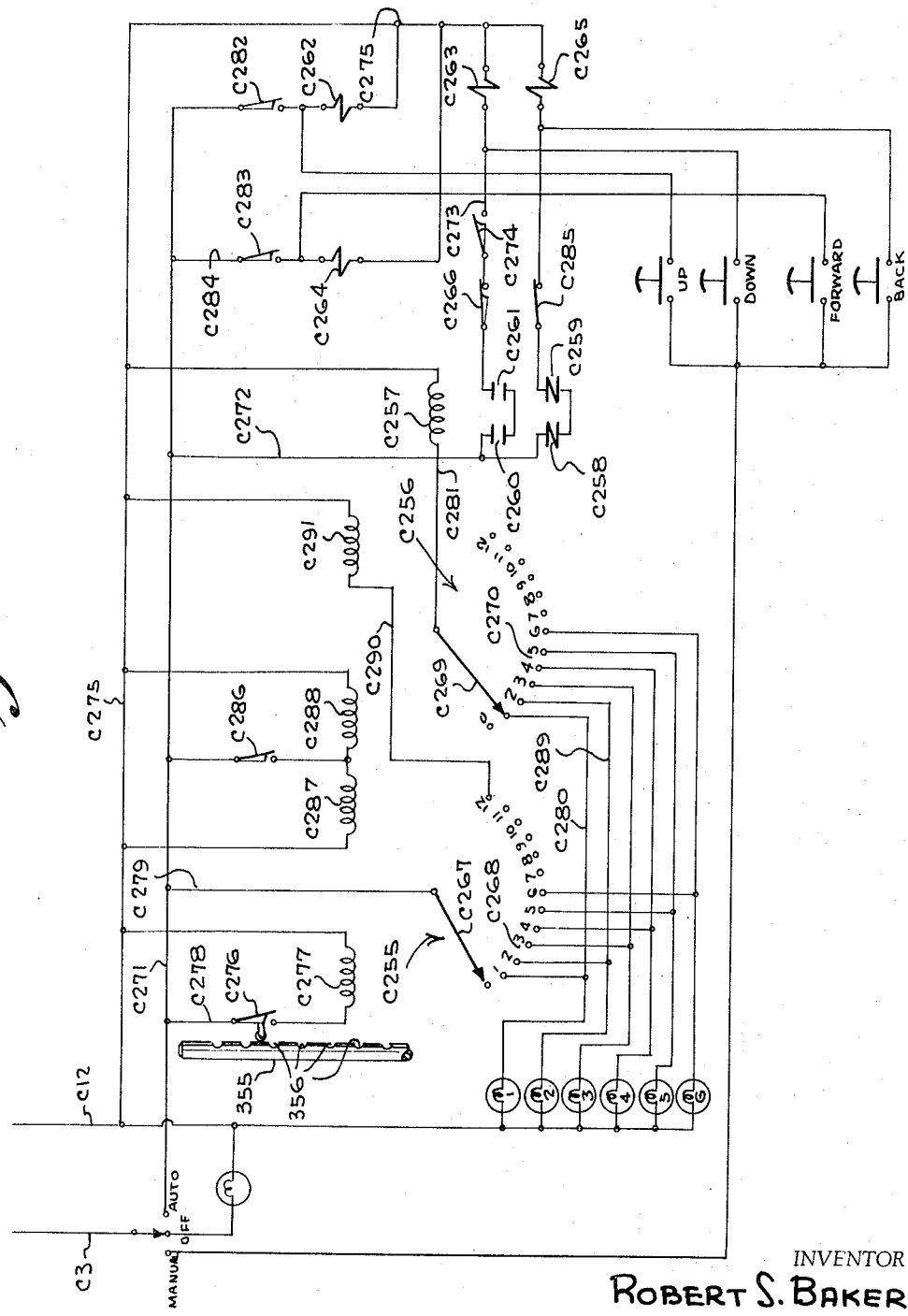
Figure 51:
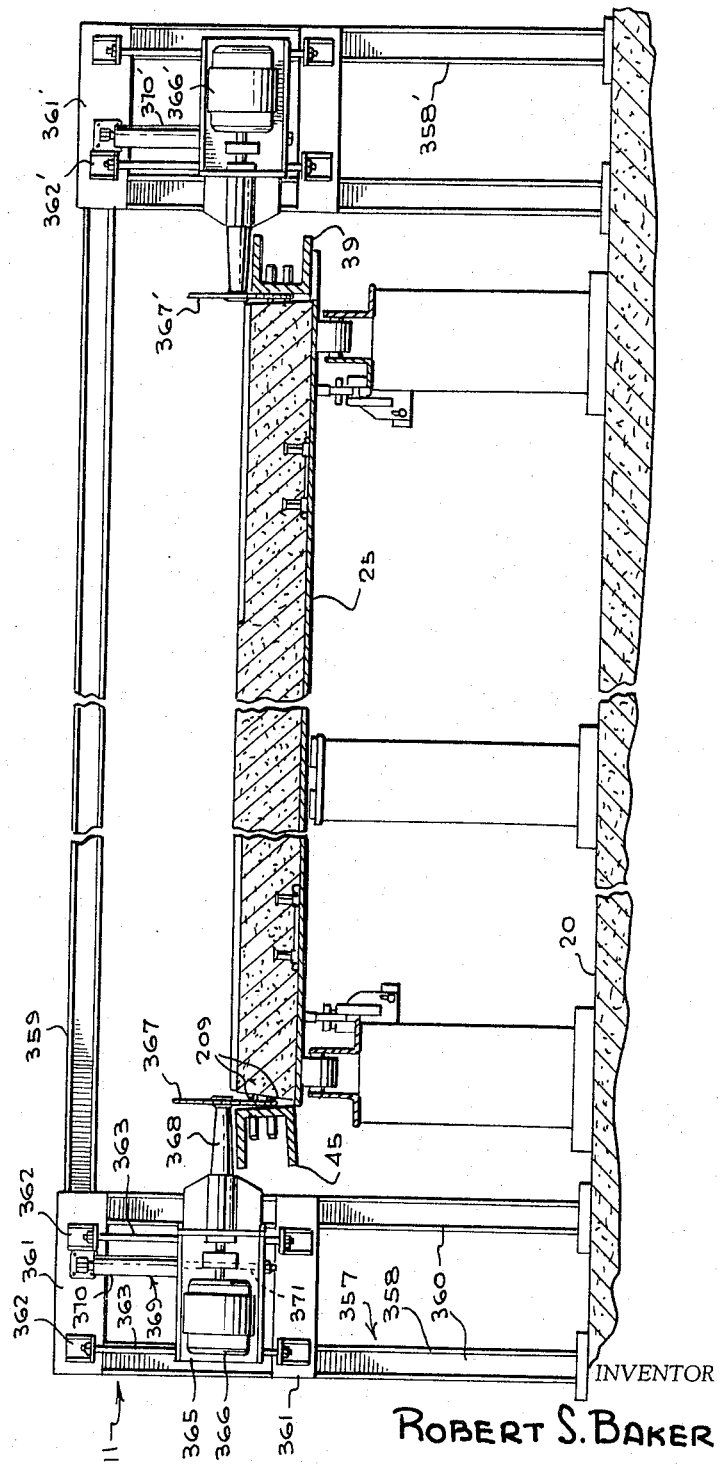
Figure 54:
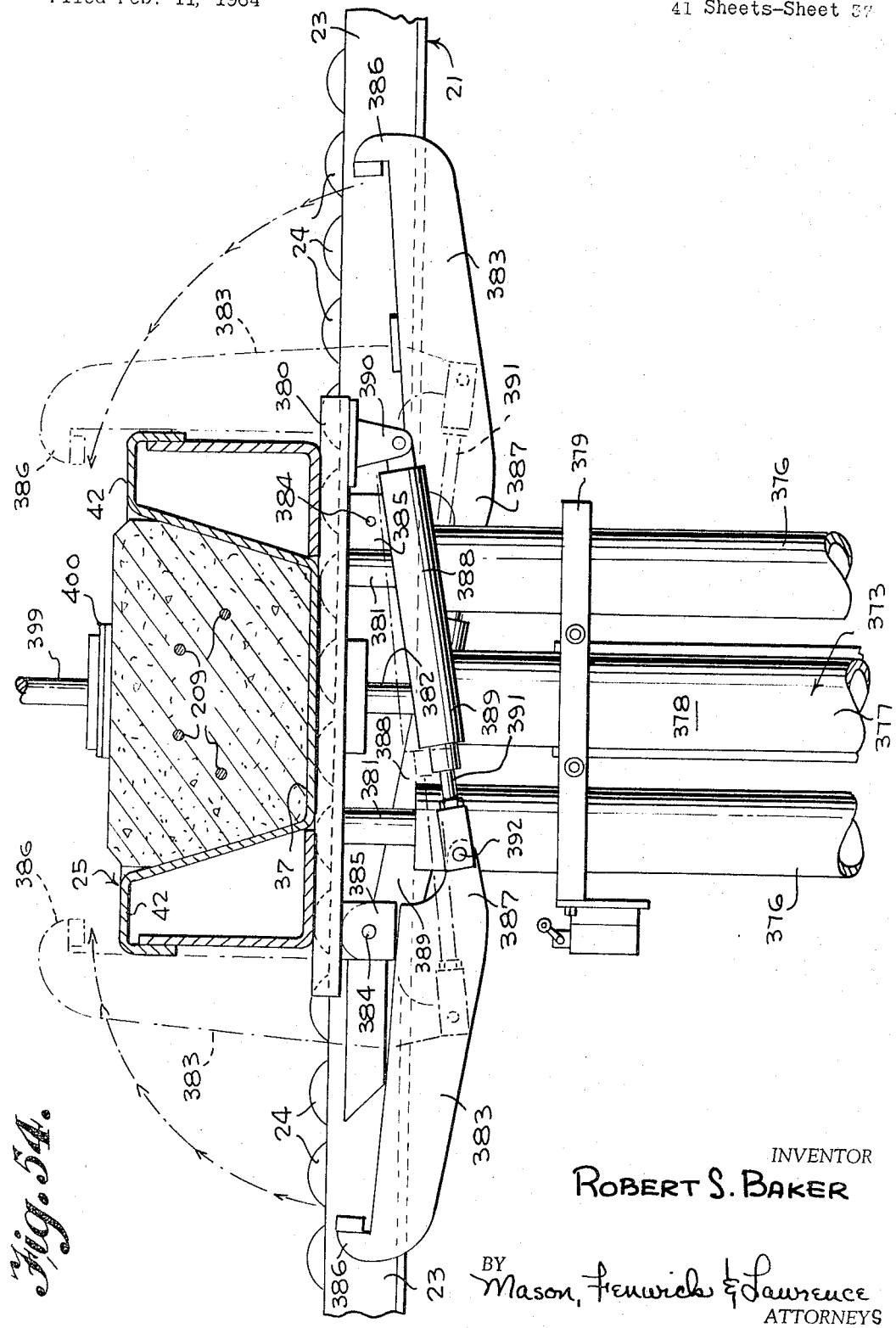
Figure 57:
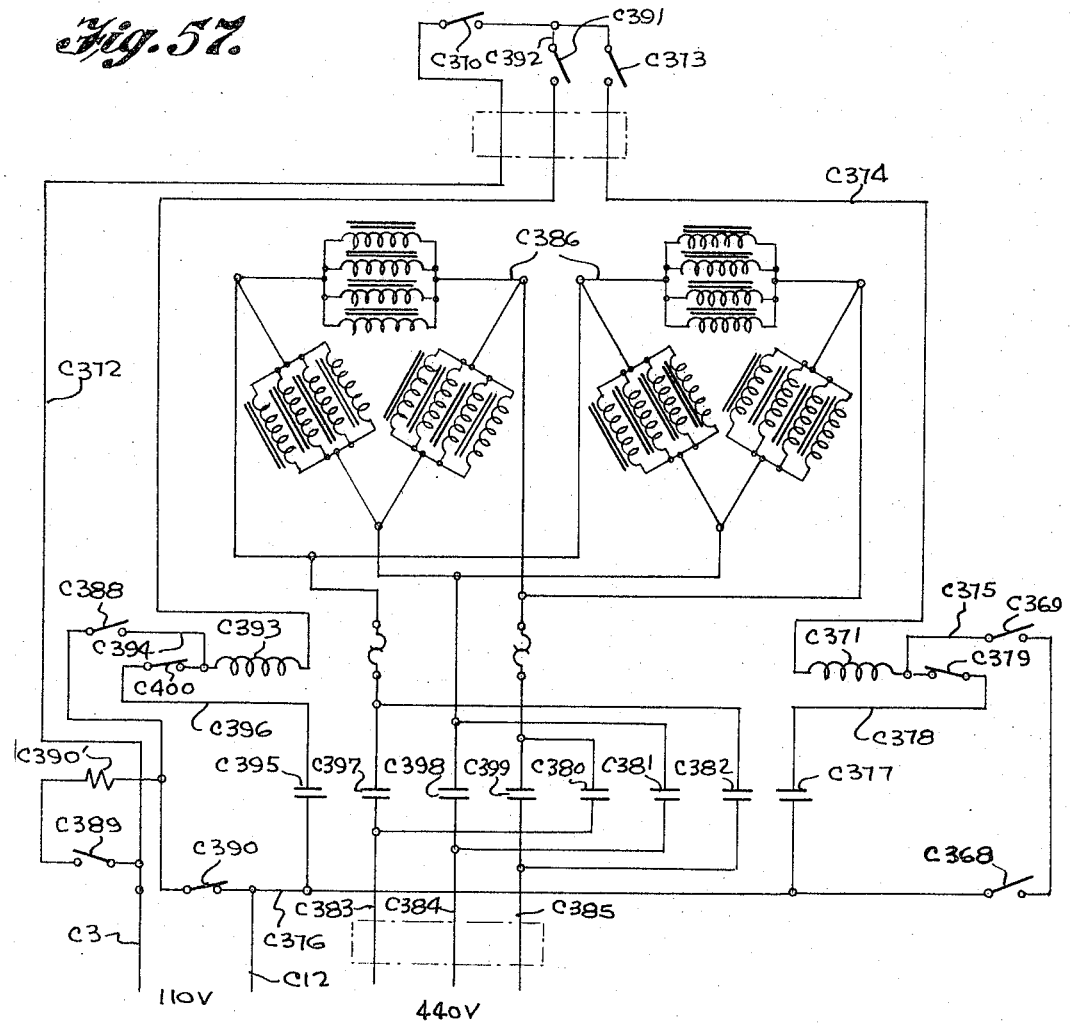
Figure 58:
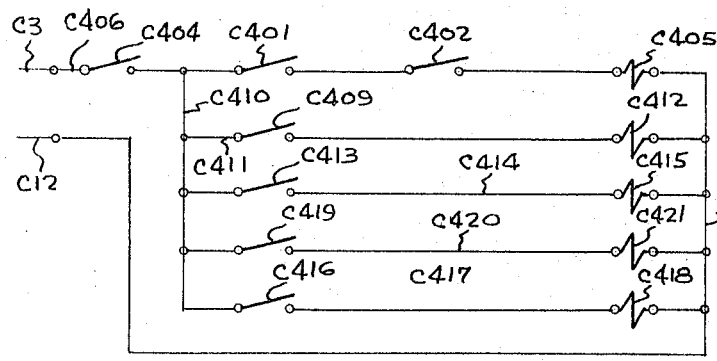
Figure 64:
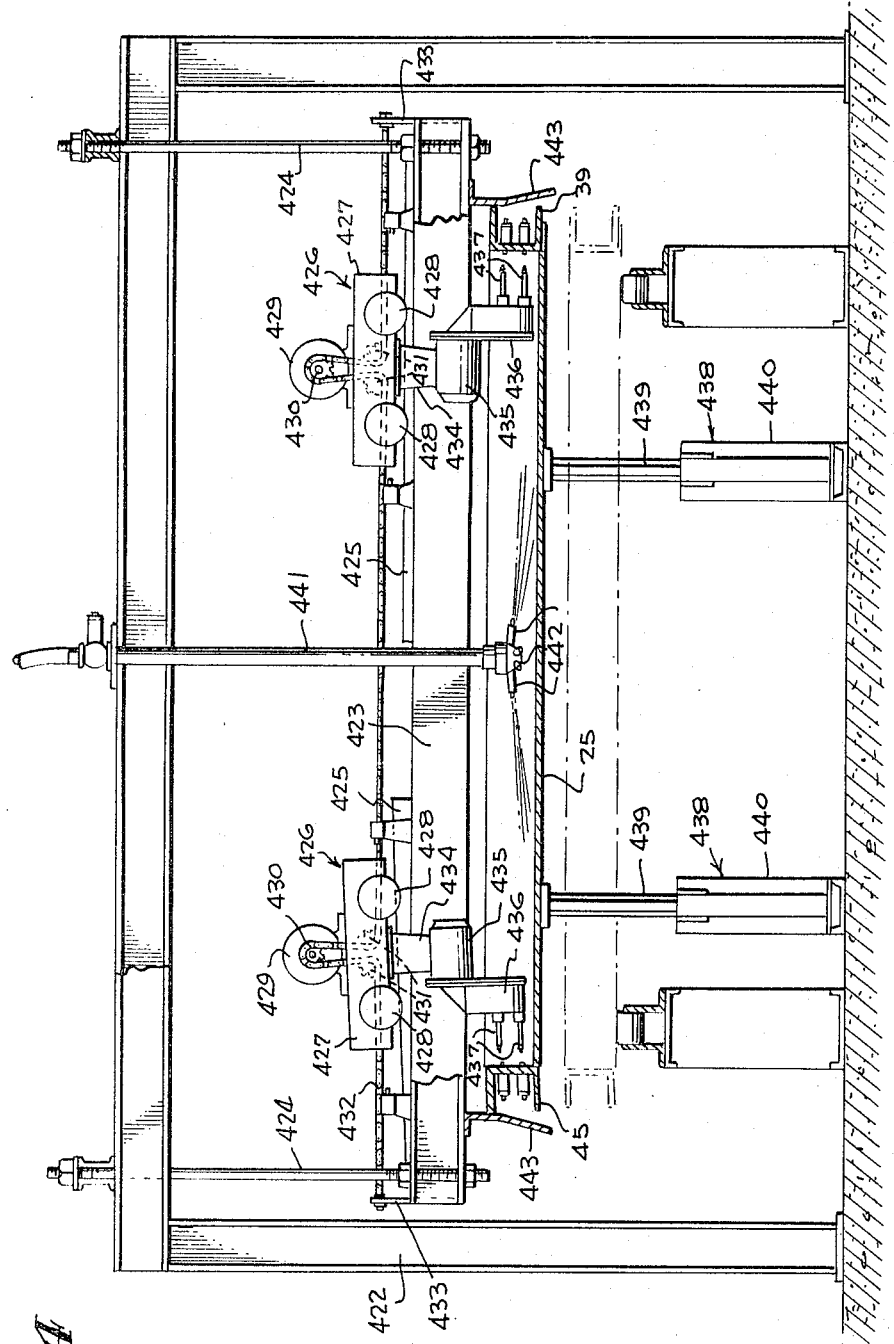

FIGURES 8a, 8b, 8c together show diagrammatically the main control cam shaft of the machine and the various electric control circuits operated by the cam shaft;

FIGURE 9 is a vertical transverse section through the machine at the cable laying station, and is taken on the line 9—9 of FIGURE 2b;

FIGURE 10 is an enlarged view of a portion of the cable laying apparatus directly associated with the pallet;

FIGURE 11 is an end elevation of the drum stand at the cable laying station, with the cable drums in place;

FIGURE 12 is a side elevation of the structure shown in FIGURE 11;

FIGURE 13 is an enlarged side elevation of the cable feeding and pallet header removing sections of the apparatus at the cable laying station;

FIGURE 14 is a top plan view of the structure shown in FIGURE 13;

FIGURE 15 is an end elevation of the structure shown in FIGURES 14 and 15;

FIGURE 16 is a view of the feed roller assembly as seen from the opposite side from FIGURE 13;

FIGURE 17 is a top plan view of the roller assembly shown in FIGURE 16;

FIGURE 18 is a vertical transverse section, taken on the line 18—18 of FIGURE 16;

FIGURE 19 is a vertical transverse section through a pallet on the pallet track at the cable laying station, and the cable laying guides, and is taken on the line 19—19 of FIGURE 10;

FIGURE 20 is a view of the structure shown in FIGURE 19, with the cable laying guide moved downwardly into the pallet and open to release the cables;

FIGURE 21 is an enlarged side elevation of the cut-off saw at the cable laying station;

FIGURES 22 to 30, inclusive, are diagrammatic views illustrating the successive steps of operation in laying cable in a pallet at the cable laying station;

FIGURE 31 is a diagrammatic view of the electric circuit controlling operation of the drum stand;

FIGURE 32 is a vertical transverse section through the machine, taken on the line 32—32 of FIGURE 2b, illustrating the mechanism at the cable stressing station;

FIGURE 33 is a vertical transverse section through the machine at the molding and vibrating station, and is taken on the line 33—33 of FIGURE 2b;

FIGURE 34 is a vertical section taken on the line 34—34 of FIGURE 33, illustrating on an enlarged scale the molding elements at the molding station;

FIGURE 35 is a view of the elements shown in FIGURE 34 in position for pressing and vibrating the concrete member;

FIGURE 36 is a vertical section taken on the line 36—36 of FIGURE 2a, illustrating in elevation the means for unloading pallets from the machine and stacking them on a kiln car;

FIGURE 37 is a diagrammatic view of the electric circuit controlling operation of the means for unloading pallets from the machine onto transfer cars;

FIGURE 38 is a longitudinal vertical section at the entrance end of the machine showing the means for moving the kiln cars along the machine leg of the orbit;

FIGURE 39 is a top plan view of a portion of the car advancing means shown in FIGURE 38;

FIGURE 40 is a transverse section taken on the line 40—40 of FIGURE 38;

FIGURE 41 is a side elevation of one of the transfer cars used to transport kiln cars from the machine leg of the orbit to the curing tunnel leg, and from the curing tunnel leg to the machine leg;

FIGURE 42 is an enlarged vertical section through the transfer car taken on the line 42—42 of FIGURE 41;

FIGURE 43 is an enlarged top plan view of means on the transfer car for pulling kiln cars onto the transfer car;

FIGURE 44 is a section taken on the line 44—44 of FIGURE 43;

FIGURE 45 is a section taken on the line 45—45 of FIGURE 44;

FIGURE 46 is a top plan view, partly in section, of one corner of a transfer pit and the adjacent section of the curing tunnel, showing a transfer car in position at the end of the curing tunnel, and the means for moving kiln cars from the transfer car into the tunnel;

FIGURE 47 is a vertical section taken on the line 47—47 of FIGURE 46;

FIGURE 48 is a section on an enlarged scale taken on the line 48—48 of FIGURE 46;

FIGURE 49 is a diagrammatic view of the electric circuits for controlling movement of the kiln cars throughout their orbital path, and the means for coordinating movement of the kiln cars to the operation of the machine;

FIGURE 50 is a diagrammatic view of the control circuits for the means for lifting pallets with cured concrete members from kiln cars and loading them onto the entrance end of the machine;

FIGURE 51 is a vertical transverse section through the machine at the cable cutting station, and is taken on the line 51—51 of FIGURE 2c;

FIGURE 52 is a diagrammatic view of the electrical circuit controlling operation of the cable cutting saws;

FIGURES 53a and 53b together show a section through the machine at the tie removing station, and are taken on the line 53—53 of FIGURE 2c;

FIGURE 54 is an enlarged section taken on the line 54—54 of FIGURE 53a showing a portion of the mechanism for removing cured concrete members from pallets in which they were formed;

FIGURE 55 is taken on the line 55—55 of FIGURE 53b, and shows in end elevation the mechanism for inverting finished ties and placing them on means to transport them from the machine;

FIGURE 56 is a view similar to FIGURE 55, showing the mechanism at the end of its tie inverting movement;

FIGURE 57 is a diagrammatic view of the circuits controlling the means for removing ties from pallets;

FIGURE 58 is a diagrammatic view of the control circuits for the means for inverting ties;

FIGURE 59 is a side elevation of the kiln car positioning means within the curing tunnel, parts being broken away to show interior structure;

FIGURE 60 is a vertical section taken on the line 60—60 of FIGURE 2b, illustrating the pallet header cleaning unit;

FIGURE 61 is a vertical section on an enlarged scale, taken on the line 61—61 of FIGURE 60;

FIGURE 62 is a detail section taken on the line 62—62 of FIGURE 61;

FIGURE 63 is a diagram of the circuit controlling the extending and retracting action of the vacuum tube used at the pallet cleaning station; and FIGURE 64 is a vertical section taken on the line 64—64 of FIGURE 2c, showing the header cleaning mechanism.

*Apparatus in general*

In general, the apparatus of the present invention includes a concrete member-forming unit, or machine, which has mechanism at the entrance end for lifting pallets carrying cured concrete members from a transport means onto the machine removing the cured concrete members from the pallets, preparing the pallets for another molding process, forming the members on the prepared pallets, and transferring the loaded pallets back to the transporting means at the discharge end of the forming machine, whereupon they are carried through a curing tunnel and again to the forming machine. The pallet transporting means moves along a fixed, closed orbit, with the pallets being transferred to the forming machine for unloading and reloading, and then being returned to the transporting means.

Referring to the drawings in detail, and first to FIGURE 1, there is shown diagrammatically the plan of the entire apparatus. It consists of a rectangular orbit, or path 1 for a pallet transporting means. The transporting path includes a leg 2, along and above which a concrete member-forming machine 3 is located, and a parallel leg 4, substantially the whole length of which is enclosed by a curing tunnel 5. Connecting the ends of the legs 2 and 4; and completing the orbit, are transfer pits 6 and 7, along which transporting cars 8 are shifted from the forming machine leg 2 of the orbit to the tunnel leg 4, and from the tunnel leg to the forming machine leg.

The tunnel 5 may be a conventional curing tunnel having appropriate heating means, not shown, to provide the necessary curing atmosphere for the concrete members. As the tunnel structural detail forms no part of the present invention, it has not been illustrated, and will not be described. The means for advancing the transporting cars 8 through the tunnel will be referred to at a later stage in the description.

The concrete member forming machine has a base 9 (See FIGURES 2a, 2b, 2c, 2d and 9) forming a bridge over the leg 2 of the transport path, and a platform upon which various stations, where the several required operations are performed, are located. These include (starting at the right end of the machine as shown in FIGURES 2a, 2b, 2c and 2d) a pallet receiving station 10, a cable cutting station 11, a concrete member removal station 12, a pallet header cleaning station 13', pallet cleaning station 13, an anchor inserting station 14, a cable laying station 15, a stressing station 16, a molding and vibrating station 17, and a loaded pallet delivery station 18.

The base 9 is formed of a pair of longitudinally extending, horizontally spaced, vertical walls or legs 19, and a flat platform 20 rests upon the top of the legs. The legs, and the portion of the platform which bridges the legs, forms the tunnel 250 through which the transporting kiln cars 8 move. The platform is sufficiently broad to project some distance beyond the legs on either side of the tunnel. It is upon this platform that the various operating stations of the machine are mounted.

*Pallet track*

When pallets are placed upon the machine, by means to be described, they are loaded upon a pallet track 2 (see FIGURES 2a, 2b, 2c, 2d, 3, 4, 8a, 8b and 10) which extends the full length of the platform 20. The track is supported upon pedestals 22, arranged in two parallel rows extended longitudinally of the platform, and horizontally spaced angle-irons 23 which are supported in pairs on the tops of the pedestals. The angle-irons are mounted in horizontally spaced position, and each pair provides a mounting means for the axles of track rollers 24. Rollers 24 are located closely adjacent to one another between the respective pairs of the angle-irons, to provide two rolling surfaces along transversely spaced lines to support the pallets, and permit them to be moved with little effort along the full length of the machine.

Pallets 25 are moved along the pallet track in predetermined increments, and in predetermined spaced relation, by means of pallet-advancing racks 26. These racks comprise elongated bars 27 which extend the length of the tracks, and are supported for longitudinal reciprocating movement in brackets 28 mounted on the pedestals 22. The bars are interconnected by a bridge 29 having a depending arm 30 coupled to a hydraulic cylinder operating assembly 31 anchored to a fixed bracket 32. The hydraulic unit is a double-acting one and, under the influence of controls to be described, it will be operative to shift the pallet-advancing racks rearwardly and then forwardly. Each of the rack bars is provided with a plurality of pallet-engaging dogs 33 (see FIGURES 3 and 4) adapted to abut the rear edges of the several pallets and move them forward. The dogs are pivotally attached to the racks as at 34, and each dog is urged, by means of a spring 35, to its raised, pallet-engaging position. As the racks move rearwardly, the dogs can depress passing under the next succeeding pallet and, when they clear the rear edge of the pallet, spring up into engaging relation with the pallet. On the advancing movement of the racks the pallet will be moved with the rack the full distance of the advancing step. The dogs will be arranged to hold the pallets normal to the track direction during most of the travel, but during a part of the passage through the machine the dogs will hold the pallets at an inclined position, as will be described.

Operation of the pallet advancing racks is controlled, as are most of the other mechanisms of the machine, from a master control shaft C1 (see schematic diagram FIGURES 8a, 8b, 8c). This shaft is rotated continuously by means of a synchronous motor C2 connected to an electric supply source C3. The shaft carries a plurality of cams, one for each mechanism to be controlled, with cam C4 controlling the flow of hydraulic fluid to the advancing rack operating cylinder 31. The cam has a rise C5 which operates a cam follower C6 to shift a double-acting switch C7 from line C8, which includes a solenoid valve C9 to institute advancing movement of the rack, to line C10, which includes a solenoid valve C11 which controls retractive movement of the rack. The movable arm of switch C7 is connected to the power line C3, and through lines C8 and C to the return line C12.

It is to be noted that the rise on cam C4 is but a short part of the operating cycle represented by the full circumference of the cam. All other cams on the shaft C1 are set in reference to cam 4.

*Pallets*

In order that a complete understanding of the apparatus and its operation may be had, it is necessary to know the particular structure of the pallets 25 which are to be used with the machine. These pallets are generally similar in basic principle to those which are disclosed in the above referred to pending application. There are some minor structural changes, and there is one change which might be termed a major one. The pallets of the co-pending application are designed to receive concrete and mold a prestressed concrete railway tie with, the base of the tie resting upon the bottom of the pallet. The pallet of the present invention is designed for the molding and supporting of a similar member, but the pallet will form the concrete tie in an inverted position with the flat top surface of the tie resting upon the bottom of the pallet.

Referring to FIGURES 3, 5 and 10, it will be seen that the pallet is an elongated, trough shaped member having a flat bottom 36 and upwardly diverging side walls 37. The ends are formed by headers 38 and 39 which span the ends of the trough 40. Header 38 is rigidly fixed to the trough end and is a permanent part of the trough, while header 39 is a movable one having no permanent connection to the trough. The side walls 37 are part of tubular struts 41 which extend the length of the trough and are designed to have their ends in abutment with the headers, and hold the headers, in predetermined spaced relation against the pull of stressed cables strung between the headers. In the embodiment shown, the struts are fabricated members, composed of the side walls 37 of the trough, horizontal top flanges 42 of the trough, and angle members 43. The angle members can be a heavier construction than the trough material and so take the major portion of the compression load. The important factor is to have the pallets include longitudinal struts, or other longitudinally extending load-carrying members, capable of acting as spacers for the header, whereby the headers, with cables strung between them, may be separated a known distance to tension the cables to a predetermined extent and held at the given spacing to maintain the desired tension on the cables. This makes the pallets self-sustaining, and permits them to be removed from the casting machine while the concrete is green, and yet maintain the cable tension during curing.

Fixed header 38 is channel-shaped in cross-section, having vertical web 44, which forms the end wall of the trough, and horizontal, outwardly projecting flanges 45. It will be noted (FIGURE 10) that the header 38 is inclined slightly so that an upwardly flaring, tapered gap 46 is left open between the header and the end of the trough. Header 38 has a plurality of openings 47 in its web 44 to receive stressing cables. The openings are arranged in the pattern selected for the cables, and a cable anchor 48 is attached to the header in alignment with each opening 47.

At the end of the pallet opposite the fixed header 38, the base flanges 49 of the angle member 43 project beyond the end of the trough to provide ledges 50 upon which the movable header 39 my seat. Header 39 is also channel-shaped, having a vertical web 51 and outwardly projecting flanges 52. This header has cable openings 53 and anchors 54. The pattern of the openings 53 will be the same as the pattern of openings 47 in header 38 and similarly positioned on the header. In other words, if the group of openings is centered on header 38, the group will be centered on header 39.

Header 39 has a pair of spacer lugs 55 projecting inwardly from the back wall of web 51. These lugs are spaced apart a proper distance to seat upon the ends of tubular struts 41 when the header 39 is centered across the open end of the pallet trough (see first two pallets at left of FIGURE 3). However, when the header is shifted laterally of the pallet (see three pallets at right of FIGURE 3) the lugs will not be in contact with the struts, but the header will have its web 51 in contact with the strut ends. It will be obvious that the distance between the two headers will be less in this latter position. It is also obvious that the header is not centered with respect to the trough in this latter position. The reasons for these two positions will be described later.

Each pallet has four openings 56 in its bottom, the openings being in pairs near the ends of the trough and in longitudinal alignment along the centerline of the trough bottom. A stool 57 having an opening 58 matching the opening 56 is fixed to the pallet trough bottom about each opening. The stools have threaded openings 59 in their tops to receive bolts 60 which pass through holes 61 in the base flanges 62 of rubber anchor-mounting studs 63. The studs are hollow with closed upper ends 64, and are threaded along their exterior surfaces, as at 65.

*Header cleaning station*

Referring again to FIGURES 2*a*, 2*b*, 2*c*, 2*d* and 64, it will be seen that the first station approached by the pallets after being loaded on the machine is the cable cutting station 11, and next is the concrete member unloading station 12. However, it is believed that the description of the structure and operation will be clearer if it is begun with the preparation of the pallet for casting of the concrete member, and proceeds step by step through all of the stages to the final unloading of the cured member from the pallet.

With this in view, it will be assumed that an empty pallet moves into the header cleaning station 13′, being drawn into proper position by operation of the advancing racks 26. The header cleaning mechanism is carried by an inverted U-frame 422 mounted on the platform 20. Suspended from the top member of the frame in a position to overlie the pallet track 26, is a supporting beam 423, carried by rods 424. The beam has rails 425 on its upper surface to receive carriages 426. Two carriages are shown, one at each end of track 425 for cleaning the pallet header at that side of the pallet track. As the carriages are identical, only one will be described.

The carriage 426 has a body 427 mounted on wheels 428 which ride on the rails 425. A driving motor 429 is fixed to the body. The motor carries a drive sprocket 430, and also two idler sprockets 431 having their peripheries arranged on the plane of a chain 432 attached at its ends to brackets 433 fixed to the ends of the supporting beam 423. The chain passes around one of the idler sprockets 431, over the drive sprocket 430 on the motor shaft, and around the other idler. Thus, when motor 429 is running, the carriage will move along the rails 425. It should be noted that the motors of the two carriages are arranged to operate in opposite phase so that the carriages will move in opposite directions. In other words, the carriages will move toward the center simultaneously, and toward the ends of the support simultaneously.

Suspended from each carriage by a frame 434 is a motor 435 and gear case 436. Four reamers 437 are rotatably mounted on the gear case and appropriately driven. The reamers are arranged in the precise pattern of the holes 47 and 53 in the respective pallet headers 38 and 39. When the pallet and its headers are properly positioned relative to the reamers, movement of the carriages outwardly from the center of the machine will cause the reamers to enter the openings in the headers, pushing out stub cable ends left after cutting a previously formed tie free, opening the chuck jaws of the anchors 48 and 54 and cleaning out the openings in the headers.

The pallets are lifted from the pallet track and raised so that the openings in the headers are in axial alignment with the reamers 437 by means of elevators 438. The elevators are spaced apart transversely of the platform 20, with one elevator adjacent each rail of the pallet track. Each elevator consists of a piston and cylinder assembly which is fluid operated. As the piston rods 439 move upward from the cylinders 440 they contact the underside of a pallet on the pallet track at the station and raise it into alignment with the cleaning reamers.

In order to assure the proper position of the pallet headers for the cleaning operation, and to prevent movement of the pallet or movable header, the support beam 423 carries depending guides 443 which lead the headers into place.

In addition to the above structure, there is also an air line 441 at the station, which projects downwardly at the center of the frame and is fitted with nozzles 442 at its lower end to direct air horizontally to remove any water or loose debris which might be in the pallet. When the pallet is lifted, as described, the air nozzles will be well down in the pallet to sweep the entire interior.

The apparatus at the pallet header cleaning station is controlled from the master control shaft C1. The elevators 438 are controlled by a cam C422, while the carriages 426 are actuated by cam C423. Cam C422 operates a switch arm C424 between contacts C425 and C426. The switch arm is connected by line C427 with the power line C3. Contact C425 is connected by line C428 with a valve solenoid C429 which controls admission of fluid to the elevator cylinders to lift the pallet. Line C428 continues from the solenoid to join the return line C12. When under influence of the cam C422, the switch arm is engaged with contact C426, valve solenoid C430 in line C431 is operated to release the fluid from the elevator cylinders to lower the pallet back to the pallet track.

Cam C423 is set to move its switch arm C432 to contact C433 as soon as the elevators have lifted the pallet into position. Switch arm C432 is connected by line C434 to power line C1, and contact C433 is connected by line C435 to motor starter C436 to start the carriage motors 429 to move the carriages outwardly from the center of the unit to cause the reamers 437 to move into the header openings. The reamers will rotate continuously. When the carriages reach their outward limit of travel, one of them will strike switch C437 and open line C435 to stop carriage movement. As soon as the cam C423 moves switch arm C432 to contact C438, starter C439 in line C440 will be actuated to start the carriage motors in reverse direction to cause the carriages to move toward the center of the unit. The carriage will strike limit switch C441 and stop this movement when the carriages have moved far enough to withdraw the reamers from the header openings.

During the time that the pallet is in raised position compressed air is ejected through nozzles 442 to blow loose material from the pallet. The air line 441 may be controlled, if desired, by the same circuits which control the movement of the reamer carriages.

*Pallet cleaning station*

After the pallet headers have been cleaned at station 13′ and the pallets again lowered to the track, the pallet-advancing mechanism will operate to move the pallet to the next station which is the pallet cleaning station 13. (See FIGURES 1, 2*b*, 8*a*, 8*b*, 8*c*, 60, 61, 62 and 63.) At this station, the pallet is given a thorough cleaning by sandblasting, and the debris is withdrawn from the pallet by suction.

The apparatus at this station, also, is mounted upon an inverted U-frame 444 supported upon platform 20. The frame carries four rods 445 which suspend a hood 446 from the top of the frame. The hood has an open bottom 447 surrounded by a sealing gasket 448. There is a slot 449 along the top of the hood, and sealing flaps 450 normally bridge this slot. The flaps have their edges 451 seamed along the top of the hood on opposite sides of the slot and project inwardly over the slot. The flaps are considerably wider than one-half the width of the slot, so that their free ends 452 meet and turn downward in adjacency at the slot center. The flexible resiliency of the flaps allow them to spread to permit objects to move along the slot, as will be explained, and then close in sealing relation behind the object. The hood is somewhat longer than a pallet and its headers so that it projects beyond the headers at either end of the pallet. The hood has bearings 453 at its sides to slidably receive the suspending rods 445 and permit vertical movement of the hood relative to the frame. Nuts 454, threaded on the bottom ends of rods 445 adjustably limit the downward movement of the hood.

Hood 446 carries rails 455 along its top side edges to support a carriage 456. The carriage has a body 457 and grooved wheels 458 to ride along the rails 455. A pedestal 459 at one end of the carriage supports a motor 460, which has an output shaft 461 carrying a drive sprocket 462. A chain 463 has its ends attached to brackets 464 at the ends of the hood, and passes around idler sprockets 465, journalled in the carriage, and the drive sprocket 462. This is the same driving arrangement illustrated in connection with the carriages 426 at the pallet header cleaning station 13; and it will be obvious that rotation of the drive sprocket 462 will cause the carriage to move along the chain over slot 449 in the top of the hood.

Carriage 456 has mounted on it a sandblasting head 466, which includes a hollow stem 467, a head proper 468 and nozzles 469 on the head. This structure is mounted rigidly on the carriage to extend downward between the sealing flaps 450 into the hood 446. The nozzles are directed downwardly to blast a pallet positioned against the bottom of the hood. The stem of the blasting head is connected to a flexible hose 470 which has its opposite end coupled to the outlet of a sandblasting pot 471. A compressed air line 472 enters the pot to provide the required blasting pressure.

Also mounted on the carriage is a pair of fluid cylinders 473 which have their piston rods 474 connected to a collar 475 fixed to the upper end of a bifurcated suction nozzle 476. This nozzle extends downward between the sealing flaps 450 in the same manner as the sandblasting head. The upper end of the nozzle fits telescopically over the lower end of a suction line 477, and has an upper position wherein the lower ends of the nozzle are above the bottom edge of hood 446 and a lower position wherein the nozzles terminate just above the bottom of a pallet beneath the hood. The cylinders 473 raise and lower the nozzles to the two positions. Suction line 477 is connected to a suction pump 478 mounted above a hopper 479 superimposed over the sandblasting pot 471. Debris gathered from the pallet will be drawn through line 477 by pump 478 and dropped into hopper 479. The outlet 480 of the hopper is valve controlled, and can be opened to allow the contents of the hopper to fall upon a screen 481 above the sandblasting pot 471. The screen will allow accumulated sand to fall back into the pot for reuse and separate foreign matter for disposal. A suitable shield, or cover, 482 encloses the pump, hopper and screen.

A pallet on the pallet track 26 at the station 13 will be lifted up into engagement with the hood 446 by means of elevators 483. These are fluid cylinders 484 having pallet-supporting platforms 485 at the tops of their piston rods 486. The elevators will have sufficient lift to raise pallets into engagement with the sealing strip 448 at the bottom of the hood and raise the hood somewhat on rods 445 to allow the hood under its own weight to seat on the pallet.

The operation of the apparatus at station 13 is also initiated and controlled by cams on the control shaft C1 (see FIGURES 8a, 8b, 8c and 63 for the controls). After a pallet has reached station 13, cam C442 rotates to cause cam follower C443 to move up on the cam rise, moving switch arm C444 to close with contact C445. This closes a circuit from power line C3 through line C446, switch arm C444, contact C445, line C447 which includes coil C448 of valve to cause elevators 483 to start upward, and return line C12. The elevators will rise bringing the pallet into contact with hood 446.

Just after this, cam C449 on shaft C1 will cause switch arm C450 to close with contact C451. This completes a circuit from power line C3 through line C452, switch arm C450, contact C451, and line C453 which includes a normally closed switch C454, a motor starter C455 and coil C456 of a solenoid valve controlling air flow through air line 472 to the sandblasting pot 471, to the return line C12. This will cause motor 460 of carriage 456 to start to move the carriage from left to right as viewed in FIGURE 60. At the same time sandblasting through head 466 will begin. As the carriage makes its trip the full length of the pallet, the entire pallet interior will be sandblasted. On reaching the right hand end of the pallet, a cam in motor 460 (not shown) will open switch C454 and stop carriage movement and sandblasting. The carriage rests at this point until cam C449 rotates far enough to allow switch arm C450 to break connection with contact C451 and close with contact C457. This closes a circuit from power line C3, through line C452, switch arm C450, contact C457, and a line C458 which includes normally closed switch C459 and motor starter C460, to return line C12. This starts the carriage motor in a reverse direction to bring the carriage back to its starting point. When the carriage reaches the left hand end of the pallet, the cam in the motor opens switch C459 and stops the motor. There is no sandblasting on the return trip.

During the entire back and forth movement of the carriage, suction pump or fan 478 is operating. Suction nozzle 476 is retracted, or up, however, on the trip from left to right. Referring particularly to FIGURE 63, there will be seen two switches, switch C461 which is located at the right-hand end of carriage 456, and switch C462 located at the left-hand end of the carriage. As the carriage begins to return from the right-hand end of the pallet, it passes a finger C463 adjacent the carriage track which momentarily closes the switch C461. This activates the coil of a relay C464 closing the relay contacts C465 and C466. A coil C467 of a solenoid valve having a spring return controls the fluid cylinders 473 for retracting and lowering suction nozzle 476. When the relay contacts are closed, the coil C467 is activated and the suction nozzle descends into the pallet, sucking up sand and debris as the carriage returns to its starting point at the left end of the pallet. On reaching the left-hand end, the carriage passes another stationary finger C468 which actuates switch C462 and opens that switch to break the holding circuit through the relay coil and open the relay contacts. This deenergizes coil C467 allowing the spring to return the valve to raise the suction nozzle to its upper position.

After these operations have been completed, cam C442 moves switch arm C444 to close with contact C469 and complete a circuit through solenoid coil C470 to cause the elevators 483 to lower the cleaned pallet back onto track 26 for advancement to the next station.

*Anchor setting and pallet oiling station*

When the pallet advancing rack next operates, the cleaned pallet will be moved from the pallet cleaning station to the anchor setting and pallet oiling station 14 (see FIGURES 2b, 5, 6 and 7). At this station, metal anchors, which are to be embedded in the concrete member to receive the rail securing bolts, are positioned at their proper locations relative to the pallet and fixed by means of the rubber anchor mounting studs 63 so that they will maintain their positions throughout the molding operation.

The pallet at the anchor station lies above a plurality of vertically movable probes 70, one being located below, and in axial alignment with each of the openings 56 in the pallet bottom. The probes are mounted at the tops of piston rods 71 of hydraulic cylinders 72, connected by fluid lines 73 with a source of fluid supply. When the cylinders are actuated, the probes rise, enter through the openings 56 in the pallet and move into the rubber studs 63. The probes will contact the closed ends 64 of the studs and stretch the studs vertically. This will cause a corresponding reduction in the diameter of the studs so that metal sleeve anchors 74 may be slipped freely over the studs. The anchors have internal threads 75, and when the probes are withdrawn from the studs, the studs return to their original diameters so that the stud threads 65 will seat in the threads 75 of the anchors, securely fixing the anchors to the studs.

Cylinders 72 are double-acting and controlled by solenoid valve C22 and C23 (see FIGURES 8a and 8b). These valves are energized by cam C24 on cam shaft C1. Cam C24 actuates switch C25 which transfers current flow from line C26 to C27 and return. These lines are each connected to return line C12, and through switch C25 with power source C3. Valves C22 and C23 when energized will admit fluid to cylinders 72 to raise the probes. The valves will return to fluid exhausting position when the circuits are de-energized.

At this station, the pallets are also oiled to prepare them to receive a charge of concrete. To this end, oil pipes 68 span the station so that oil can be sprayed downwardly to coat the exposed surfaces of the pallet with which the concrete will be in contact. Any convenient arrangement of pipes can be used, and they may be connected to a suitable source of oil supply. If desired, a drip pan 69 can be located beneath the pallet track to catch any surplus oil that may flow from the pallets and return it to the source of supply.

Operation of the oil line is controlled by cam C14 (see diagram FIGURE 8c). The cam has a rise C15 which controls the operation of switch C19. When cam C14 closes switch C19, solenoid valve C20 on oil line 68 is energized to open the oil line. Solenoid C20 is in a circuit which includes line C18 from power line C3, switch C19, and line C21, which includes solenoid C20, to return line C12. The oil line may be operated simultaneously with the anchor setting operation.

*Cable laying station*

After the anchors are positioned, the racks 26 operate to advance the pallet to the cable laying station 15. At this station, cables to be used for stressing the concrete member are fed from supply drums to span the pallet, cut to proper length, and the ends anchored in the cable anchors 48 and 54 of the respective headers of the pallet. (See FIGURES 2b, 9 through 31 and 8a and 8b.)

As previously mentioned, when header 39 is seated in its offset position, as it is when it arrives at the cable laying station, the cable threading openings 47 in header 38 and openings 54 in header 39 will not be in alignment along the center of the pallet. In other words, the openings 54 in pallet 39 will be offset to one side of the pallet center line. If the openings of the two sets are to be aligned normal to the path of pallet travel, as they must be for cable threading, it will be necessary for the entire pallet to be canted. This position is shown in the second pallet from the right in FIGURE 3. The proper canted position is obtained by having the pallet moving dogs 33 on racks 26 staggered in the area between the anchor setting and oiling station 14 and the stressing station 16 to the degree necessary to properly cant the pallets and move them in a canted position to the cable laying and stressing stations.

Referring particularly to FIGURES 9, 11 and 12 it will be seen that the cables to be laid in the pallets are wound upon supply drums 76 which are mounted for rotation on a drum stand 77. This stand is shown as comprising a pair of racks 78, each having spaced side frames 79 carrying bearings 80, to rotatably mount shafts 81 of the several cable drums 76. By this arrangement, each of the four drums illustrated will be capable of independent rotation. Each drum carries a worm wheel 82 upon its shaft 81 with the worm wheels being in mesh with worm gears 83 mounted upon shafts 84 carried in suitable bearings on the side frames of the racks 78. The independent shafts 84 are powered by separate hydraulic motors 85, which are started and stopped as desired by operation of control valves 86. With this arrangement, any one of the cable drums can be rotated independently of the others, and the several drums can be positively rotated at the required speeds to feed the cables at uniform linear rates irrespective of the diameters of the wound cable on the several drums.

Valves 86 are controlled by means of slack feelers 87. These may take the form of pivoted brackets 88 having feet 89 resting upon the surface on which the cable stand is mounted. Each bracket will carry a feeler rod 90 with the cable it is to control extending under it. That portion of the cable passing under the rod will be in the form of a loop extending from the cable drum to the strand feeding devices to be described. If at any time the slack decreases, the loop will contact the feeler rod and lift the bracket 88 to which it is attached, causing the bracket to contact, and operate, a valve control switch 91. When the slack is restored, the pivot bracket will return to its position of rest on the ground, and the valve will be operated to stop feeding operation of the particular drum it controls.

The cables are fed from drums 76 to a strand feeding device 92 (see FIGURES 2b, 9 and 13 through 18). This includes a strand lead-in guide 93, formed of a plurality of rods 94 mounted vertically in parallel, spaced relation in a frame 95. The rods are arranged in pairs, with a single cable passing between each pair for proper lateral positioning prior to entry into the feed device proper. The feed device has a plurality of horizontal, driven feed rolls 96, and a plurality of pressure rolls 97 positioned above the feed rolls and nested intermediate adjacent feed rolls of the group. The driven feed rolls 96 are mounted in a suitable frame 98, and are driven by chains 99 running over sprockets 100 carried by the several feed rolls. One of the sprockets is connected by a chain 101 with the drive sprocket of a gear reducer 102, powered by an electric motor 103. Pressure frame 98 is supported above the main frame by adjusting screws 104. When the cables are threaded through the feeding device, the pressure frame may be drawn downwardly by means of the adjusting screws so as to cause the cables to follow a sinuous path and be pressed into firm driving relation with the driven rolls. It is to be noted that each of the driven rolls is provided with a plurality of guide grooves 105, each of which accommodates one cable, so that the several cables will be maintained in proper horizontal spaced relation during movement longitudinally through the feeding device.

When the cable ends emerge from the feeding rolls, they will enter the flared ends 106 of a plurality of guide tubes 107. The tubes are provided to receive the horizontally spaced cables and direct them to assume the arrangement of the pattern of the cable openings in the pallet headers. The tubes are formed of three sections, a fixed section 108, a movable section 109 which telescopes over the ends of the tubes of the fixed section, and an aligning section 110 which consists of short sections of tube in axial alignment with the telescoping sections 109 but spaced slightly therefrom to allow for the passage of cable saws, as will be described. The telescoping and aligning sections of the tubing are mounted upon a carriage 111 arranged for horizontal sliding movement on a frame 112, which is an extension of the frame 95 of the strand feeding device. The carriage is given a reciprocating movement by means of a fluid cylinder assembly 113 connected to the frame by a pivotal connection 114.

Tube carriage 111 consists essentially of a bed 115 supported upon a pair of slide rods 116. Rods 116 slide through bushings 117 mounted upon the feeder frame 95. The rod ends are connected by a bridge 118, and the bridge is coupled to the cylinder assembly 113. The aligning sections 110 of the cable guide tubes are fixed to the carriage bed, while the telescoping sections 109 are held in a bracket 119 adjustably mounted on the carriage bed so that the spacing between the tube sections 109 and 110 can be adjusted. Bolts 120 hold the bracket in adjusted position.

Carriage 111 has at its feed end a header-supporting table 121, which is adapted to move under the upper flange of a movable header carried on a pallet at the cable laying station. Table 121 is arranged to slide under the upper surface of the upper flange of the header when the carriage 111 is advanced to the pallet. A clamping lever 122 is pivotally atached to the carriage, as at 123, and has a downwardly extending clamping jaw 124. The free end of the lever is connected to an operating fluid cylinder 125 mounted on the carriage. Operation of the cylinder will swing the lever about its pivot, moving the clamping jaw to and from clamping engagement with the top flange of a header supported on the table 121. This construction will permit movement of the carriage toward a pallet at the cable laying station to move the table 121 under the top flange of the movable header of the pallet. The clamping lever can be actuated to clamp the header flange against the table, and the carriage retracted to remove the header from the pallet. The carriage can again be brought forward at the proper time, to reseat the header on the pallet ledge 50. When the clamping lever is moved to release position and the carriage returned, the header will be left in its original position on the pallet.

Referring particularly to FIGURES 2a, 9, 10, 19 and 20, it will be seen that there is a transverse beam 126 spaced above the pallet track at the cable laying station, and this beam is supported from the main structural frame 127 of the machine by means of rearwardly extending support members 128 which project from the rear legs 129 of the main frame. The support members 128 can be suitably braced by diagonal bracing 130. The transverse beam 126 carries a cable laying head 131. The head is suspended from the beam 126 by means of identical cylinder assemblies 132 and 133. These are pivotally connected to the cable laying head as at 134, 135, respectively, and to the beam at 136, 137, respectively. This will allow the laying head to be tilted in a vertical plane and to move longitudinally of the pallet and transversely of the machine.

The cable laying head includes an elongated channel member 138 having parallel legs 139 depending along its sides. The channel and the vertical depending legs are substantially the same length and slightly shorter than the open space in the pallets between the fixed and movable headers, so that the cable laying head may move freely in and out of pallets positioned at the cable laying station. The legs 139 have grooves 140 in their inner and outer vertical faces which extend the full length of the legs. The legs are of such thickness, and the grooves are so arranged, that cables in the grooves will occupy the positions required, to conform precisely to the cable opening pattern in the pallet headers. Each of the grooves 139 is bridged by a closure plate 141. Each plate has a groove 142 that matches the groove 139 which it overlies, and the companion grooves 139 and 142 together form circular guide channels to receive stressing cables. Plates 141 are pivotally mounted upon the legs by means of pivots 143, so that they may move to and from cable enclosing position. Each plate has an operating arm 144 near each end, and the arms of companion plates are interconnected by means of fluid cylinders 145, that is, the plates 141 on the outer faces of the legs have their arms interconnected and those on the inner faces of the legs have their arms interconnected. Thus, when the cylinders 145 are actuated, the closure plates will operate in pairs to open and close. The cylinders are arranged so that all of the closure plates will open and close simultaneously.

In addition to the structure already described there is a cable cut-off saw 146 (see FIGURES 9, 10 and 21) mounted on one of the support members 128, specifically the one adjacent the cable feeding mechanism. The saw is an abrasive disk 147 mounted upon a shaft 148 journaled in a mounting arm 149. The arm is pivoted intermediate its length as at 150, upon a bracket 151 depending from the support member 128. On the opposite side of the pivot from the saw there is a motor 152 bolted to the mounting arm 149. The motor is connected to the saw by a suitable belt drive 153. By reason of this mounting arrangement, the saw and its driving motor serve to some extent to counterbalance one another. The saw is covered, except for a portion of its lower periphery, by means of a protective housing 154. The saw is caused to move downwardly into the space 155 between the telescoping section 109 of the cable guiding tubes and the short aligning section 110 of the tubes when the carriage 111 is in its advanced position. The saw will move vertically down into the space and sever the cables extending between the two lengths of guide tubing.

The saw is moved by means of a fluid cylinder assembly 156, which has one end connected to the saw supporting structure by means of a bracket 157 and the other end to the support member 128 by means of a bracket 158.

The various mechanisms making up the cable laying station, just described, are operated and controlled from the master control shaft C1, after the operating circuits are conditioned by the closing of a switch C28 by the pallet as it moves into position at the cable laying station. Switch C28 is mounted on the pallet track structure.

For the following description, reference should be had to the electrical diagrams FIGURES 8a, 8b and 31, the schematic views FIGURES 22 through 30, and the views of the structure of the cable laying station FIGURES 9 and 10, with particular reference to the circuit diagrams and the schematic views.

When a pallet moves into the cable laying station, it strikes switch C28, which is a double pole switch operation between contacts C29 and C30. Switch C28 which, through contact with C30, had been active to maintain the cable laying head 131 in raised position and the header removing carriage 111 in retracted position to allow free entry of the pallet to the station, is moved to open position, and into contact with C29. Contact C29 is in a line C31 from the power source to switch C32 actuated by master strand feeder cam C33. Until contact is made with C29, there is no current to the several circuits of the cable laying mechanisms.

After contact is made with C29, rotation of cam C33 will operate switch C32 to energize the strand feed motor 103 to start rotation of feed rolls 96 and 97. This is accomplished through line C31, switch C32, line C34, normally closed switch contact C35 of a double pole switch C36 located at the pallet track, motor 103 and return line C12. At the same time, coil C37 of a control valve is actuated to operate fluid cylinder 133 to lower the end of cable laying head 131 remote from the strand feed into the pallet, as shown in FIGURE 23. The circuit for solenoid coil C37 includes a line C38 from line C34 of the coil C37 and return line C12. When the strand laying head 131 has its far end lowered, as described, the strand guides formed by the grooves 140 and plates 141, and grooves 142 and plates 143 will be in direct alignment with the cable openings and anchors in the fixed header 38 of the pallet.

Cam C39 closes its switch C40 to close a circuit through solenoid coil C41 of a valve controlling cylinder 113 to cause the carriage 111 to advance to the movable header 39 of the pallet. Cam C42 closes its switch C43 to close a circuit through coil C44 of a solenoid valve controlling operation of cylinders 145 to close the cable guides on the cable laying head. The circuit for coil C41 includes line C45 from the master cam power line C34, switch C40, line 46, coil C41 and return line C12. The circuit to coil C44 includes line C47 from the line C34, switch C43, line C48, coil C44, and return line C12.

It is to be understood, that the cable laying head end lowers into the pallet, the cable guides on the head close and the carriage 111 advances to the movable header 39 simultaneously. At the same time, the strand feed motor 103 starts so that cable will be fed to, and through, the guides in the cable laying head.

When the carriage 111 is in its advanced position, it strikes and closes a switch C49 to energize the cable reel drive control C50, shown in FIGURE 31 diagrammatically. Closing switch C49 energizes C50 for forward, or cable paying out, operation, while reverse operation is controlled by a manually operated switch C51. Drive control C50 is connected to line C31 through switch C51, and from switch C51 by lines C52 or C53. The opposite side of the control is connected by wire C54 to return line C12.

As previously described, each cable reel 76 is actuated by means of a hydraulic motor 85 under control of valves 86. The valves are solenoid operated, and fluid for operating the motors is under control of an unloading valve C55 located between a suitable fluid pump C56 and reservoir C57. Fluid is pumped to the several motors through the unloading valve, as shown diagrammatically at C58.

The valves are operated by slack feelers 87 which lift as slack is removed from the cable and close switches 91, as described.

Switches 91 are double pole switches, having normally open contacts C59 and normally closed contacts C60. The contacts C60 of all of the switches are connected in series from line C52 by means of line C61 to unloading valve C55, and by line C62 to line C54 and the return line C12. Valve C55 closes whenever its circuit is broken to increase pressure to the reel motors, so that it closes whenever a slack feeler rises to contact switch 91. This opens contact C60, and closes switch C59 to complete a circuit to the valve of the particular motor involved. It will be seen that each contact C59 is connected from line C52 by line C63 to its respective valve solenoid and to line C54.

Thus, whenever carriage 111 is in advanced position and the strand feed motor 103 is operating to feed cable through rollers 96 and 97, lifting of any one of the slack feelers 87 will start its cable reel to unreel cable. The feelers will control the unreeling movement in accordance with requirements.

Rollers 96 and 97 feed the strands through tubes 107 and through the guides in the laying head 131. When the cable ends project from the far end of head 131 they enter the openings in the fixed header 38 of the pallet and move into the anchors 48. When the cables project completely through the anchors they will strike switch plate C64 opening contacts C35 of switch C36. This will break the circuit to strand feed motor 103 and stop the strand feed. Of course, as strand feed ceases, slack develops in the cable at the reels and unreeling ceases.

During the strand feeding, cam C65 operates its switch C66 to energize solenoid valve C67 to cause header clamp cylinder 125 on carriage 111 to move clamping lever 122 to header clamping position, so that the movable header becomes firmly gripped by the carriage. The circuit for solenoid valve C67 includes wire C68 from strand feed master cam line C34, switch C66, line C69, solenoid C67 and return C12.

When the operations just described have been completed, the various parts of a strand feed mechanism will be in the position shown in schematic FIGURE 23.

As mentioned above, switch C36 is a double pole switch, and when contacts C35 are opened by the strand ends striking plate C64 the other contact of the switch, that is, the contact C70, will close. This will complete a circuit controlling the downward movement of the cut-off saw 146. The circuit includes a line C71 from the master feed power source C34 normally closed contacts C72 and C73, relay C74, switch C70, a switch C75 which is closed and held closed by the carriage 111 when it is in its advanced position, line C76, solenoid C77 of the saw control cylinder 156 and the return line C12. By including switch C75 in the circuit, the position of the carriage adjacent the header of the pallet will be assured before the saw can start its downward movement.

The saw moves downward into the space 155 between the telescoping and aligning sections 109 and 110, respectively, of the cable guide tubes 107 mounted on the carriage 111. At this time cables will be bridging the space 155 and, as the saw continues its downward movement, it will sever the several cables spanning the space (see FIGURE 24). When the saw reaches its downward limit, the saw arm strikes a switch C78 which energizes coil C74, opening contacts C72 and C73, de-energizing solenoid valve C77. As soon as this circuit is broken, the solenoid valve moves to its opposite position by spring action and causes the saw to rise (see FIGURE 25).

When the saw started its downward movement, it closed contact C80 of the double pole switch C81, located on the saw frame adjacent the saw up position. This establishes a parallel circuit to coil C41, to ensure the header removing carriage 111 remaining in its extended position until the saw cycle is completed, even though the header remover carriage cam C39 should complete its cycle of operation. This prevents any possibility of the saw blade being broken by movement of the carriage while the saw is down. When coil C79 of the relay C74 was energized, contacts C82 and C83 are closed, the closing of contact C83 establishes a circuit through line C84, bridging switch C78 so that even though switch C78 will open as the saw rises, a circuit through the relay coil will be continued. The closing of contact C82 establishes a circuit through line C85 to solenoid valve C86. When the saw reaches its up position, contact C80 is opened, and therefore, when cam C39 has completed its predetermined arc of travel, switch C40 will be actuated, de-energizing solenoid C41. At the same time, a circuit is established through switch C40, lines C87, C88, contact C89, which is the second contact of switch C81 and closed when the saw is up, line C90 and solenoid C91, which serves to reverse the operation of the carriage moving cylinder 113 to retract the carriage. When the carriage 111 retracts switch C75 in the saw operating circuit opens, as does switch C49 in the circuit to the cable reel operating mechanism.

It is to be remembered that the header clamping lever 122 on the carriage remains operative, clamping the movable header to the header table 121, so that as the carriage retracts the movable header 39 is moved away from the pallet. When the carriage reaches its fully retracted position, it closes switch C92 and when the saw reaches its up position it closes a switch C93. Switches C92 and C93 are in circuit with coil C86, which circuit is through contact C82 of the relay C74. Coil C86 controls the downward movement of cylinder 132 connected to the cable laying head 131 at the end adjacent the strand feeding mechanism. Thus, when switches C92 and C93 are closed by the saw being in the up position and the header remover carriage being in its retracted position, the near end of the cable laying head will move down into the pallet (see FIGURE 26). This movement is possible even though the ends of the cables are projecting beyond the head end, as the pallet header has been removed.

Figure 27:
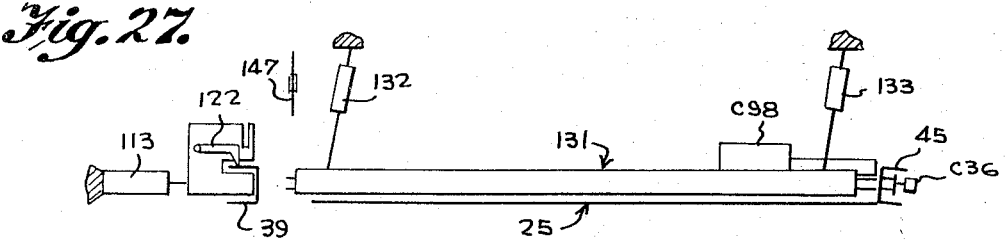

As soon as the laying head reaches its position at the bottom of the pallet, the cam C94 operates to throw its switch C95, to close a circuit through line C96 which serves to energize solenoid valve coil C97, which serves to operate a cylinder C98 and shift the cable laying head 131 laterally of the machine to slide the head along the cables, so that the near end of the head is brought to a position close to the free cut ends of the cables as shown in schematic FIGURE 27. This will hold the cable ends in precise arrangement so that when the movable header is returned to place, as will be described, it can be threaded onto the projecting ends of the cables.

Figure 28:
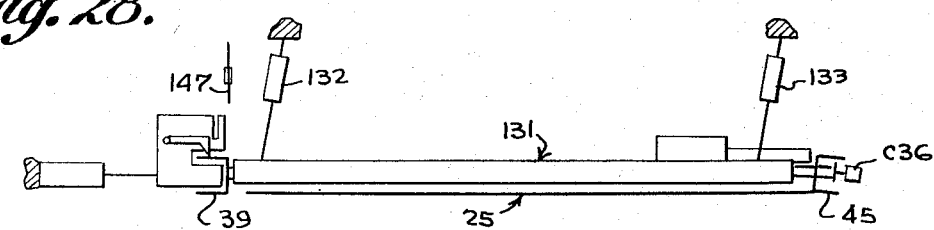
Figure 29:
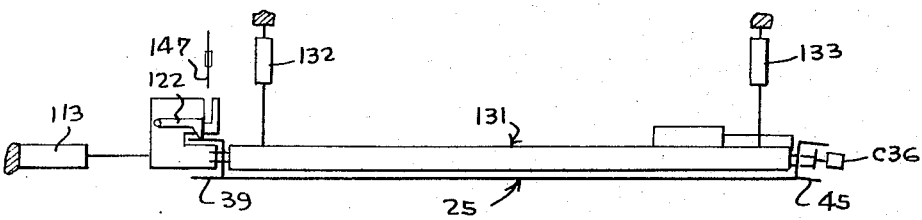

As soon as the laying head has reached the position just described, cam C39 again operates its switch C40, to re-energizing coil C41 and admit fluid to cylinder 113 to advance the carriage toward the pallet and return the movable header to its position on the pallet (see FIGURE 28). As mentioned above, the movable header will be threaded onto the free ends of the cables and, as the threading motion continues, the cable ends will extend into the anchors 54 on the movable header. In order for the header to move completely onto the cable ends, it is necessary that the laying head return to its original position relative to the pallet and, therefore, cam C94 shifts its switch C95, breaking the circuit to coil C97. The valve controlled by coil C97 returns by spring action, so that the cylinder C98 reverses its operation to move the laying head back toward the fixed header of the pallet (see FIGURE 29). As soon as the carriage reaches its fully advanced position, so that the movable header is again on the projecting shelf of the pallet, cam C65 operates to throw its switch C66 and break the circuit to the solenoid C67 of the valve controlling cylinder 125 of the header clamping mechanism. This permits the cylinder to return to its inoperative position, so that the clamping lever 122 will release the header.

Figure 30:
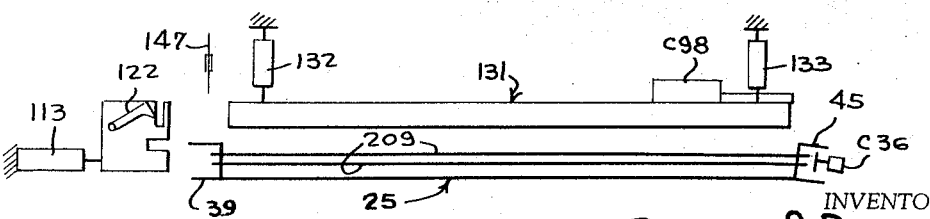

Master feed cam C33 and cams C39 and C42 then operate simultaneously to energize coils C99 and C100, to actuate cylinders 132 and 133, to lift the cable laying head from the pallet, to permit operation of cylinders 145 to open the guide grooves in the cable laying head, and to again energize coil C91 to retract the carriage 111 (see FIGURE 30). The cable laying station is now in condition to start a new cycle.

*Cable stressing station*

When the cycle of operation just described is completed the pallet advancing racks 26 will operate to move the pallet with its inserted cables to the stressing station 16. When the pallet arrives at the stressing station 16, it is still at the same angle of cant it had at the cable laying station. The advancing racks have their pallet-engaging dogs arranged so that the pallets maintain this position from the cable laying station to the stressing station, as described.

The stressing station (see FIGURES 2b, 3, 4 and 32) is located adjacent the intermediate vertical legs 159 of the main frame of the machine, and includes two mechanisms, a lower pallet elevating mechanism 160, and an upper jacking, or stressing, mechanism 161.

The elevator is mounted upon the machine platform 20. A suitable frame structure 162 is mounted upon the platform, and includes a pair of end members 163 and horizontal bracing members 164 extending between the end members. The end members each have a horizontal shelf 165 to provide a base upon which a hydraulic cylinder 166 is mounted. Each cylinder has a piston rod 167 having an elongated pallet engaging seat 168 at its upper end. The seats are of appreciable length, and extend transversely of the pallet position so that they will span the major portion of the pallet bottom and provide stable support for the pallets when the pistons are raised. In order to properly support the seats, guide rods 169 are connected to each end of each seat, and these are slidably mounted in bearings 170 fixed to the end members 163 of the elevator frame. When the hydraulic cylinders are operated, they will lift the overlying pallet vertically to position it upon the jacking mechanism 161. As the seats merely contact the bottom of the pallet, the canted position of the pallet will be maintained during the elevating movement.

The jacking mechanism is mounted upon a beam structure 171, which is fixed to the main frame and extends transversely of the pallet track directly over the pallet elevator 160. A pair of jacking legs 172 are pivotally connected as at 173, to the beam structure 171. The two legs have their lower ends interconnected by a hydraulic jacking cylinder assembly 174 which has a pivotal connection 175 to the lower section of each of the two legs. It will be obvious that operation of the jacking cylinder will cause the legs to spread, or to be drawn toward one another.

It is to be remembered that the pallet, when raised for engagement with the jacking mechanism still occupies a canted position. It is also to be remembered that the cables strung between the headers of the pallet occupy a position truly normal to the pallet track, due to the offset relationship of the pallet headers. The pallet position is such that when the pallet is raised, the pairs of cables on opposite sides of the center of the cable pattern will pass on opposite sides of the jacking legs so that they will straddle the jacking legs. As soon as the pallet reaches its uppermost position, the jacking cylinder will be operated to spread the jacking legs to bring them into contact with the pallet headers and separate the headers to increase the distance between them. As the jacking operation continues, the movable header 39 will be forced outwardly relative to the pallet, until the lugs 55 clear the ends of the pallet body, as represented by the ends of the tubular struts 41. As soon as the lugs clear these ends, the tremendous pressure being exerted in opposite directions centrally against the fixed head and the movable head will cause the pallet body, which is now free of restraint, to move to a position truly parallel to the jacking plane of the jacking legs. This action is instantaneous upon the lugs 55 clearing the pallet ends, and, as soon as the pallet assumes its corrected position which is normal to the pallet track, the cylinder action can be reversed, withdrawing the jacking pressure from the heads. Lugs 55 of the movable head will then seat against the ends of the tubular struts with the tension of the cables holding the movable header immovable in a truly centered position relative to the pallet. By having the lugs 55 of predetermined thickness, the amount of tension given the cables will be precisely the same each operation.

After the cables are tensioned, and the pallet has assumed its position normal to the pallet path, the elevating mechanism 160 lowers the pallet back on the rollers of the pallet track. The dogs on the track advancing rack which will move the pallet forward to the molding station 17 are arranged so that the pallet will be advanced in its position at right angles to the pallet path.

The mechanism at the stressing station is also operated by cams fixed to the master cam shaft C–1. At this station there are two cams, the cam C101 which controls raising and lowering of the elevator cylinders 166, and cam C102 which controls the operation of the jacking cylinder 174. After a pallet arrives at the stressing station, cam C101 will operate to move the contact of a switch C103 to energize a solenoid coil C104 to operate a valve on the fluid line to cylinder 166 to direct fluid to cylinders 166 to cause their pistons to rise. The coil and switch are in a circuit which includes a line C105, from the power source C3 to the switch, and from the switch through line C106 to the coil C104 and return line C12.

The pallet is in its canted position as it is lifted, and one of the side walls of the pallet will strike, and close, a switch C107, mounted on the frame, when the pallet reaches its uppermost position. This switch is in circuit with a switch C108, controlled by cam C102, and a solenoid valve C109 for controlling the valve for the jacking cylinder 174. The circuit includes a line C110 from the power sources C3 to switch C108, line C111 to switch C107, coil C109 and return line C12. Cylinder 174 is a high pressure hydraulic cylinder and a pump C112 is used to pump fluid to the cylinder. The pump C112 is operated through the medium of a time delay relay C113. Coil C114 of the relay is bridged across coil C109, and the contacts C115 of the relay are included in a line C116 which connects to the line C111 and the pump motor C112. Whenever the switch C107 is closed by a pallet reaching its elevated position, the valve for cylinder 174 will be moved to stressing position and coil C114 of the time delay relay will be energized, closing the contacts C115 and energizing the pump motor. As previously described, the pallet will remain in its canted position until the movable header has been moved outwardly a sufficient distance for the lugs 55 to clear the ends of the pallet. At that time the pallet will instantly shift to a position truly normal to the pallet path. This will result in the pallet wall moving out of contact with switch C107 so that the circuit to the valve of the jacking cylinder 174 and to the coil of the relay C113 will be broken. In view of the fact that the relay is a time delay relay, the pump will continue to operate for a sufficient period to return the jacking cylinder to its original position. The valve controlling cylinder 174 is of the spring actuated type so that it will shift automatically as soon as coil C109 is de-energized.

Following return of the jacking cylinder to its original position, cam C101 will shift its switch C103 so that it makes contact with a line C117 in which coil C118 is located. This coil controls operation of the valves for cylinders 166 to operate the cylinders in a downward direction. This will result in the pallet with the stressed cables being lowered back onto the pallet path. The pallet advancing rack will again operate to move the pallet along the pallet track to the molding station.

*Molding station*

When the pallet reaches the molding station 17 (see FIGURES 2a, 3, 4, 33, 34 and 35) it will lift slightly to seat upon pads 176 carried upon a vibrating table 177. The table may take the form of a pair of box beams 178 extending transversely of the machine in spaced parallel relation, and interconnected by a plurality of transverse beams 179. The table is supported upon coil springs 180, located at each corner of the table, encircling vertical rods 181 which project upwardly through the table. Pads 182 are at each corner of the table, forming seating elements resting upon the tops of the coil springs 180.

The table is given its vibratory movement by a vibrating mechanism 183 including a shaft 184 mounted in bearings 185 fixed to the underside of the table. The shaft carries a plurality of eccentric weights 186. Belts 187, running over pulleys 188 on shaft 184 and pulleys 189 on the shaft of a motor 190, will furnish the power for rotating shaft 184 to cause the table to vibrate.

While there is no limitation upon the upward vibratory movement of the table, means are provided to limit the downward movement so that a definite impact will be delivered to the structure each vibratory cycle. The means employed to limit the downward movement of the table consists of a pair of pedestals 191 located beneath the pallet, outside the table ends. The pedestals may have any desired construction, but must be extremely rugged to withstand the repeated impacts delivered during vibration of the table. It will be obvious that the tops of the pedestals must be located at such height that when the pallet strikes them it will still be out of contact with the rollers of the pallet and will result in compacting the be imparted to the pallet and will result in compacting the concrete within the pallet.

It will be noted that the at rest height of the table may be varied by adjusting the position of the springs 180 relative to the machine platform 20. This is accomplished by having the rods 181 threaded for at least part of their lengths, as at 192, and mounting adjusting nuts 193 on the rods. Plates 194 surround the rods and seat upon the nuts to provide seats for the lower ends of the springs.

A vertically movable mold box 195, a concrete supply structure 196, and a stripper head 197 are also located at the molding, or casting, station, and these mechanisms are all above the pallet path.

The mold box 195 is rectangular in shape, and open top and bottom. It is designed to move down into a pallet located at the mold station and to receive the stripper head within it, so that the pallet, mold box and stripper head, when assembled as seen in FIGURE 35, will define the shape of a finished tie. The mold box has a mounting bar 198, which extends the full length of the box and beyond, to provide projecting arms 199 to which guide rods 200 may be attached. Rods 200 are slidable through guides 201 carried by the machine frame 127, and are connected at their upper ends to the piston rods 202 of hydraulic cylinder assemblies 203 secured to the upper members of frame 127. Actuation of cylinders 203 will raise and lower the mold box. The center of mounting bar 198 is cut out, at at 204, to conform to the inner shape of the box. The box proper 205 is made of steel, or similar material, and consists of side walls 206 and end walls 207. The walls all taper downwardly to a feather edge, so that they meet the interior walls of the pallet body. The side walls meet the pallet walls at a wide angle at a distance from the pallet bottom. The mold box end walls are longer, and extend to the bottom of the pallet. The end walls are notched, as at 208, to straddle the stressed cables 209. The mold box tapered walls assure a proper seating of the box in the pallet. Flanges 210, along the tops of the side walls, seat on top of the pallets to properly gauge the depth of entry of the mold box into the pallet.

Concrete is supplied to the mold box when it is seated in a pallet from the concrete supply mechanism 196. This includes a suitable hopper and mixing mechanism 211 mounted on the frame, and a charge box 212 movable from a position under the outlet 213 from the hopper 211 to a position overlying the mold box when in place in a pallet. The charge box slides over a floor 214, moved by cylinder assemblies 215 fixed to the box and to the machine frame. The box is simply a rectangular frame defining an opening the size of the mold box opening. The box carries a cut-off plate 216, which moves across the hopper outlet as the box moves to load-depositing position to cut-off the supply of concrete mix. It will be noted that the mold box mounting bar 198 has a floor plate 217, which lies flush with floor 214 when the mold box is lowered, to provide a continuous floor for the charge box.

Stripper head 197 moves down into the mold box after the concrete charge has been deposited upon the pallet. The purpose of the stripper head is to compress the concrete charge and shape the upper surface to desired contour, to assist in the vibratory settling of the concrete, and to hold the cast element in place while the mold box is withdrawn.

The stripper head consists of a mold plate 218, having a bottom surface 219 of desired contour, fixed to a mounting bar 220. Bar 220 is connected to guide rods 221, slidable in bearings 222 on the frame 127. The guide rods, in turn, are connected to piston rods 223 of hydraulic cylinder assemblies 224, also mounted on frame 127. Operation of cylinders 224 moves the stripper head in and out of the mold box.

As mentioned above, the stripper head assists in the vibratory settlement of the concrete in the mold. To this end, vibrating mechanism 225 is carried by the mounting bar 220. This consists of a motor 226, mounted upon a support 227, and having its shaft coupled by belts 228 with a vibrator shaft 229. Shaft 229 is mounted in bearings 230 and carries eccentric weights 231.

When a pallet moves into the molding station, mold box 205 and stripper head 218 are in the up position, and the charge feed drawer 212 is in its retracted position under the hopper. With the parts in this position, double pole switches C119, C120, C121 and C122, which will be described in detail, are in the positions shown in the electrical diagram, FIGURES 8a and 8b. After the pallet reaches the mold station, a cam C123, on the master cam shaft C1, operates its switch C124 to energize coil C125 of a solenoid valve controlling cylinders 203 of the mold box assembly, to cause the cylinders to operate to move the mold box downwardly. At this time, contact C126 of the switch C120 is closed. This switch is located on the machine frame, and operated by the feed drawer when the feed drawer is in its retracted position. This insures the retraction of the feed drawer at the time the mold box moves downwardly. The circuit for controlling the downward movement of the mold box includes wire C127 from power source C3 to switch C124, wire C128, closed contact C126 of switch C120, wires C129 and C130, coil C125 and return line C12.

As the mold box moves to its downward position, it operates switch C122 located on the machine frame to open contact C131 of that switch, and close contact C132. This conditions the feed drawer circuit so that, when its cam C133 closes switch C134, a circuit is completed through coil C135 of the solenoid valve controlling cylinder 215 to move the feed drawer 212 forward from its position under the hopper to a position overlying the mold box. This circuit includes a wire C136 from the power source C3, switch C134, line C137, closed contact C138 of double pole switch C121, wire C139, closed contact C132 of switch C122, wire C140, coil C135 and return line C12. Concurrently with the forward movement of the charge feed drawer, a cam C141 operates its switch C142 to complete a circuit through lines C143, C144, C145 to the table vibrating motor 190 so that table 183 is caused to vibrate as the charge of concrete drops into the mold box from the feed drawer.

Cam C133 next operates its switch C134 in the opposite direction, closing with line C146 to complete a circuit to coil C147 which causes cylinder 215 to begin its retractive movement to return the feed drawer to its position under the hopper. At this time cam C141 again operates its switch C142 to stop operation of vibrator motor 190.

Continued rotation of the cam shaft causes cam C148 to operate its switch C149 to complete a circuit through wire C150, switch C149, line C151, closed contact C152 of the switch C119, line C153, and coil C154 of a solenoid valve controlling cylinders 224 of the stripper head to cause the stripper head to move downwardly.

Cams C155 and C156 then operate to close their respective switches C157 and C158 to close circuits to the vibrator motor 226 on the stripper head, and the vibrator 190 on the table. The circuit for motor 226 includes line C159, switch C157 and line C160. The circuit to motor 190 includes line C161, switch C158, line C162 and line C145. After a predetermined period of vibration, cams C155 and C156 operate their respective switches to open the circuits to the two vibrator motors and stop their operation.

Cam C123 next operates its switch C124 to de-energize coil C125 and to energize coil C163 to shift the solenoid valve controlling cylinder 203, to cause the mold box to begin its upward movement. As the mold box lifts and contacts the stripper head, cam C148 operates its switch C149, de-energizing coil C154 and energizing coil C164 through line C165. This will shift the valve controlling cylinders 224 so that the stripper head will move upwardly. The stripper head and mold box move upwardly together. When they reach their uppermost positions, the cycle of operation has been completed and the pallet with the casting in place will move out of the molding station.

*Car loading mechanism*

After the concrete members have been poured, compressed, and vibrated, and the mold box and stripper head raised the pallet is advanced along the pallet track to the station 18, where it is lifted from the track and loaded onto a kiln car 8 for transportation to the curing tunnel 5.

The car loading mechanism (See FIGURES 2a, 36 and 37) includes a frame 232 having a longitudinally extending track 233 at its top, along which a carriage 234 moves. The carriage has a lift 235 by means of which pallets can be raised from the pallet track and lowered to proper stacked position on the kiln car.

Frame 232 may take any suitable form, and is shown as including vertical members 236 at opposite sides of the machine platform 20. The several members 236 at each side are connected by top rails 237 upon which the track 233 is laid. The track is V-shaped, and carriage 234 has V-groove wheels 238 to ride on the track.

The carriage has a principal beam 239, extending across the machine platform 20 and connected at its ends to short inverted U-shaped channels 240 which form truck frames to mount the wheels 238. There are two wheels, in each truck, and beam 239 is located centrally between the wheels so that a stable, balanced carriage is obtained.

Lift mechanism 235 includes a pair of pallet engaging channels 241, each having a lower ledge 242 over which the upper flanges of headers 38 and 39 of pallets arriving at the removal station will ride. The normal, inoperative position of the channels (See FIGURE 36) is such that the header flanges may move freely over ledges 242 and come to rest with the ledges underlying the flanges, so that upon upward movement of the channels the ledges will engage the header flanges and lift the pallet from the pallet track. Channels 241 are mounted upon piston rods 243 of hydraulic cylinder assemblies 244. As the cylinders are operated, the channels 241 will be raised and lowered as required, as will be described in detail.

Carriage 234 is moved along the tracks 233 by means of a cylinder assembly 245, which is connected to the frame 232, as at 246, and has its piston rod 247 connected to the carriage at 248.

The car loading mechanism is set into motion by arrival of a loaded pallet at station 18.

At the line the pallet arrives, the lift carriage 234 must be in its retracted position, that is, at the end of track 233 adjacent the molding station. In this position, the carriage is in contact with the control arm of a switch C166, mounted on frame 232, and holding that switch closed. Switch C166 is connected by lines C167 and C168 with the power line C3. There are two switches C169 and C170, connected in series with one another and with switch C166, which are actuated by a pallet arriving at the loading station. Switches C169 and C170 are located on the pallet track in position to be struck by pallets moving into the station. The closing of switches C169 and C170 completes a circuit through a coil C171 of a solenoid valve controlling the lifting movement of lift cylinders 244. This circuit is from line C3, through lines C167, C168, switches C166, C169, C170, line C172, coil C171 and line C173 to return line C12. This will start the lift moving upwardly.

It will be understood, that there will be some clearance between the lift ledges 242 and the upper flanges of the pallet headers 38 and 39, to permit free movement of the pallets into the station. The initial upward movement of the lift will close this gap and engage the ledges with the header flanges to raise the pallet. One of the pallet engaging channels 241 of the lift carries a switch C174, having contacts C175 and C176 which open and close together, and a contact C177 which operates in opposite phase to contacts C175 and C176. When the pallet header flange contacts switch C174, contacts C175 and C176 are closed and contact C177 opens. It will be seen that contact C175 is in a line C178 which bridges contacts C169 and C170. Thus, even though the pallet is lifted from contact with switches C169 and C170, the circuit through coil C171 is maintained and the lift will continue to rise.

When the lift reaches its top position, the channels 241 will strike switches C179 and C180, mounted on the carriage frame which will complete a circuit to coil C181 of the solenoid valve controlling operation of carriage moving cylinder 245, causing the carriage to start forward. As soon as the carriage begins its forward motion, switch C166 is opened, breaking the circuit through the lift raising control coil C171. The circuit to the coil C181 includes lines C167, C182, switches C179 and C180, a closed switch C183, line C184, coil C181 and line C185 to return line C12. The carriage continues its forward movement until it reaches its extreme position, at which time the carriage strikes, and opens, switch C183, mounted in the frame 232, to break the circuit to coil C181 and stop carriage movement.

At the time switch C183 opened, contacts C186 closed. These contacts are in a circuit including the solenoid coil C187 controlling downward movement of the lift. This circuit includes line C3, line C167, line C188, contacts C176 of switch C174, now closed contacts C186, line C189 to coil C187, and line C190 to return line C12. When this circuit is completed by the closing of contacts C186, the lift will start down carrying the loaded pallet. At this time, the carriage is at its forward position, and the pallet is beyond the forward end of the pallet track where it can be lowered onto a car 8 traveling along its orbited path. As the lift moves down, switches C179 and C180 will open.

The first pallet will be lowered to the car bed, or platform, and subsequent pallets will be piled upon the first. After a stack of predetermined number has been completed the car moves forward, as will be described, and a new stack is started. The fact that the weight of the pallet is carried by the lift channels, and this weight is used to actuate switch C174 and its contacts C175, C176 and C177, the lift lowers the pallet to a position of rest on the car bed, or upon previously loaded pallets, as the case may be, and the lowering action automatically ceases when the pallet comes to rest. When the pallet load is removed from the lift channels, switch C174 operates to open contacts C175 and C176, and to close contacts C177. This opens the lift lowering circuit through coil C187, opens the auxiliary contacts C175 in the lift raising circuit through coil C171, and closes a circuit through coil C191 of the valve controlling backward movement of the carriage. The circuit through coil C191 includes line C167 from the power line C3, line C192, switch C193 (operating with switch C166 in opposite phase), switch C177, line C194, coil C191, and line C195 to return line C12. When this circuit is closed, the carriage moves back to its position over the pallet track.

As the carriage starts back, switch C183 is closed (but as switches C179 and C180 are open the carirage forward circuit remains open) and contacts C186 are opened. When the carriage reaches its fully retracted position, it strikes and opens switch C193 to break the carriage retracting circuit and stop motion of the carriage. Switch C166, closes simultaneously with the opening of switch C193.

The closing of switch C166 completes a circuit through bridge line C196 and limit switch C197 (now closed) to coil C171, to start the lift moving upwardly. The lift rises until it strikes switch C197, mounted on the frame, and opens the circuit to coil C171. As all of the switches in the several parallel circuits to coil C171 are now open, with the exception of switch C166, the lift stops. The switch C197 is located so that the lift stops with the channels 241 properly located to receive another pallet as it moves into the station.

Kiln cars

Kiln cars 8, upon which the pallets with molded concrete members thereon having the stressing cables held under tension are loaded and transported, may have any desired construction so long as they are provided with a flat bed 249 mounted upon wheels 250 for movement along track 251, laid through tunnel 252 provided in the base 9 of the forming machine between the walls 19 and bridged by the platform 20. The cars must also be provided with depending members for engagement with car advancing means and car positioning means to be described. To this end, the cars have centrally located, depending end plates 253, fixed to the car bed ends and extending downwardly beneath the car bed and car axles 254. (See FIGURES 2a, 2b, 2c and 9).

Kiln car advancing means for machine leg of path

During loading of a car 8, the car is moved forward step-by-step as previously mentioned, as the stacks of loaded pallets are completed. The stepped movement of the cars is merely sufficient to advance the car to permit the loading of another pallet stack. This movement is accomplished by means of car advancing means 255 (see FIGURES 2a, 2b, 2c, 38, 39 and 40). This consists of a frame 256, mounted between the rails of track 251 near the entrance end of the forming machine, an advancing bar 257, slidably mounted on the frame and having a plurality of spaced pusher dogs 258, and a back-roll preventing mechanism including a plurality of holding latches 259 pivotally connected to the frame 256.

Frame 256 has parallel side members 260, held in proper spaced relation by cross-members 261. Guide rails 262 are held above the frame by brackets 263 mounted on the cross-members. Elongated connectors 264 slide horizontally between the guide rails and carry a plurality of pusher dogs 258. The dogs are pivotally attached to the connectors at spaced points, as at 265, and are provided with stops 266 to contact stop lugs 267 on the connectors to limit the upward movement of the car engaging ends 268 of the dogs. Springs 269, fixed to the dogs and connectors, yieldingly hold the dogs in operative position to engage the end plate 253 of a car positioned above the advancing means. The dogs are free to rock downwardly to pass under plates 253 during retractive movement of the connectors. The dogs are spaced apart a distance equal to the pusher stroke. The stroke is accomplished by means of a cylinder assembly 270, fixed to the frame and having its piston rod 271 secured to the connector 264. Thus, operations of the cylinder 270 will result in horizontal reciprocatory movement of the pusher dogs to advance the cars the required step and retract to prepare for another pushing movement.

In order to prevent back-roll of the cars, the latches 259 will engage the car end plates upon release by the pusher dogs. Latches 259 are weighted levers, pivoted at 272 to brackets 273 mounted on the frame. The latches are free to rock down as the car end plates pass over them, and will rock automatically to latching position.

It is necessary that the cars be accurately positioned at the loading station so that the stacks will be properly located. The car location is assured through use of car-positioning means 274, adjacent the loading position, to be operative upon the particular car at that location. This includes a fixed frame 275 having brackets 276 permanently connected to it. Positioning dogs 277 are pivoted to the brackets, at 278, to allow for substantially vertical swinging movement of the dogs, to permit their hooked, free ends 279 to engage and release the car end plates 253. The dogs are raised and lowered by links 280 which have their ends pivotally connected at 281 to the dogs, and at 282 to a horizontally slidable bar 283. Bar 283 is connected to the piston rod 284 of a cylinder assembly 285 mounted on the frame. Cylinder 285 is a single acting one, and the bar is returned to its original position by a spring 286.

As the entire movement of the kiln cars 8, that is along the machine leg 2 of the orbital path, across the transfer pit 6, along the curing tunnel leg 4 and across transfer pit 7 back to the machine leg, is integrated and interdependent, the controls for the machine leg movement will not be described until the structure of the remaining parts of the car path are described.

*Transfer car*

After a kiln car 8 is loaded at the pallet unloading station 18, it is moved onto a transfer car 287, in the transfer pit 6, for transfer from the machine leg 2 of the kiln car orbit, or path, to the curing tunnel leg 4 of that path. The movement of the kiln car onto the transfer car is accomplished partly by operation of the car advancing means 255 and partly by means carried by the transfer car, as will be described.

The transfer car (see FIGURES 1, 2a, 41 through 47) is shown as comprising a frame 288, having side sills 289 which carry journal boxes 290. Axles 291 supporting flanged wheels 292 are rotatably mounted in the journal boxes. The car rides upon rails 293 laid on the floor of pit 6. Sills 289 are spaced apart transversely of the car by beams 294, and rails 295 are mounted upon them to support kiln cars. Stops 296 are secured at the ends of the rails 295 to limit travel of the kiln cars on the transfer car.

Kiln cars are moved onto the transfer car a prescribed distance by the advancing means 255, whereupon a car puller 297 becomes operative to draw the car the remaining distance to bring the kiln car wheels into contact with the stops 296. The car puller is constructed as a sub-assembly, including side frames 298 held in spaced parallel relation by cross-members 299. This sub-frame is bolted to the transfer car main frame 288 at the side farthest removed from the forming machine. Sprocket wheel shafts 300 and 301 are mounted in the side frames 298, and carry sprockets 302 and 303 around which a chain 304 travels. The chain has a puller-dog 305 attached to it that is adapted to contact the depending end plates 253 of kiln cars and draw the cars fully onto the transfer car and hold the kiln car wheels in contact with stops 296. Shaft 301 carries a sprocket 306 over which is trained chain 307 which also passes over sprocket 308 on a motor and speed reducer unit 309.

The operation of puller chain 304 is controlled in part by switches 310 and 311 carried on brackets secured to one of the side frames 298. The switches are actuated in alternation by means of a cam 312 mounted upon a shaft 313 journalled in side frame 298. The cam is rotated by a sprocket 314 on shaft 313 through chain 315, from sprocket 316 carried by shaft 300.

Transfer car 287 is moved along rails 293 by means of a sprocket 317 traveling along a chain 318. The chain is anchored at its ends, as at 319, to the pit floor adjacent the pit ends. The chain lies free on the pit floor, and is trained about idler sprockets 320 on the car and over drive sprocket 317. Sprocket 317 is mounted on shaft 321 journalled on the car frame. Shaft 321 also carries a sprocket 322 driven from motor 323 by chain 324. Motor 323 is a variable speed one, and has its speed controlled by arm 325 which carries a cam roller 326. Cam track 327 is fixed upon supports on the pit floor and provides a cam surface along which cam roller 326 rides as the transfer car moves across the pit. As the roller raises and lowers in accordance with the cam track contour, arm 325 is rocked to actuate motor control 328.

When a kiln car has been drawn fully into the transfer car, controls (to be described) will cause the transfer car motor to be energized, and the car will move along the pit rails 293. Upon reaching the far side of the pit 6 the transfer car will stop with its rails 295 in alignment with rails 329 laid along the floor of the kiln, or curing tunnel, 5.

At the top of the wall of pit 6, facing the kiln car path 4 through the tunnel, there is a kiln car pushing assembly 330 (see FIGURES 1, 46, 47 and 48), which initiates the movement of the kiln car off of the transfer car into the tunnel tracks 329. This assembly includes a base plate 331, fixed to the top of the pit wall, upon which a cylinder 332 having a piston rod 333 is mounted. A pusher plate 334 is fixed to the piston rod to contact the depending end member 253 of the kiln car. When the piston rod is extended, a kiln car will be pushed from the transfer car a sufficient distance for the kiln car to be picked up by a car advancing means 335 located in the tunnel 5.

*Kiln car advancing means curing tunnel leg*

The car advancing means (see FIGURES 46 and 47) 335 is essentially the same as that for moving the cars along the machine or casting, line. It consists of a frame 336 mounted on the tunnel floor and supporting a hydraulic cylinder 337. The piston rod 338 of the cylinder assembly is connected to a slide 339, mounted for movement along the frame 336 and carrying a pusher dog 340. The dog is pivotally connected to the slide so that it can swing under the kiln car projections 253 or the retractive stroke, and a spring 341 brings the dog back to operative position. The principal difference between the advancing means 335 and the one on the machine side of the unit lies in the length of the cylinder stroke. The advancing means in the tunnel has a stroke equal to a car length, so that each stroke a kiln car will be drawn into the tunnel from a transfer car in pit 6 and a kiln car will be pushed from the tunnel onto a transfer car in pit 7.

It is necessary to hold the kiln cars precisely positioned in the curing tunnel as it was along the casting line. To this end, a positioning assembly 342 is located at the discharge end of the tunnel. Here again, the structure is similar to that used on the casting line side, but only one positioning arm 343 is used as each stroke is one entire car length. The arm is pivotally connected to a frame 344 and operated by link 345 through hydraulic cylinder assembly 346. The positioner arm 343 will be lowered by operation of cylinder 346 in timed relation to the operation of the advancing means 335 so that cars may be pushed from the tunnel in timed sequence.

Cars pushed from the tunnel move onto a transfer car 287′ in the pit 7. This transfer car is constructed exactly the same as the one previously described for pit 6. The sequence of operation is different, but the structure and controls are similar. Parts of the transfer car 287′ are indicated by the same reference numerals primed as similar parts of the car 287.

When a kiln car is pushed onto the transfer car 287′, the kiln car is picked up by the car puller assembly 297′ and drawn into abutment with the stop 296′ as before. Motor 309′ then drives the transfer car along the pit until the car rails 295′ are in alignment with track 251 of the casting machine leg of the kiln car orbit.

Car 8 receives its initial movement from the transfer car from a pusher assembly 330′ at the edge of pit 7 in alignment with track 251 (see FIGURES 1 and 38). The assembly is identical with assembly 300 at pit 6 and similar parts have been given similar reference numerals primed. It is sufficient at this point to state that the pusher stroke is long enough to move the car to a position where it will be engaged by the casting line car advancing means 255. Thereafter, the car advancing means will control movement of the car which will be increments equal to the distance center-to-center of pallet stacks on the car.

*Kiln car advancing means and transfer car control system*

As mentioned above, the several kiln car advancing means and positioning means, as well as the transfer cars have an integrated control system, which ensures proper timed operation of the various parts with respect to each other and with respect to movement of pallets along the pallet path on the casting line.

When a kiln car is fully loaded with cross tie-bearing pallets, it is moved step-by-step by the casting line car advancing means 255 onto the transfer car 287 until the leading downward projector 253 of the car has reached a position overlying the chain 304 of the car puller mechanism 297. At this time, the car strikes a normally open switch C198 located on the kiln car track 295 which closes a circuit through the motor 309 to start the puller chain moving. The puller dog 305 will contact the car end plate projection 253 to draw the kiln car fully onto the transfer car into contact with the stops 296. The circuit includes a line C199 from the power source C3, line C200, switch C198, switch 310 on the transfer car, the coil of a motor starting relay C201 and wire C202 and C203 to return line C12. Energizing relay C201 closes its contacts C204 on a line C205 bridging the switch C198. Thus, the switch C198 need be closed only momentarily, as a holding circuit is established through line C205 and contacts C204. When the kiln car is in loaded position, the cam 312 will have operated to open switch 310 to stop the puller mechanism motor. Car 8 strikes a switch C206 on the transfer car as it reaches loaded position, engaging motor starting relay coil C207 and starting the transfer car motor 323 to set the transfer car in motion. This circuit includes wire C199, line C208, switch C206, a switch C209 on the transfer car, switches C210 and C211, which are in the car advancing assemblies 255 and 335 to indicate those assemblies are properly positioned before transfer car movement starts, relay coil C207 and line C212 to line C203. Contacts C213 of relay C207 are in a holding circuit C214 bridging switch C206. As the transfer car reaches the end of pit 6, it strikes and opens normally closed switch C209 to stop movement of the transfer car.

In addition to actuating switch C209, the transfer car also strikes and closes switch C215 when it reaches the pit end at the kiln side. This closes a circuit through solenoid valve coil C216 to initiate advancing movement of the pusher plate 334 of the cylinder assembly 330, which pushes the kiln car part way off the transfer car onto the rails 329 in the drying tunnel. At the same time, switch C217 is closed to start the car pulling motor 309 in reverse to run the puller dog 305 away from the car end plate 253 to permit the cylinder assembly 330 to push the kiln car from the transfer car. The cylinder assembly circuit includes wire C199, line C218, switch C215, switch C219 on the cylinder assembly, coil C216 and line C220 to line C203. When pusher plate 334 reaches its limit of travel it strikes and opens switch C219 to break the circuit and halt the pusher plate. The motor 309 reversing circuit includes line C199, line C221, switch C217, switch 311 on transfer car, reversing starter relay coil C222 for motor 309, and line C223 to line C203. Operation of switch 311 by cam 312 breaks the motor reversing circuit. A holding circuit C224, including relay contacts C225, is used in the motor reversing circuit, so that a momentary pulse is all that is required to start the motor.

As the kiln car is pushed from the transfer car to the tracks 329 in the kiln, it strikes switch C226 on the kiln floor to operate a solenoid valve C227 to allow liquid to enter cylinder 337 of the car advancing means 335, to pull the car into the kiln. At the same time, positioning cylinder 346 is operated through solenoid valve C228 to retract positioning arm 343 so that the end kiln car can be pushed out of the kiln onto the transfer car 287' in the pit 7. Closing switch C226 actually energizes two relay coils, a control relay C229 and a timer relay C230, and these relays actuate a number of circuits. The relays are energized through line C199, line C231, switch C226, switch C232 on the advancing cylinder 337, line C233 to coil C229 and wires C234 and C203. A branch line C235 is connected to line C233, and connects coil C230 from line C233 to line C203. When relay C229 is energized it closes contacts C236 to complete a holding circuit C237 and switch C226.

The solenoid C227 is energized to cause car advancing means 335 to draw the kiln car into the kiln when the control relay C229 is energized and the relay contacts C238 are closed. This completes a circuit from line C199 through wire C239, contacts C238, and solenoid valve C227 to line C203. This circuit remains operative until cylinder 337 completes its stroke and opens switch C232 to break the circuit to relay C229.

The solenoid valve C228 of the positioning assembly 342 is energized also by the operation of the relays C229 and C230. When relay C229 operates, it closes contacts C240, and when relay C230 operates it closes contacts C241, thereby completing a circuit through line C242 from line C199, through contacts C240 and C241, and solenoid C228 to wire C203. This draws down the positioning arm 343 allowing the cars in the kiln to be moved. The arm stays down for the timed period of relay C230, whereupon contacts C241 open, and relay C230 contacts C243 close and energize solenoid C244 of the positioning assembly to return the positioning arm to operative position. When the arm contacts a kiln car end plate it opens switch C245 and de-energizes the solenoid C244.

After the above operations are complete, the car advancing means 335 actuates switch C232 to open the circuits through the relays. This permits contacts C246 of relay C229 to close, energizing solenoid C247 to reverse the operation of the car advancing cylinder. Contacts C246 and solenoid C247 are connected in series across lines C199 and C203 by means of line C248.

The transfer car can be returned to its original position in alignment with the kiln car track at the casting line side of the unit as soon as the kiln car is moved from it. In order to make the return movement of the transfer car dependent upon the removal of the kiln car, a photo-electric cell C249 is mounted upon the transfer car at one side (see FIGURE 41) and a light source C250 is located at the opposite side of the car. The cell and light source are mounted adjacent the entrance side of the transfer car so that a kiln car on the transfer car will block the light during transfer from one side of the pit to the other and during removal of the kiln car from the transfer car. As soon as the kiln car moves off the transfer car the cell is energized. This completes a circuit from the wire C199, through wire C251, photo cell C249, switch C252 at the casting line side of pit 6, and the coil of reversing relay C253 for the transfer car motor. The relay closes contacts C254 in a holding circuit C255 around the photo-electric cell. When the transfer car reaches its original position, it strikes and opens switch C252 to stop the motor.

When a kiln car is drawn from transfer car 287 into the kiln tunnel, a car at the opposite end of the kiln is pushed onto transfer car 287' in pit 7. The kiln car is drawn the last part of the movement onto the transfer car by the car puller assembly 297', as described in connection with the sequence of operation in pit 6. In fact, the kiln car is loaded and the transfer car moved across the pit in precisely the same manner as in pit 6, except that the kiln car advancing means on the kiln side of the orbit has a stroke equal to a kiln car length, whereas on the casting line side the advance is by increments equal to the distance center-to-center of pallet stacks on this kiln car. When the transfer car 287' reaches the casting line, it stops, and cylinder assembly 330' pushes the kiln car part way toward the casting machine. The car advancing means 255 on the casting line then engages the kiln car and the kiln car will be moved in increments off the transfer car 287' and along the casting line. When the kiln car moves from the transfer car 287', the photo-electric cell becomes operative to return the transfer car to the kiln side of the orbit. The car will arrive before car 287 in pit 6 arrives at the kiln side to unload a kiln car.

*Pallet loading device*

As the kiln car starts down the casting line track, it first arrives at the pallet receiving station 10, where a loading device 347 lifts the pallets containing cured concrete members singly from the car and places them on the pallet track 21 (see FIGURES 2a and 52). The kiln car unloading device is a structural duplicate of the one at the pallet removing station 18, but reversed in position and having a somewhat different control system.

Loader 347 is located at the approach end of the machine platform 20 and has a frame 348 supported on the platform. The frame carries horizontal rails 349, upon which carriage 350 rides to move from a position overlying a pallet stack position on the kiln car to a position overlying the pallet track. The carriage includes a lift mechanism 351. As the structure just mentioned is the same as at the pallet removing station 18, it is not thought necessary to described it in more detail. The carriage is moved by a cylinder assembly 352, and the lift is raised and lowered by another cylinder assembly 353. The lift carries a pair of pallet engaging channels 354 to embrace the pallet header upper flanges to enable lifting of the pallets.

When a kiln car moves into position at the pallet receiving station, the lift channels 354 will be at the proper height to move back into embracing relation with the upper flanges of the headers of the top pallet of the first stack in the car. The lift will then rise to its top position, the carriage will move forward to carry the pallet over the pallet track, and then lower to seat the pallet on the track. The pallet advancing cylinder 31 will actuate to move the pallet forward out of the lift channels. The lift will then lower until its channels are at the level of the next lower pallet of the stack on the kiln car, and the carriage will move rearwardly to engage the channels with the pallet headers. The lift will raise, and the carriage will move forward to bring the pallet over the pallet track as before. This action will be repeated, with the lift channels moving down one step lower each operation to engage the next lower pallet until all of the pallets of the first stack have been removed. The kiln car will then move forward one stack position, and the cycle will be repeated.

The control system for the pallet loading device is shown in FIGURE 50. The circuit will be connected into the main power line C3 and the return line C12. The circuit includes a pair of impuse counters C255 and C256, a relay C257 having normally open contacts C258 and C259 and normally closed contacts C260 and C261, solenoid coils C262 and C263 for controlling the valves of lift cylinder 353 to raise and lower the lift, respectively, and solenoid valves C264 and C265 for the valve of carriage cylinder 352 to move the carriage forwardly and rearwardly, respectively, and a number of limit switches.

When a pallet has been placed upon the pallet track, switch C266, located at the track, is opened breaking the circuit to the lift lowering coil C263 so that the loading device is at rest. If this is the bottom pallet of a stack removed from a kiln car, the connector C255 will have its counter hand C267 at 0 contact of its counter contact series C268, and the counter C256 will have its hand C269 at the No. 1 contact of its counter contact series C270. The coil of relay C257 will be deenergized, so that contacts C258 and C259 will be open and contacts C260 and C261 will be closed. The loader is now ready to begin its cycle, which includes the moving of all pallets of one stack on a kiln car onto the pallet track.

As the pallet advancing mechanism operates to move the pallet out of the pallet receiving station, switch C266 closes completing a circuit to the solenoid C263 to shift the control valve for cylinder 353 to start the lift downward. This circuit includes wire C271 from line C3, wire C272, closed contacts C260 and C261, line C273, closed contact, C266 and C274 (on the loader frame, and closed by the carriage when in forward position), coil C263 and line C275 to return line C12. As the lift lowers, an arm of a switch C276, located on the carriage adjacent one of the lift guide rods 355, will fall into the first of a series of notches, or recesses, 356 on the rod 355. The number of recesses will be equal to the number of pallets in a stack. As switch C276 operates, it closes a circuit through the counter coil C277 of counter C255, through wire C278 from line C3 to line C12, and causes the counter hand C267 to move to the No. 1 contact. As the hand C269 of counter C256 is also at its No. 1 contact, a circuit is closed energizing relay C257 to close contacts C258 and C259 to complete a circuit through solenoid coil C265, to start the carriage moving back to the kiln car position. Contacts C260 and C261 open to break the circuit to solenoid C263 and stop downward movement of the lift. This will position the lift channels 354 at the proper level to engage the top pallet of a stack on the kiln car when the carriage reaches the car position. The circuit through the counter hands includes wire C271, wire C279, hand C267, contact No. 1 of counter C255, wire C280 to contact No. 1 of counter C256, hand C269, and through wire C281 and coil of relay C257 back to line C275. As the carriage leaves the pallet track position, switch C274 in the lift down circuit opens so that the lift cannot move downward until the carriage is again in its forward position.

When the carriage arrives at the kiln car position, the lift channels will embrace the pallet headers, and the carriage actuates a switch C282 located in the elevator frame at the carriage back position. This completes a circuit from line C275 through switch C282, solenoid C262 and line C275 to energize the solenoid and start the lift moving upwardly, raising the pallet from the car. As the lift rises, the switch C276 will recount the recess in the guide rod 355 and the counter hand C267 will move to No. 2 contact. As counter hand C269 is still at its No. 1 contact, the circuit to the coil of relay C257 will be broken and contacts C260 and C261 close, while contacts C258 and C259 open. This opens the circuit through the carriage back solenoid C265. When the lift reaches its upper position, it closes a switch C283 which completes a circuit from wire C271, through wire C284, solenoid C264, controlling forward movement of the carriage, and wire C275. At the same time, a switch C285 in the carriage back circuit is opened. The carriage will now move forward, and switch C282, in the lift up circuit will open.

When the carriage arrives at the forward position over the pallet track, it will strike and close a switch C286. This switch is included in circuits to a coil C287 which releases counter hand C267 and returns it to zero, and a coil C288 which is the counter coil for counter C256 and causes the hand C269 to advance to the No. 2 contact. At the same time that switch C286 is closed, switch C274 will close completing the circuit to the solenoid coil C263 so that the lift will start to move downwardly. When the pallet seats on the track, switch C266 will open, breaking the circuit through the coil C263 and stopping the downward movement of the lift.

This operation completes one cycle of transfer movement of the elevator. As soon as the pallet on the track moves forward a second transfer cycle will begin. This will be the same as the first, except the lift will move to a lower level, due to the fact that the counter hand C269 is at the No. 2 contact and the switch C276 will have to pass two recesses 356 on the guide rod 355, to bring the hand C267 to its No. 2 contact to complete a circuit through the counter connecting wire C289 to the coil of relay C257, to open contacts C260 and C261 to break the circuit to coil C263 and so stop downward movement of the lift. Thus, each transfer cycle, the hand C269 will advance to the next higher contact and it will be necessary for the lift to move lower so that the switch C276 can count an additional recess before a circuit will be completed to stop the lift downward movement. This will bring the lift channels to the proper level each transfer cycle to engage the uppermost pallet left on the stack being loaded on the machine.

When the counter hand C269 has reached contact No. 6, which is the total of the stack height illustrated, the counter hand C267 will move to its contact No. 12 during the recess re-count as the lift rises. This will complete a circuit from wire C271 through wire C279, hand C267, contact No. 12, line C290, release coil C291 for counter C256 to line C275. This will return the counter C256 to zero and complete a stack loading cycle. The kiln car will now be advanced to bring the next stack to loading position and the cycle will be repeated.

*Controls integrating kiln car and pallet movement*

It is essential that the operation of the unloader at the pallet removing station 18 and the loader at the pallet receiving sation 10 be properly timed with the movement of the kiln cars around their orbit so that the proper number of pallets will be removed from one car and placed upon the pallet track, and an equal number of loaded pallets be removed from the pallet track and stacked on a kiln car prior to movement of the kiln cars. To this end, a control circuit is employed to hold open the kiln car operating circuits until such time as the unloader and loader at the stations 10 and 18 have each completed a full stack transfer cycle. This is accomplished by the use of step counters C292 and C293 at the stations 10 and 18, respectively, and a time delay relay C294 which makes and breaks the circuit controlling the kiln car movement. (See FIGURE 49.)

Counter C292 at the pallet receiving station 10 has a counting hand C295, an arcuate series of counting contacts C296, a counter coil C297 and a release coil C298. Switch C299, which is a normally closed switch, is carried by one of the lift channels 354, on the lower flange, so that when a pallet is suspended from the channels the switch is held open. Thus, each time a pallet is deposited upon the pallet track, switch C299 will close. This completes a circuit from power line C3, lines C300 and C301, switch C299, counter coil C297 and line C302 to return line C12, and causes the counter hand C295 to advance one contact on the series C296. It will be clear that each time a pallet is deposited on the pallet track the counter C292 will make one count.

Counter C293, at the pallet removing station 18 has a counting hand C303, counting contacts C304, counting coil C305 and release coil C306. Switch C307 is in circuit with the counting coil C305 through wires C300 and C302 to actuate the counting coil and move the counting hand one contact each time the switch is closed. Switch C307 is carried by one of the lifting channels 241 at the pallet removal station. Thus, each time a pallet is removed from the pallet track and deposited on a kiln car the counter C293 will count one.

If the pallet stacks on the kiln cars are to contain six pallets, as illustrated, the counters C292 and C293 are connected in a circuit to close the car movement control circuit when the two counters have reached a six count. Therefore, the two counter hands are connected by wire C308, the No. 6 contact of counter C292 is connected by wire C309 with line C3, and the No. 6 contact of counter C293 is connected by wire C310 with return line C12. The coil of relay C294 is in the line C310, so that when the two hands have reached their No. 6 contacts the relay will be energized. This will close contacts C311, C312 and C313 of the relay. Contact C311 is in a bridge wire C314 across the wires C309 and C310 to provide a holding circuit for the relay so that the relay may remain energized even though the counters return to zero. Contact C312 is in a line C315 which connects with the line C3 and the counter release coils C298 and C306. The opposite sides of the release coils are connected to wire C302. It will be clear that when the relay is energized the release coils will be activated to reset the counters to zero. The relay coil is held energized, however, by the holding circuit through contact C311. Contact C313 is in the main supply line C199 for the car moving control circuit, and when the switch closes the car moving system will be operative to advance the kiln cars one step along the casting line track. The relay C294 will be timed to permit one cycle of car movement and then will break the holding circuit, thus breaking the circuit through line C199.

*Cable cutting station*

The pallets which are unloaded from the kiln cars and onto the pallet track at the pallet receiving station 10 are moved along the pallet track until they arrive at the cable cutting station 11. Here, the cables 209 are cut free from the headers so that the cable tension is released to the cured concrete member, and the member is free to be removed from the pallet. (See FIGURES 2c, 51 and 52.)

At the cable cutting station, there is a frame 357 supported upon the machine platform 20. The frame includes a standard 358 at one side of the pallet track, and a standard 358' at the other side. The two standards are connected at their tops by a bridge beam 359 which extends across the pallet track. Standard 358 is composed of two legs 360, spaced apart transversely of the machine platform and interconnected by vertically spaced, horizontal base plates 361. One of the plates is at the tops of the legs and the other is at a level below the tops of pallets on the pallet track. Brackets 362 are mounted at the ends of the base plates and form supports for vertical guide rods 363. Rods 363 slidably receive bushings 364 at the rear of a saw motor bed 365. A saw motor 366 is fixed to the bed and carries an abrasive saw 367 upon its shaft 368. The vertical plane of the saw will pass through the exposed cables between the end of the cast members and the pallet headers of pallets on the pallet track. The exposed cables span the space at the pallet ends occupied by the mold box ends 207 during the casting operation. A cylinder assembly 369 has its cylinder 370 mounted on the upper base plate 361, and its piston rod 371 fixed to the motor bed 365. Operation of the cylinder will cause the bed to lower and rise on the guide rods 363.

Standard 358' is identical to standard 358 and has a similar motor and saw mounted upon it. The parts of the standard and saw are given the same reference numerals with a prime affixed.

It is necessary in operating the cable cutting saws to cut the cables at one side of the pallet and then those at the opposite side. This will prevent jamming and breaking the saws in the event one saw should cut through the cables before the other, thus allowing the concrete member to jump to the opposite side under cable tension. Therefore, it is desirable to cut through the upper cables at one side, then the lower ones, and then repeat this procedure on the opposite side.

The controls to accomplish the above-stated operation are timed from the main control camshaft C1 by means of a cam C316. The cam has a notch C317 into which switch arm C318 will fall to start operation of the saw cycle.

The saw motors 366 and 366' are connected to heavy duty power lines of the system. A common wire C319 of the motor circuits is connected to the primary winding of a transformer C320. The motors run continuously during machine operation, and increases in motor load will cause the motors to draw more current and thereby increase the current induced in the secondary winding of the transformer C320. This permits motor load to be used to control the cutting operation as will be described.

The step-by-step operation of the motors is achieved by means of a step counter C321 which has a hand C322, a series of counter contacts C323, a counter coil C324 and a release coil C325. The counter coil is energized upon increases in load on the motors to cause the hand to move step-by-step, and the release coil is energized by closing switch C318 by rotation of cam C316. Switch C318 is connected to power line C3 by line C326 and to release coil C325 by line C327. The opposite side of coil C325 is connected to return line C12 by line C328. Therefore, closing switch C318 will energize coil C327 and cause counter hand C322 to move back to the No. 1 contact of the series C323. This will complete a circuit from power source C3 through line C329 to solenoid coil C330, controlling the operation of cylinder assembly 367 to start the saw 366 moving downwardly toward the pallet. A line C331 connects the coil C330 with contacts No. 1 and No. 2 of the counter. As the counter hand is at contact No. 1, the circuit is completed through the hand and line C332 to line C12.

The motor 366 will continue its downward movement until saw 367 contacts the top pair of cables. The cutting of the cables will increase the motor load and the current induced by the transformer C320 will vary depending upon whether the saw is cutting or running free. The transformer secondary winding is connected by wire C333 with a relay coil C334. When the induced current in the transformer reaches a predetermined amount, relay C334 will operate to close its contacts C335, thereby closing a circuit through the coil of a control relay C336. This circuit is from wire C3, through wire C329, wire C337, contacts C335, wire C338, coil of relay C336, and wire C339 to return wire C12. When the coil of relay C336 is energized, a capacitor C340 discharges through a circuit including the counter coil C324 to cause the counter hand C322 to move from the No. 1 to No. 2 contact of the series C323. As these two contacts are included in the circuit through coil C330, the saw 367 will continue downwardly to contact and cut the next two cables.

The capacitor C340 is connected across the lines C3 and C12 through a rectifier bridge C341 by means of wires C342 and C343 through the normally closed contacts C344, to provide for unidirectional flow through the capacitor during its charging and discharging periods. The branch lines C345 and C346 connect the capacitor to the counter coil C324 through the normally open contacts C347 of relay C333 when the relay is energized.

It will be clear from the above that the screws have a stepped movement. Saw 367 first moves down to cut the top cables at its side of the pallet. The load fluctuation on the saw motor causes the counter to move from the No. 1 to the No. 2 contact when the top cables are cut. The saw will move down and cut the second cables. The counter will operate again moving the hand to the No. 3 contact. This accomplishes two things: The circuit through coil C330 is broken and the valve of cylinder assembly 369 will shift automatically to lift the saw 367 to inoperative position; and a parallel circuit through solenoid C348 will be made to start saw 367' on its downward movement. The movement of saw 367' is a two-step one also, with the contacts No. 3 and No. 4 of the counter being connected to the wire C349 through the coil C348 circuit. When saw 367' cuts through the lower cables at its side of the pallet, the counter hand will move to the No. 5 contact breaking the circuit through coil C348 and permitting the saw to rise. When cam C316 completes its revolution, switch arm C318 will drop into notch C317, closing the circuit through release coil C325 to return the counter hand to the No. 1 contact of the counter to re-start the cycle.

*Member removal station*

As soon as the cables have been cut the pallet is advanced along the pallet track to the removal station 12 where the cured member, now freed from the pallet headers, is removed from the pallet (see FIGURES 2b and 53a through 58). After being lifted from the pallet, the member is transported to an accumulating area 372. The member removal mechanism consists of elevators 373, mounted upon platform 20, a transporting trolley 374 and a member turn-over assembly 375 which enables the concrete members, which have been cast upside down, to be placed right side up in the accumulating area.

There are two elevators 373, one adjacent each rail of the pallet track, with the two being between the pallet track rails. Each elevator consists of a pair of parallel, vertical guide tubes 376 mounted upon the platform 20. A cylinder assembly 377 is mounted between the guide tubes, and the cylinder 378 and the guide tubes 376 are suitably joined by connectors 379. Elevator platform 380 has a pair of depending rods 381 slidable in the guide tube 376. The piston rod 382 of the cylinder assembly is connected to the elevator platform, so that the platform will rise and fall as the piston rod is extended and retracted.

The elevator platform carries a pair of pallet-engaging arms 383, pivotally connected at 384 to brackets 385 beneath the platform edges. The arms have horizontal inoperative positions (see full line positions FIGURE 54) and vertical positions in which they grip the pallet sides to hold it while the concrete member is being removed. Each arm has a hook-like end 386, remote from the pivots 384, to overlie the upper surfaces of pallets at the removal station when the arms are raised to upright, operative position. The arms have projecting ends 387, which form operating levers and are connected to control cylinder assemblies 388. The cylinders 389 of these assemblies are connected to brackets 390 at the opposite sides of the elevator platform 380 from the arms they control. The piston rods 391 are pivotally connected at 392 to the operating levers. Operation of the cylinder assemblies will cause the arms to move to and from operative, pallet-engaging position.

The transporting trolley 374 includes a carriage 393, movable along an overhead rail 394, supported from the platform 20 by means of standards 395. The rail can be an I-beam, and the carriage will have rollers 396 movable along the bottom flange of the beam. The rollers are shown mounted in trucks 397 and the carriage body 398 is suspended by hangers 399 from the trucks. The carriage body may take any desired form. It may be an elongated member, extending the major portion of the length of the concrete member to be lifted. One or more vacuum heads 400 are mounted beneath the body, for engagement with a concrete member to be moved from a pallet on the elevators 373. The vacuum head will be connected to a suitable vacuum source, not shown, by pipeline 401, controlled by valve 402.

When a concrete member has been engaged by the vacuum heads, the elevators will be lowered leaving the member suspended from the trolley carriage. The trolley carriage may then move along the rail 394, carrying the member from the pallet track to a position at one side of the machine adjacent the accumulation area 372. The trolley carriage is powered by linear actuators to be described. At the end of the trolley path, the concrete member is transferred from the carriage to the turn-over assembly 375.

The turn-over assembly consists of two mechanisms to turn the concrete member in two stages. The first stage mechanism 403 is in the form of a cradle which receives the member from the trolley carriage and turns it 90° while delivering it to the second stage mechanism 404. The second stage is another cradle which rocks 90° and completes the inversion of the concrete member as it delivers it to the accumulating area 372. A cylinder assembly 405 at the edge of the accumulating area pushes the member from the second stage mechanism onto a storage space, or a suitable conveyor 406 may be used which carries the member from the machine.

The turn-over mechanism is mounted upon a frame 407 which includes seats 408 at the sides. The first stage 403 has a shaft 409 journalled in bearings 410 on the seats 408. A reversible power means 411 is mounted upon one of the seats and connected to the shaft. Near the ends of the shaft, there are upstanding plates 412, each having a cradle recess 413 in its upper edge to receive a concrete member. The recess shape will be such that it will closely embrace the sides of the member.

The second stage 404 also has a shaft 414, journalled in bearings 415 on the seats 408. A power means 416 is connected to the shaft. Shaft 414 has upstanding plates 417 near its ends, which have recesses 418, shaped to receive the concrete member when turned on its side. The recesses of the second stage mechanisms are located so as to lie in the arcuate path of travel of concrete members in the first stage cradle, so that the concrete members will come to rest in the recesses 418 of the second stage mechanism as the first stage is rocked about its shaft axis.

Operation of the various mechanisms at the unloading station 12 is initiated by two cams on the master cam shaft C1. A cam C350 controls operation of the concrete member engaging arm 383, and a cam C351 controls operation of the elevators. The remaining operations are controlled by movement of the various parts of the mechanism or the movement of the concrete member from place to place.

Cam C350 has a recess C352 into which switch arm C353 will drop shortly after the cam cycle of rotation begins. When the switch arm drops in the recess, it closes a circuit from line C3 through line C354, switch C353, line C355 solenoid coil C356 of valves controlling cylinders 389, to cause the piston rods to extend to swing the arms 383 vertically, and line C357 to return line C12. This will bring the arms 383 up along the sides of the pallet to ensure its proper position and cause the hook ends of the arm to overlie the pallet side edges. Cam C351 will then operate to move its switch C358, by contact with cam rise C359, to close a circuit through the solenoid C360 controlling upward movement of the elevator cylinder 378. This circuit is from line C3, through line C361, switch C358, line C362, solenoid C360 and line C363 to line C12. The elevators will rise, carrying the pallet and concrete member upwardly until the concrete member is pressed tightly against the vacuum heads 400.

After a short pause, long enough for proper vacuum to build up, cam C351 will release switch C358, and the switch will move to its opposite position making contact with line C364 which connects to solenoid coil C365 controlling downward movement of cylinder 378. If there is no adhesion between the concrete member and the pallet, the pallet will fall free with the elevators. If the pallet sticks, arms 383 will pull it from the concrete member as the elevators lower. After the elevators reach their position of rest and the cam cycle is almost completed, cam C350 will cause switch C353 to close with line C366 connected to solenoid coil C367 to lower the arms 383 to inoperative position.

When the concrete member reached its upper position in contact with the vacuum heads, it closed a switch C368 on the trolley carriage. When the carriage is in position to receive a concrete member it holds closed a switch C369 on the trolley rail 394 (see FIGURE 57). When the empty pallet is replaced on the pallet track, it closed a switch C370 on the pallet track. These three switches, C368, C369 and C370, are in a circuit with a starter relay coil C371 for the three phase, 12 coil, lineal actuators which cause the movement of the trolley carriage along its rail. The starter coil C371 initiates movement from the member-receiving position at the elevators to the turn-over mechanism. The circuit for coil C371 includes a line C372 from line C3, switch C370, a switch C373 located at the turn-over mechanism first stage indicating that mechanism is in position to receive the concrete member, line C374, coil C371, line C375 including switch C369 and switch C368, and line C376 to return line C12. Energizing coil C371 closes relay contacts C377 establishing a holding circuit from coil C371 to line C376 through line C378 by-passing switches C369 and C368. The holding circuit includes a switch C379 mounted in the trolley carriage to cut off the linear actuators at predetermined time. Starter relay contacts C380, C381 and C382 in the heavy duty lines C383, C384 and C385 supplying the lineal actuators C386.

As the trolley carriage moves along its track, a cam C387, mounted on the rail 394 at about its middle, strikes switch C379 and opens the holding circuit through relay coil C371. As switch C369 opened when the carriage left the elevator station, coil C371 will be de-energized and the lineal actuators will be cut off. The trolley carriage will coast into the turn-over station.

When the trolley carriage arrives at the turn-over station it closes switch C388 on the rail 394. It also closes a switch C389 on the rail which is in circuit with a coil C390' of valve 402 controlling the vacuum heads 400. Closing switch C389 will release the vacuum allowing the concrete member to drop from the carriage to rest in the cradle recesses 413 in the first turn-over stage plates. The recesses are in alignment with the path of the concrete member travel on the trolley carriage, so that the member is carried endwise into the recesses by the carriage; thus, it need drop but a very short distance when released by the vacuum heads to seat in the cradle.

As the concrete member drops from the carriage switch C368 opens. When the member seats in the cradle recesses 413, it closes switches C390 and C391, both mounted on the cradle plates 412. As switches C388 and C370 are already closed, a circuit through line C372, switch C370, line C392, switch C391, starter relay coil C393, line C394, switches C388 and C390 is closed. This closes relay contacts C395 in holding circuit C396 and closes relay contacts C397, C398 and C399 in lineal actuator feed lines C383, C384 and C385 to energize the actuators in reverse direction and start the trolley carriage back toward the elevator station. On the return trip, switch C400 in holding circuit C396 strikes cam C387 to de-energize coil C393. This will de-activate the lineal actuators. When the carriage left the turn-over station switch C388 opened, and when the trolley is correctly positioned at the elevator station switch C369 is closed.

When the concrete member was placed in the cradle of the turn-over first stage, it also closed a switch C401, located on the cradle plate 412 (see FIGURE 58). A switch C402, mounted on the shaft 414 of the second stage strikes an abutment C403 on the support seat 408 when the second stage is in proper member-receiving position. A third switch C404, located on the trolley rail 394 is closed by the carriage when at the elevator station. With these three switches closed, a hydraulic valve coil C405 is energized to start power means 411 to rock the first stage cradle toward the second stage. The coil circuit is from line C3 through line C406, the three switches and line C407 to return line C12. As the first stage cradle rocks a switch C373 on shaft 409 leaves its abutment C408 on seat 408 and opens so that the trolley carriage cannot move from the elevator station until the first stage cradle returns to upright, concrete member-receiving position.

When the first stage cradle reaches the second stage cradle, the load of the member is taken by the second stage. As the tie moves into the recesses of the second stage cradle, switch C409, mounted on the cradle plate 417 adjacent the recess, will be closed. This closes a circuit from wire C406 through wires C410, C411, switch C409, coil C412 and return line C407. Coil C412 controls power means C116 to rock the second stage cradle toward the accumulating area 372. As the second stage cradle starts its rocking movement, switch C401 on the first stage cradle plate opens as the concrete member is moved out of the first stage cradle.

The rocking movement of the second stage cradle carries the concrete member to the accumulating area. As the member is placed on the area, it closes switch C413 on the area in line C414 bridged between lines C410 and C407. This line includes valve coil C415 controlling reverse movement of the power means 411 of the first stage. When the first stage returns to its original position, it again closes switch C373 in the trolley carriage control circuit. A second switch C416 on the accumulating area is also closed when the member is placed there. This switch is in circuit through line C417 with a solenoid coil C418 controlling the valve of cylinder assembly 405, and when switch C416 is closed the cylinder will operate to push the concrete member from the second stage cradle onto the conveyor 406. As the member moves off to switch C416, the switch opens and the cylinder automatically returns to its inoperative position. As the concrete member leaves the second stage cradle, switch C409 opens, breaking the circuit to the second stage power means. When the member is pushed onto the conveyor, a switch C419 is closed which is in line C420 to valve coil C421 controlling reverse movement of the second stage cradle. The return of the second stage to its original position closes switch C402 on the second stage shaft, to set up the circuits to repeat the cycle.

When the empty pallet was returned by the elevators 373 to the pallet track it was in position to be moved by the next step of the pallet advancing mechanism to the pallet header cleaning station 13' to begin another cycle of operation.

In view of the detailed description of the operation of each mechanism given in conjunction with the description of the structure, together with the explanation of each separate step of movement of the pallets and transporting means, it is not thought necessary to re-state the operation of the apparatus as a whole.

It will be apparent that the entire operation of preparing the pallet, inserting stressing cables, tensioning the cables, pouring the concrete member, curing the member and removing it from the pallet takes place in a continuous, automatic cycle. The pallets hold the cast units with cables tensioned during the entire time the members are in the pallets. The arrangement permits the removal of pallets from the casting line onto transporting means for passage through a curing tunnel, and a reloading of the pallets with cured units onto the opposite end of the casting line. The orbital path of the transporting means carries the kiln cars to the loading end of the casting machine and beneath the machine to proper position for unloading the freshly cast units from the casting line.

Although a detailed description of one practical embodiment of the invention has been given, it will be apparent that the details of structure shown and described are merely for purposes of illustration and the invention may take other forms within the scope of the appended claims.

What is claimed is:

1. Apparatus for making prestressed concrete members comprising, an endless path, a curing tunnel housing a portion of the path, a concrete member forming machine having an entrance end and an exit end adjacent spaced positions along the path removed from the curing tunnel, a plurality of cars mounted for movement along the path, means to move the cars along the path, a plurality of pallets in which concrete members can be formed and cured carried on the cars and the forming machine, the pallets each having means to hold stressing cables under tension, means for transferring pallets singly from cars onto the entrance end of the forming machine, means on the forming machine to move pallets from the entrance end to the exit end, and means to transfer pallets from the exit end of the forming machine onto cars on the path, whereby prestressed concrete members may be formed on pallets on the forming machine, carried through the curing tunnel, and pallets containing cured members transferred back onto the forming machine.

2. Apparatus for making prestressed concrete members as claimed in claim 1 wherein, the concrete member forming machine includes means to remove cured concrete members from the pallets, means to insert stressing cables into pallets, means to tension cables in the pallets, and means to mold concrete members on pallets about the tensioned cables.

3. Apparatus for making prestressed concrete members as claimed in claim 2 wherein, the means to remove cured concrete members from the pallets includes means to cut the tensioned cables to free the cables from the pallets, means to separate the cured concrete members from the pallet, and means to transport separated cured concrete members away from the pallets from which they are separated.

4. Apparatus for making prestressed concrete members as claimed in claim 2 wherein, the means to insert stressing cables into pallets includes means to feed cables from a source of supply, guide means to receive fed cables in a desired pattern, means to cut the cables to predetermined length, means to move the guide means into the pallet with the cable ends engaged in the means to hold the cables tensioned.

5. Apparatus for making prestressed concrete members as claimed in claim 2 wherein, the pallets have a fixed header and a movable header and the movable header has two seated positions on the pallet at different distances from the fixed header, and there are means on the respective headers to grip the ends of the stressing cables, the means for tensioning the cables comprising means to move the movable header to its seated position farthest removed from the fixed header.

6. Apparatus for making prestresed concrete members as claimed in claim 2 wherein, the pallets have a trough-shaped body with struts along the sides with a header fixed at one end of the body and a removable header placeable at the other end of the body bridging the struts, each header having at least one cable-receiving opening therein, the removable header having a pair of spacer lugs projecting therefrom to seat against the strut ends to seat the removable header on the pallet with the cable-receiving opening in the removable header in axial alignment with the cable-receiving opening in the fixed header, the fixed header seatable against the pallet body in an offset position with the spacer lugs out of contact with the struts and the cable-receiving opening offset from the cable-receiving opening of the fixed pallet, the means for advancing pallets on the forming machine having means to advance pallets with removable headers in offset position to the means for tensioning pallets while in canted position relative to the machine to align the cable-receiving openings in the headers normal to the path of advance of pallets along the machine, the cable-tensioning means including a jack having means to bear against the headers to move the removable header away from the fixed header and tension a cable inserted in the cable-receiving openings of the headers, the jack bearing means contacting the headers adjacent the cable-receiving openings, whereby the pallet body will swing to a position normal to the advancing path of pallets on the forming machine when the removable header is moved outwardly far enough for the spacer lugs to clear the strut ends to move the strut ends into alignment with the spacer lugs.

7. Apparatus for making prestressed concrete members as claimed in claim 2 wherein, the means to mold the concrete members includes; a mold box movable vertically to and from seating relation upon pallets on the forming machine, a charge box movable from a source of concrete supply to overlie the mold box when seated upon a pallet, a stripper head movable vertically into the mold box seated on a pallet, vibrating means on the forming machine underlying a pallet upon which the mold box is seated, and vibrating means carried by the stripper header.

8. Apparatus for making prestressed concrete members as claimed in claim 7 wherein, the vibrating means underlying the pallet including a support upon which the pallet may seat a vibrating unit capable of lifting the pallet from its support and dropping it thereon in a rapid cycle.

9. In apparatus for making prestressed concrete members in pallets at a pallet position, the pallets having a trough-shaped body with a fixed header at one end of the body and a removable header at the other end of the body, the headers each having cable-receiving openings in identical predetermined pattern with anchors adjacent the openings, means to lay cable in the pallet body with the cable ends in the anchors on the headers comprising, a cable guide mounted above the pallet position for vertical movement into and out of pallets at the pallet position, the guide extending lengthwise of pallets at the pattern position and having its ends adjacent the pattern of cable openings in the pallet headers when lowered into the pallet, means defining openable cable-receiving guideways extending lengthwise of the guide in the same pattern as the cable-openings in the pallet headers, means to lower the end of the guide adjacent the pallet fixed header into the pallet with its guideways in alignment with the cable-openings in the fixed header, means to feed cable lengths into the guideways of the guide from the guide end adjacent the pallet removable header and through the guide and into the cable-openings and adjacent anchors of the fixed header, means to move the removable pallet header from the pallet body, means to lower the guide end adjacent the removable head end of the pallet into the pallet, and means to move the removable pallet header back against the pallet body end while threading ends of the cable ends projecting beyond the guide into the cable-openings and anchors of the removable pallet header.

10. In apparatus for making prestressed concrete members in pallets as claimed in claim 9 wherein, the cable lengths extend from a source of cable supply, one end for each opening in the pattern of cable openings in the pallet headers, means operable by cable ends projecting beyond the anchors of the fixed pallet header to cut the cables to desired length.

11. In apparatus for making prestressed concrete members in pallets as claimed in claim 10 wherein, the source of cable supply comprises a plurality of cable drums, and there are means to feed cable from the several drums of the plurality in accordance with cable demand.

12. In apparatus for making prestressed concrete members in pallets as claimed in claim 9 wherein, the means for moving the removable header from and returning it to the pallet body including, a frame, a carriage on the frame movable toward and from the pallet position, and means on the carriage to engage and grip the removable header.

13. In apparatus for making prestressed concrete members in pallets as claimed in claim 9 wherein, the cable guide includes a body having grooves along its length, flaps hinged to the guide body to overlie the grooves, companion grooves in the flaps to form with the grooves in the guide body, the cable guideways, and means to move the flaps to and from the body to close and open the guideways.

14. In apparatus for making prestressed concrete members as claimed in claim 9 wherein, there are means to move the guide lengthwise of the cables away from the fixed header after insertion of cable ends in the fixed header anchors to support cable ends projecting from the guide end adjacent the removable pallet header, and to move the guide back toward the pallet fixed header simultaneously wtih movement of the removable pallet header back toward the pallet body.

15. In apparatus for making prestressed concrete members in pallets at a pallet position, the pallets having a trough-shaped body and a header fixed at one end and a removable header at the other end with cables in the pallet anchored in the headers, means to tension the cables comprising, bearing legs pivotally mounted on the apparatus for positioning within pallets for bearing contact with the headers, and a jack interconnecting the legs, whereby the removable header may be moved outwardly of the pallet to separate the headers and tension the cables.

16. In apparatus for making prestressed concrete members in pallets as claimed in claim 15, an elevator at the pallet position to lift pallets to the bearing legs so that the bearing legs are within the pallet.

17. In apparatus for making prestressed concrete members in pallets at a pallet position, the pallets having stressing cables held under tension therein, means to mold the concrete member comprising, a mold box open top and bottom mounted above the pallet position for vertical movement into pallets, means to deliver predetermined charges of concrete into the mold box when positioned in a pallet, a stripper head mounted for a vertical movement into the open top of the mold box in a pallet to compress a charge of concrete in the pallet and mold box, a vertically yieldable table to support the pallets, means to vibrate the table and pallets thereon, and rigid means at the pallet station having a top surface below the at rest position of the table but above the bottom position of the table during vibration to provide an abutment against which the pallets may strike each vibratory period to settle the concrete in the pallet.

18. In apparatus for making prestressed concrete members as claimed in claim 17 wherein, there is vibrating means mounted upon the stripper head.

19. In apparatus for making prestressed concrete members as claimed in claim 18 wherein, the means for delivering charges of concrete to the mold box and pallets includes a hopper for concrete having an outlet, and a charge box movable from a position underlying the hopper outlet to a position overlying the mold box when on a pallet.

20. Apparatus for making prestressed concrete members comprising, a platform, a pallet track along the platform, a plurality of pallets on the tracks, means to move pallets along the track in steps of predetermined length to advance the pallets in succession to a plurality of stations located on the platform along the track, the stations including, a cable releasing station, a concrete member removing station, a pallet cleaning station, an anchor inserting and pallet oiling station, a cable inserting station, a cable stressing station, and a concrete member molding station.

21. Apparatus for making prestressed concrete members as claimed in claim 20 wherein, the pallets have headers at their ends having cable-receiving openings, and there is a pallet header cleaning station on the platform along the track having means movable into and out of the pallet header cable-receiving openings to clear the openings to prepare them to receive stressing cables.

22. Apparatus for making prestressed concrete members as claimed in claim 21 wherein, there is a compressed air line at the pallet header station to remove loose debris from pallets at the station.

23. Apparatus for making prestressed concrete members as claimed in claim 20 wherein, the pallet cleaning station includes means movable over a pallet at the station, said movable means carrying a sandblasting head and a suction nozzle, means for supplying sand under pressure to the sandblasting head, means connecting the suction nozzle to a suction source, and means to cause sand under pressure to be delivered to the sandblasting head during an initial traverse of the movable means across a pallet at the pallet cleaning station, and means to render the suction nozzle operative during the reverse traverse of the movable means to remove deposited sand and debris from the pallet.

24. Apparatus for making prestressed concrete members as claimed in claim 23 wherein, the means to render the suction nozzle operative includes a telescopic mounting for the suction nozzle, and means to lower the suction nozzle into a pallet at the pallet cleaning station.

References Cited by the Examiner

UNITED STATES PATENTS

| | | | |
|---|---|---|---|
| 611,180 | 9/1898 | Menti | 51—8 |
| 644,520 | 2/1900 | Jones | 25—2 |
| 1,440,716 | 1/1923 | Bliss | 25—2 |
| 1,793,208 | 2/1931 | Biggert | 83—490 |
| 2,147,776 | 2/1939 | Mitchell | 83—490 |
| 2,423,557 | 7/1947 | Gray | 25—2 |
| 2,653,371 | 9/1953 | Kruse | 25—120 |
| 2,835,016 | 5/1958 | Dixon. | |
| 2,935,172 | 5/1960 | Todoroff | 198—19 |
| 2,959,267 | 11/1960 | Le Boutillier et al. | 198—19 |
| 2,996,782 | 8/1961 | Kovach et al. | 25—41 |
| 3,061,904 | 11/1962 | Wise | 25—120 |
| 3,128,521 | 4/1964 | Baker | 25—41 |

FOREIGN PATENTS

| | | |
|---|---|---|
| 13,274 | 6/1825 | Netherlands. |
| 147,494 | 9/1962 | Russia. |

J. SPENCER OVERHOLSER, *Primary Examiner.*

G. A. KAP, R. D. BALDWIN, *Assistant Examiners.*